United States Patent
Novak et al.

(10) Patent No.: US 10,842,313 B2
(45) Date of Patent: Nov. 24, 2020

(54) METHOD AND APPARATUS FOR CARTRIDGE-BASED CARBONATION OF BEVERAGES

(71) Applicant: Bedford Systems LLC, Bedford, MA (US)

(72) Inventors: Thomas J. Novak, Stowe, VT (US); Ross Packard, South Burlington, VT (US); Peter Peterson, Waterbury, VT (US); Shawn Gulla, Grand Isle, VT (US); Jennifer Caitlin Huot Carlson, Essex Junction, VT (US);
(Continued)

(73) Assignee: BEDFORD SYSTEMS LLC, Bedford, MA (US)

( * ) Notice: Subject to any disclaimer, the term of this patent is extended or adjusted under 35 U.S.C. 154(b) by 287 days.

(21) Appl. No.: 15/872,833

(22) Filed: Jan. 16, 2018

(65) Prior Publication Data
US 2018/0153331 A1  Jun. 7, 2018

Related U.S. Application Data

(60) Division of application No. 14/445,571, filed on Jul. 29, 2014, now Pat. No. 9,867,493, which is a (Continued)

(51) Int. Cl.
*A47J 31/40* (2006.01)
*B65D 85/73* (2006.01)
(Continued)

(52) U.S. Cl.
CPC .............. *A47J 31/407* (2013.01); *A23L 2/54* (2013.01); *A47J 31/41* (2013.01); *B01F 3/0446* (2013.01);
(Continued)

(58) Field of Classification Search
CPC .................... A47J 31/407; B01F 15/0206; B01F 15/0205; B01F 5/10; B01F 5/0606
(Continued)

(56) References Cited

U.S. PATENT DOCUMENTS

| 716,474 A | 12/1902 | Price |
| 1,592,395 A | 7/1926 | Sulzberger |

(Continued)

FOREIGN PATENT DOCUMENTS

| CA | 2788496 A1 | 8/2011 |
| CN | 1044412 A | 8/1990 |

(Continued)

OTHER PUBLICATIONS

Annex to Form PCT/ISA/206, Communication Relating to Results of the Partial International Search for International Patent Application No. PCT/US2012/049356, dated Nov. 27, 2012 (2 pages).
(Continued)

*Primary Examiner* — Thien S Tran
(74) *Attorney, Agent, or Firm* — Dorsey & Whitney LLP

(57) ABSTRACT

Systems, methods and cartridges for carbonating or otherwise dissolving gas in a precursor liquid, such as water, to form a beverage. A gas source can be provided in a cartridge which is used to generate gas that is dissolved into the precursor liquid. A beverage medium, such as a powdered drink mix or liquid syrup, may be provided in the same, or a separate cartridge as the gas source and mixed with the precursor liquid to form a beverage. The use of one or more cartridges for the gas source and/or beverage medium may make for an easy to use and mess-free system for making sparkling beverages, e.g., in the consumer's home.

20 Claims, 38 Drawing Sheets

(72) Inventors: Camilla Schmitt, Stowe, VT (US);
Mark Joseph Cohen, Melbourn (GB);
Ross Peter Jones, Cambridge (GB);
Nicolas Alejandro Martinez, Quincy,
MA (US); Miles William Noel
Hember, Cambridge (GB); Fabien
Yannick Schmitt, Cambridge (GB);
Gary Stacey, Cambridge (GB); Niall
Allan Mottram, Cambridge (GB); Neil
Lester Campbell, Ashwell (GB);
Cormac O'Prey, Bishops Stortford
(GB); Wai Ting Chan, Cambridge
(GB); Nicholas David Rollings, St.
Albans (GB); Charles Frazer Kilby,
St. Neots (GB); Christopher Paul
Richardson, Elmswell (GB); Thomas
Bates Jackson, Cambridge (GB); Scott
Grubb, Cambridge (GB); Chris Covey,
Cambridge (GB); Barry Dobson,
Royston (GB); Paul Wilkins,
Cambridge (GB); Chris Roach,
Wisbech (GB); Peter David Cauwood,
Cambridge (GB); Keith Paul
Thompson, Cambridge (GB); James
Hewitt, Reading, MA (US); Marc
Angotti, Stowe, VT (US); Ray Carroll,
Waterbury, VT (US); Richard
Estabrook, Waterbury, VT (US); Kevin
Hartley, Waterbury, VT (US); Frank
Consoli, Media, PA (US)

Related U.S. Application Data continuation of application No. 13/565,214, filed on Aug. 2, 2012, now Pat. No. 9,936,834, said application No. 14/445,571 is a continuation-in-part of application No. 13/017,459, filed on Jan. 31, 2011, now Pat. No. 8,808,775.

(60) Provisional application No. 61/514,676, filed on Aug. 3, 2011, provisional application No. 61/337,184, filed on Feb. 1, 2010.

(51) Int. Cl.
| | | |
|---|---|---|
| *A47J 31/41* | (2006.01) | |
| *A23L 2/54* | (2006.01) | |
| *B01F 15/02* | (2006.01) | |
| *B01F 3/04* | (2006.01) | |
| *B01F 5/06* | (2006.01) | |
| *B01F 5/10* | (2006.01) | |
| *F17C 11/00* | (2006.01) | |
| *B65D 85/804* | (2006.01) | |

(52) U.S. Cl.
CPC ...... *B01F 3/04248* (2013.01); *B01F 3/04758* (2013.01); *B01F 3/04787* (2013.01); *B01F 3/04808* (2013.01); *B01F 3/04815* (2013.01); *B01F 5/0606* (2013.01); *B01F 5/10* (2013.01); *B01F 15/0205* (2013.01); *B01F 15/0206* (2013.01); *B65D 85/73* (2013.01); *B65D 85/8043* (2013.01); *F17C 11/00* (2013.01); *B01F 2215/0022* (2013.01)

(58) Field of Classification Search
USPC .... 99/275, 279, 280, 281, 308; 426/66, 524, 426/561, 591
See application file for complete search history.

(56) References Cited

U.S. PATENT DOCUMENTS

| | | |
|---|---|---|
| 1,889,111 A | 11/1932 | Serr |
| 1,945,489 A | 1/1934 | Manley |
| 2,072,350 A | 3/1937 | Welker et al. |
| 2,073,273 A | 3/1937 | Korn et al. |
| 2,201,430 A | 5/1940 | Deibel |
| 2,219,032 A | 10/1940 | Kantor |
| 2,695,238 A | 11/1954 | Ferguson |
| 2,745,751 A | 5/1956 | Pichardo |
| 2,912,018 A | 11/1959 | Cayzer |
| 3,465,873 A | 9/1969 | Munz |
| 3,596,801 A | 8/1971 | Barnack |
| 3,628,444 A | 12/1971 | Mazza |
| 3,711,011 A | 1/1973 | Kugler |
| 3,730,336 A | 5/1973 | Feldman |
| 3,851,797 A | 12/1974 | Jacobs |
| 3,888,998 A | 6/1975 | Sampson et al. |
| 3,924,008 A | 12/1975 | Ford et al. |
| 3,930,053 A | 12/1975 | Japikse et al. |
| 4,007,134 A | 2/1977 | Liepa et al. |
| 4,011,733 A | 3/1977 | Kuckens et al. |
| 4,025,655 A | 5/1977 | Whyte et al. |
| 4,040,342 A | 8/1977 | Austin et al. |
| 4,110,255 A | 8/1978 | Liepa et al. |
| 4,123,390 A | 10/1978 | Sherman et al. |
| 4,186,215 A | 1/1980 | Buchel |
| 4,214,011 A * | 7/1980 | Strube ............... C12G 1/06 426/591 |
| 4,247,001 A | 1/1981 | Wiegner |
| 4,316,409 A | 2/1982 | Adams et al. |
| 4,355,735 A | 10/1982 | Whorton et al. |
| 4,363,337 A | 12/1982 | Pease |
| 4,387,809 A | 6/1983 | Botzler |
| 4,458,584 A | 7/1984 | Annese et al. |
| 4,475,448 A | 10/1984 | Shoaf et al. |
| 4,493,441 A | 1/1985 | Sedam et al. |
| 4,520,950 A | 6/1985 | Jeans |
| 4,636,337 A | 1/1987 | Gupta et al. |
| 4,688,701 A | 8/1987 | Sedam |
| 4,719,056 A | 1/1988 | Scott |
| 4,756,915 A | 7/1988 | Dobry |
| 4,804,112 A | 2/1989 | Jeans |
| 4,808,346 A | 2/1989 | Strenger |
| 4,826,695 A | 5/1989 | Tanner |
| 4,836,380 A | 6/1989 | Walter et al. |
| 4,839,107 A | 6/1989 | Rudick et al. |
| 4,867,993 A | 9/1989 | Nordskog |
| 4,917,267 A | 4/1990 | Laverdure |
| 4,927,567 A | 5/1990 | Rudick |
| 4,927,569 A | 5/1990 | Robinson |
| 4,940,164 A | 7/1990 | Hancock et al. |
| 4,967,936 A | 11/1990 | Bingler |
| 4,993,592 A | 2/1991 | Brader |
| 5,008,013 A | 4/1991 | Favre et al. |
| 5,011,700 A | 4/1991 | Gustafson et al. |
| 5,021,219 A | 6/1991 | Rudick et al. |
| 5,071,595 A | 12/1991 | Burrows |
| 5,073,312 A | 12/1991 | Burrows |
| 5,102,627 A | 4/1992 | Plester |
| 5,115,956 A | 5/1992 | Kirschner et al. |
| 5,124,088 A | 6/1992 | Stumphauzer |
| 5,160,461 A | 11/1992 | Burrows |
| 5,182,084 A | 1/1993 | Plester |
| 5,188,257 A | 2/1993 | Plester |
| 5,192,513 A * | 3/1993 | Stumphauzer ............ A23L 2/54 222/129.1 |
| 5,242,077 A | 9/1993 | Smith et al. |
| 5,312,017 A | 5/1994 | Schroeder et al. |
| 5,330,075 A | 7/1994 | Brown |
| 5,350,587 A | 9/1994 | Plester |
| 5,391,163 A | 2/1995 | Christine et al. |
| 5,427,258 A | 6/1995 | Krishnakumar et al. |
| 5,510,060 A | 4/1996 | Knoll |
| 5,549,037 A | 8/1996 | Stumphauzer et al. |
| 5,553,749 A | 9/1996 | Oyler et al. |
| 5,565,149 A | 10/1996 | Page et al. |

(56) References Cited

U.S. PATENT DOCUMENTS

| | | |
|---|---|---|
| 5,611,937 A | 3/1997 | Jarocki |
| 5,624,645 A | 4/1997 | Malley |
| 5,743,433 A | 4/1998 | Hawkins et al. |
| 5,840,189 A | 11/1998 | Sylvan et al. |
| 5,967,368 A | 10/1999 | Guillermier |
| 5,992,685 A | 11/1999 | Credle |
| 6,059,137 A | 5/2000 | Westwood et al. |
| 6,105,812 A | 8/2000 | Riordan |
| 6,138,995 A | 10/2000 | Page |
| 6,182,949 B1 | 2/2001 | Mobbs |
| 6,250,346 B1 | 6/2001 | Castillo |
| 6,253,960 B1 | 7/2001 | Bilskie et al. |
| 6,276,551 B1 | 8/2001 | Miller |
| 6,324,850 B1 | 12/2001 | Davis |
| 6,364,103 B1 | 4/2002 | Sergio et al. |
| 6,415,940 B1 | 7/2002 | Brabson |
| 6,477,743 B1 | 11/2002 | Gross et al. |
| 6,712,342 B2 | 3/2004 | Bosko |
| 6,758,130 B2 | 7/2004 | Sargent et al. |
| 7,094,434 B2 | 8/2006 | Gaonkar et al. |
| 7,114,707 B2 | 10/2006 | Rona et al. |
| 7,267,247 B1 | 9/2007 | Crunkleton et al. |
| 7,288,276 B2 | 10/2007 | Rona et al. |
| 7,407,154 B2 | 8/2008 | Sakakibara et al. |
| 8,808,775 B2 | 8/2014 | Novak et al. |
| 9,936,834 B2 | 4/2018 | Novak et al. |
| 2001/0048957 A1 | 12/2001 | Lazaris et al. |
| 2002/0020659 A1 | 2/2002 | Sweeney et al. |
| 2002/0078831 A1 | 6/2002 | Cai |
| 2003/0005826 A1 | 1/2003 | Sargent et al. |
| 2003/0080443 A1 | 5/2003 | Bosko |
| 2003/0188540 A1 | 10/2003 | Van Winkle |
| 2004/0115317 A1 | 6/2004 | Doglioni |
| 2004/0134932 A1* | 7/2004 | Lobdell ............... B67D 3/0009 222/146.5 |
| 2004/0228955 A1 | 11/2004 | Denisart et al. |
| 2004/0238475 A1 | 12/2004 | Peronek |
| 2005/0029287 A1 | 2/2005 | Mobbs |
| 2005/0252381 A1 | 11/2005 | Hillyer |
| 2005/0266122 A1 | 12/2005 | Franceschi |
| 2006/0000851 A1 | 1/2006 | Girard et al. |
| 2006/0049215 A1 | 3/2006 | Lim et al. |
| 2006/0049216 A1 | 3/2006 | Bromber |
| 2006/0219098 A1 | 10/2006 | Mandralis et al. |
| 2006/0236871 A1 | 10/2006 | Ternite et al. |
| 2007/0196402 A1 | 8/2007 | De la Mettrie et al. |
| 2007/0267416 A1 | 11/2007 | Eichenbaum |
| 2008/0148948 A1 | 6/2008 | Evers et al. |
| 2008/0257855 A1 | 10/2008 | Patel |
| 2009/0004335 A1 | 1/2009 | Macmahon et al. |
| 2009/0212060 A1 | 8/2009 | Shinohara et al. |
| 2009/0282987 A1 | 11/2009 | Macmahon et al. |
| 2009/0301904 A1 | 12/2009 | Bullard et al. |
| 2009/0311384 A1 | 12/2009 | Macmahon et al. |
| 2010/0133708 A1 | 6/2010 | Fischer |
| 2010/0139496 A1 | 6/2010 | Santoiemmo |
| 2010/0154906 A1 | 6/2010 | Skalski et al. |
| 2010/0159077 A1 | 6/2010 | Skalski et al. |
| 2010/0223946 A1* | 9/2010 | Fuenten ............... A47J 31/44 62/320 |
| 2010/0237163 A1 | 9/2010 | Chomas et al. |
| 2010/0251901 A1 | 10/2010 | Santoiemmo |
| 2010/0263545 A1* | 10/2010 | Morgan ............... A47J 31/005 99/295 |
| 2011/0020508 A1 | 1/2011 | Santoiemmo |
| 2013/0129870 A1 | 5/2013 | Novak et al. |
| 2014/0326144 A1 | 11/2014 | Novak et al. |
| 2014/0328980 A1 | 11/2014 | Novak et al. |
| 2014/0331867 A1 | 11/2014 | Novak et al. |
| 2014/0331868 A1 | 11/2014 | Novak et al. |
| 2014/0335239 A1 | 11/2014 | Novak et al. |

FOREIGN PATENT DOCUMENTS

| | | |
|---|---|---|
| CN | 2647193 Y | 10/2004 |
| DE | 102007001609 A1 | 7/2008 |
| DE | 102007041093 A1 | 3/2009 |
| EP | 1704803 A1 | 9/2006 |
| EP | 2531080 B1 | 11/2014 |
| GB | 1051012 A | 12/1966 |
| GB | 1143742 A | 2/1969 |
| GB | 1402799 A | 8/1975 |
| GB | 2038953 A | 7/1980 |
| GB | 2076628 A | 12/1981 |
| GB | 2234187 A | 1/1991 |
| JP | 48-061664 | 8/1973 |
| JP | 50-151795 A | 12/1975 |
| JP | 53-091180 A2 | 8/1978 |
| JP | 53-91181 | 8/1978 |
| JP | 53-101587 A | 9/1978 |
| JP | 53-101588 A2 | 9/1978 |
| JP | 54-26387 A | 2/1979 |
| JP | 57-211691 A | 12/1982 |
| JP | 61-082000 A | 4/1986 |
| JP | 01-133917 A | 5/1989 |
| JP | 01-139128 A | 5/1989 |
| JP | 03-503983 A | 2/1992 |
| JP | 04-201882 A | 7/1992 |
| JP | 06-071149 | 3/1994 |
| JP | 50-050845 U | 5/1995 |
| JP | 2003231592 A | 8/2003 |
| JP | 2008-114926 | 5/2008 |
| JP | 2008-114926 A | 5/2008 |
| KR | 200173575 Y1 | 3/2000 |
| KR | 20070097420 A | 10/2007 |
| RU | 2306839 C2 | 9/2007 |
| WO | 2005077811 A2 | 8/2005 |
| WO | 2005080223 A1 | 9/2005 |
| WO | 2006098231 A1 | 9/2006 |
| WO | 2007114685 A1 | 10/2007 |
| WO | 2008115047 A1 | 9/2008 |
| WO | 2008124851 A1 | 10/2008 |
| WO | 2008132571 A1 | 11/2008 |
| WO | 2009088285 A1 | 7/2009 |

OTHER PUBLICATIONS

Definition of "planar" obtained Apr. 25, 2009, http://web.archive.org/web/20090425060458/https://www.meriam-webster.com/dictionary/planar.
Definition of "valve" obtained Sep. 11, 2017, http://www.dictionary.com/browse/valve.
Examination Report for Canadian Patent Application No. 2,788,496, dated Jul. 25, 2017 (3 pages).
First Office Action for Chinese Patent Application No. 201510282671.6, dated Apr. 1, 2017, with English Translation (17 pages).
International Search Report and Written Opinion for International Application No. PCT/US2012/049356 dated Feb. 7, 2013.
International Search Report and Written Opinion of the International Searching Authority for International Patent Application No. PCT/US2011/023157, dated Aug. 5, 2011 (14 pages).
Definition of "capsule" Obtained Nov. 21, 2018; https://www.merriam-webster.com/dictionary/capsul (Year: 2018).
"American Chemical Society—What's New, CO2—Get to Know a Chemical Reaction" (2009) https://www.acs.org/content/dam/acsorg/education/outreach/kidschemistry/chemical-reaction-kids-and-chemistry-kit-teacher-guide.pdf (Year: 2009).

* cited by examiner

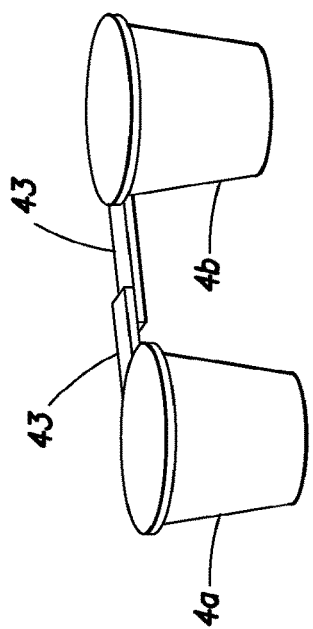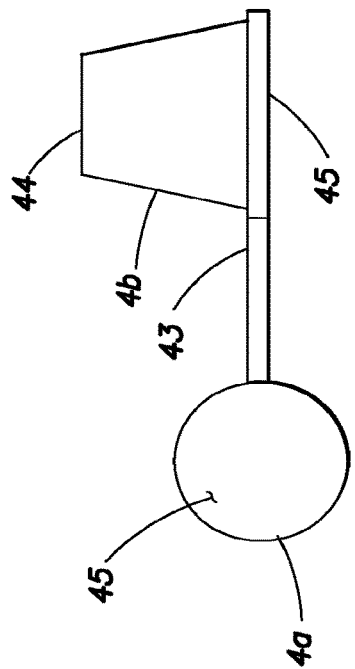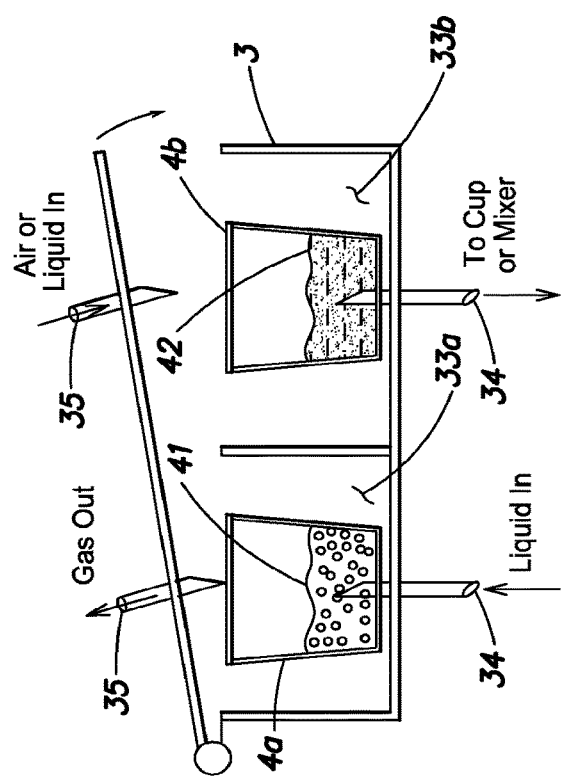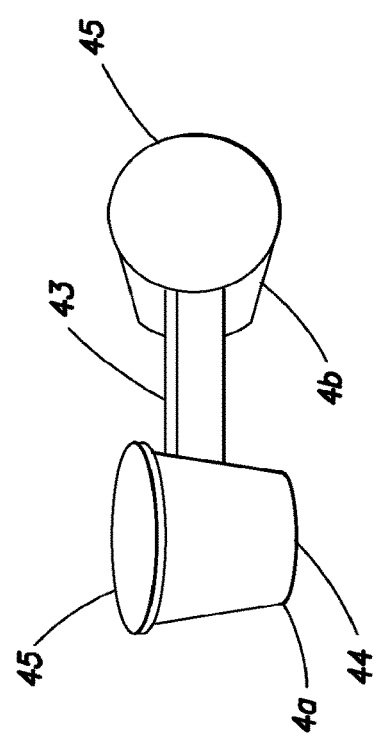

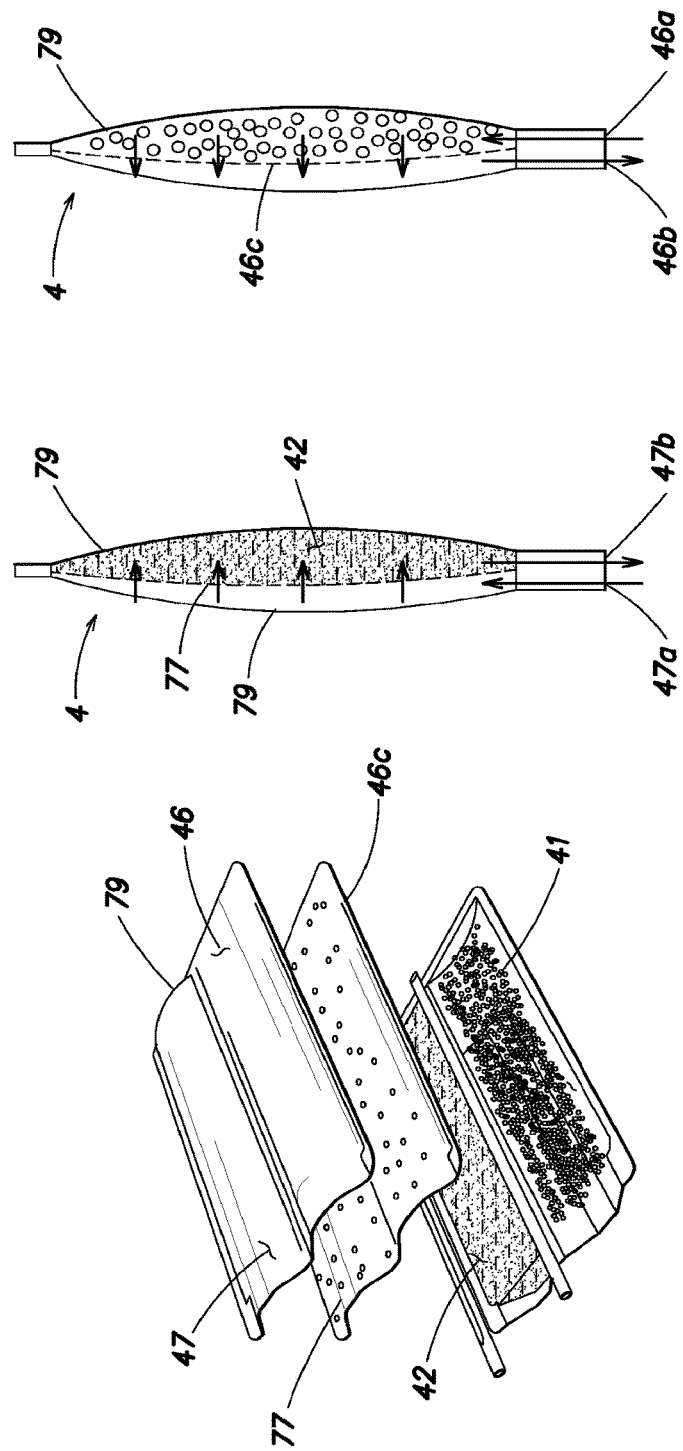
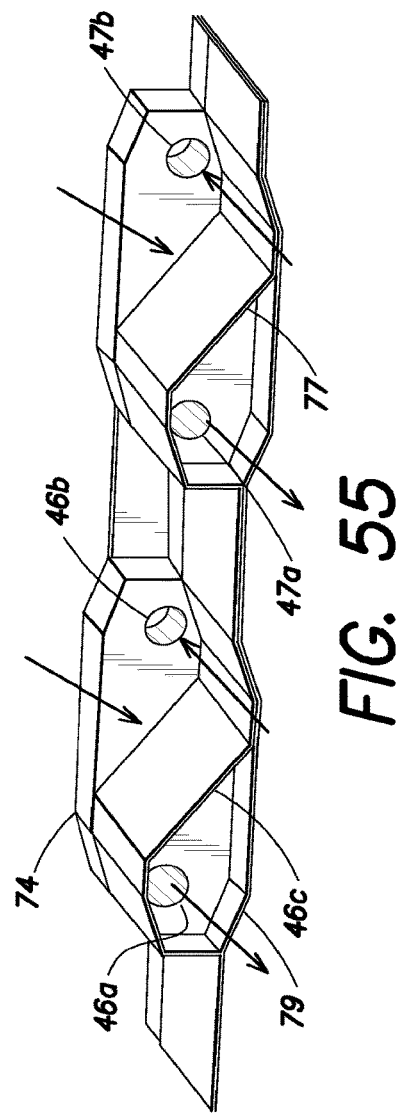
FIG. 54
FIG. 53
FIG. 52
FIG. 55

METHOD AND APPARATUS FOR CARTRIDGE-BASED CARBONATION OF BEVERAGES

CROSS REFERENCE TO RELATED APPLICATIONS

This application is a divisional of U.S. patent application Ser. No. 14/445,571, filed Jul. 29, 2014, which is a continuation of U.S. patent application Ser. No. 13/565,214, filed Aug. 2, 2012, which claims the benefit of U.S. Provisional Application No. 61/514,676, filed Aug. 3, 2011, the contents of each of which is hereby incorporated by reference in its entirety. U.S. patent application Ser. No. 13/565,214 is also a continuation-in-part of U.S. application Ser. No. 13/017,459, filed Jan. 31, 2011, which claims the benefit of U.S. Provisional Application No. 61/337,184, filed Feb. 1, 2010.

BACKGROUND

The inventions described herein relate to dissolving gas in liquids, e.g., carbonation, for use in preparing a beverage. Systems for carbonating liquids and/or mixing liquids with a beverage medium to form a beverage are described in a wide variety of publications, including U.S. Pat. Nos. 4,025,655, 4,040,342; 4,636,337; 6,712,342 and 5,182,084; and PCT Publication WO 2008/124851.

SUMMARY OF INVENTION

Aspects of the invention relate to carbonating or otherwise dissolving a gas in a precursor liquid, such as water, to form a beverage. In some embodiments, a carbon dioxide or other gas source can be provided in a cartridge which is used to generate carbon dioxide or other gas that is dissolved into the precursor liquid. A beverage medium, such as a powdered drink mix or liquid syrup, may be provided in the same, or a separate cartridge as the gas source and mixed with the precursor liquid (either before or after carbonation) to form a beverage. The use of one or more cartridges for the gas source and/or beverage medium may make for an easy to use and mess-free system for making carbonated or other sparkling beverages, e.g., in the consumer's home. (The term "carbonation" or "carbonated" is used herein to generically refer to beverages that have a dissolved gas, and thus refers to a sparkling beverage whether the dissolved gas is carbon dioxide, nitrogen, oxygen, air or other gas. Thus, aspects of the invention are not limited to forming beverages that have a dissolved carbon dioxide content, but rather may include any dissolved gas.)

In one aspect of the invention a beverage making system includes a beverage precursor liquid supply arranged to provide a precursor liquid. The precursor liquid supply may include a reservoir, a pump, one or more conduits, one or more valves, one or more sensors (e.g., to detect a water level in the reservoir), and/or any other suitable components to provide water or other precursor liquid in a way suitable to form a beverage. The system may also include a single cartridge having first and/or second cartridge portions. The first cartridge portion may contain a gas source arranged to emit gas for use in dissolving into the precursor liquid, e.g., for carbonating the precursor liquid, and the second cartridge portion may contain a beverage medium arranged to be mixed with a liquid precursor to form a beverage. The system may include a cartridge interface, such as a chamber that receives and at least partially encloses the cartridge, a connection port arranged to fluidly couple with the cartridge, or other arrangement. A gas dissolution device may be arranged to dissolve gas that is emitted from the first cartridge portion into the precursor liquid, and may include, for example, a membrane contactor, a chamber suitable to hold a liquid under pressure to help dissolve gas in the liquid, a sparger, a sprinkler arranged to introduce water to a pressurized gas environment, or other arrangement. The system may be arranged to mix precursor liquid with the beverage medium, whether before or after gas is dissolved in the liquid, to form a beverage. The beverage medium may be mixed with the liquid in the cartridge, in another portion of the system such as a mixing chamber into which beverage medium from the cartridge is introduced along with precursor liquid, in a user's cup, or elsewhere.

In one aspect of the invention, a beverage making system includes a beverage precursor liquid supply arranged to provide a precursor liquid, and a cartridge chamber arranged to hold first and/or second cartridge portions. The cartridge chamber may have a single cartridge receiving portion for receiving one or more cartridges, or may include a plurality of cartridge receiving portions that are separated from each other, e.g., for receiving two or more cartridges. If multiple receiving portions are provided, they may be opened and closed simultaneously or independently of each other. A first cartridge portion may be provided in the cartridge chamber where the first cartridge portion contains a gas source arranged to emit carbon dioxide or other gas for use in carbonating the precursor liquid. In some embodiments, the gas source may include a charged molecular sieve, such as a zeolite that is in solid form (e.g., pellets) and has adsorbed carbon dioxide or other gas, that releases gas in the presence of water. A second cartridge portion may be provided in the cartridge chamber where the second cartridge portion contains a beverage medium arranged to be mixed with a liquid precursor to form a beverage. The system may be arranged to carbonate the precursor liquid using the gas emitted by the first cartridge portion and to mix the beverage medium of the second cartridge portion with the precursor liquid. The precursor liquid may be carbonated in the first cartridge portion, or in one or more other areas (such as a reservoir or membrane carbonator) to which gas is delivered. Mixing of the precursor liquid with beverage medium may occur before or after carbonation, and may occur in the second cartridge portion or in another location, such as a mixing chamber separate from the second cartridge portion.

The system may include a gas source activating fluid supply arranged to provide fluid to the cartridge chamber for contact with the gas source to cause the gas source to emit gas. For example, the gas activating fluid supply may be arranged to control an amount of fluid (such as water in liquid or vapor form) provided to the cartridge chamber to control an amount of gas produced by the gas source. This may allow the system to control a gas pressure used to carbonate the precursor liquid. Thus, the cartridge chamber may be arranged to hold at least the first cartridge portion in the cartridge chamber under a pressure that is greater than an ambient pressure. Alternately, the first cartridge portion may be arranged to withstand a pressure caused by gas emitted by the gas source without a supporting structure or other enclosure. A gas supply may be arranged to conduct gas emitted by the gas source, under pressure greater than the ambient pressure, to beverage precursor liquid to carbonate the precursor liquid. The gas may be conducted to a carbonation tank, a membrane contactor, or other suitable arrangement for carbonation. For example, the system may include a carbonator that includes a membrane that separates a liquid side from a gas side of the carbonator, where the gas is provided to the gas side and the beverage precursor liquid supply provides precursor liquid to the liquid side such that gas on the gas side is dissolved in the precursor liquid on the liquid side. A pump may move precursor liquid from a reservoir through the carbonator for subsequent discharge as a beverage, or the precursor liquid may be circulated back to the reservoir for one or more additional passes through the carbonator.

In some embodiments, the system may mix the beverage medium with precursor liquid to form a beverage such that none of the beverage contacts the gas source. However, in other embodiments, the precursor liquid may contact the gas source, e.g., where the liquid is passed through the first cartridge portion to be carbonated. The first and second cartridge portions may each be part of respective first and second cartridges that are distinct from each other, or the cartridge portions may be part of a single cartridge. If part of a single cartridge, the first and second cartridge portions may be separated from each other, e.g., by a permeable element such as a filter, or an impermeable element such as a wall of the cartridge that may or may not be frangible, burstable (such as by suitable pressure), piercable or otherwise breached to allow the first and second cartridge portions to communicate with each other. A cartridge associated with the first and second cartridge portions may be pierced or otherwise arranged for fluid communication while in the cartridge chamber to allow access to the first and second portions. For example, if the cartridge portions are in separate cartridges, the two cartridges may be pierced by closing of the cartridge chamber to allow fluid to be provided to and/or gas to exit from the first cartridge portion, and to allow the beverage medium to exit the second cartridge portion whether alone or with a mixed precursor liquid.

In some embodiments, the first and cartridge portions may each have a volume that is less than a volume of carbonated beverage to be formed using the cartridge portions. This can provide a significant advantage by allowing a user to form a relatively large volume beverage using a relative small volume cartridge or cartridges. For example, the system may be arranged to use the first and second cartridge portions over a period of time less than about 120 seconds to form a carbonated liquid having a volume of between 100-1000 ml and a carbonation level of about 1 to 5 volumes. Carbonation may occur at pressures between 20-50 psi, or more. The cartridge portions in this embodiment may have a volume of about 50 ml or less, reducing an amount of waste and/or adding to convenience of the system.

In another aspect of the invention, a method for forming a beverage includes providing first and second cartridge portions to a beverage making machine where the first cartridge portion contains a gas source arranged to emit gas for use in carbonating a liquid, and the second cartridge portion contains a beverage medium arranged to be mixed with a liquid precursor to form a beverage. A fluid, such as water in liquid or vapor form, may be provided to the cartridge chamber to cause the gas source to emit gas, and a precursor liquid may be carbonated by dissolving at least a portion of the gas emitted from the gas source in the precursor liquid. The precursor liquid may be mixed with a beverage medium to produce a beverage, either before or after carbonation.

As noted above, the gas source may be in solid form in the first cartridge portion, e.g., including a charged zeolite. An amount of fluid provided to the first cartridge portion may be controlled to control gas production by the gas source, e.g., to maintain a pressure of gas produced by the gas source to be within a desired range above an ambient pressure. In one embodiment, the gas source includes a charged zeolite, and an amount of fluid provided to the cartridge chamber is controlled so as to cause the charged zeolite to emit gas over a period of at least 30 seconds or more.

Carbonation of the precursor liquid may include providing gas to a reservoir that contains precursor liquid, providing gas to a gas side of a membrane such that gas on the gas side is dissolved in the precursor liquid on a liquid side of the membrane, spraying precursor liquid in a gas-filled space, passing the precursor liquid through the first cartridge portion under pressure, and so on.

As mentioned above, the first and second cartridge portions may each be part of respective first and second cartridges that are distinct from each other, or the cartridge portions may be part of a single cartridge. If part of a single cartridge, the first and second cartridge portions may be separated from each other, e.g., by a cartridge wall. Mixing of the precursor liquid may occur before or after carbonation, and may occur in the second cartridge portion or in another location, such as a mixing chamber separate from the second cartridge portion.

In one embodiment, the steps of providing a fluid and carbonating may be performed over a period of time less than about 120 seconds (e.g., about 60 seconds) and using a gas pressure of 20-50 psi (e.g., above ambient) to form a carbonated liquid having a volume of between 100-1000 ml (e.g., about 500 ml) and a carbonation level of about 2 to 4 volumes (or less or more, such as 1 to 5 volumes). Thus, systems and methods according to this aspect may produce a relatively highly carbonated beverage in a relatively short period of time, and without requiring high pressures.

In another aspect of the invention, a beverage making system includes a beverage precursor liquid supply for providing a precursor liquid, a cartridge chamber or other interface arranged to hold a cartridge, and a cartridge including an internal space containing a gas source. The gas source may be arranged to emit gas for use in carbonating the precursor liquid, e.g., in response to contact with a fluid, such as water or other activating agent. A gas activating fluid supply may be arranged to provide fluid to the cartridge chamber for contact with the gas source to cause the gas source to emit gas, and the activating fluid supply may be arranged to control an amount of fluid provided to the cartridge chamber to control an amount of gas emitted by the gas source, e.g., to control a pressure in the cartridge chamber or other area. A gas supply may be arranged to conduct gas emitted by the gas source, under pressure greater than the ambient pressure, to precursor liquid provided via the beverage precursor liquid supply to carbonate the precursor liquid. The ability to control gas production, and thus pressure, in a relatively simple way of controlling fluid flow into the cartridge chamber, may provide advantages of a simple control and system operation.

The beverage precursor liquid supply may include a reservoir that contains precursor liquid, a carbonator that includes a membrane that separates a liquid side from a gas side of the carbonator, a pump that moves precursor liquid from the reservoir through the carbonator or other portion of the system, one or more filters or other liquid treatment devices, and so on. The cartridge chamber may be arranged to hold the cartridge in the chamber under a pressure that is greater than an ambient pressure, e.g., within a pressure range that is suitable for carbonating the precursor liquid. In some embodiments, gas pressure used for carbonation may be between about 20 and 50 psi, although higher (and lower) pressures are possible.

In another aspect of the invention, a method for forming a beverage includes providing a cartridge having an internal space that is sealed to enclose a gas source in the internal space, providing fluid to the cartridge to cause the gas source to emit gas, controlling an amount of fluid provided to the cartridge over a period of time to control an amount of gas emitted by the gas source during the period of time, and carbonating a precursor liquid by dissolving at least a portion of the gas emitted from the gas source in the precursor liquid. The precursor liquid may be mixed with a beverage medium to produce a beverage, either before or after carbonation, whether in a cartridge or other area. In one embodiment, the cartridge may be pierced using a beverage making machine to provide liquid to the cartridge, while in other embodiments liquid may be provided to the cartridge via a defined port or other arrangement. As with the embodiments above, the liquid may be carbonated in the cartridge or other area, such as a carbonator or reservoir, the cartridge may include a second portion that includes the beverage medium (or a second cartridge may be used with the beverage medium), and so on.

In another aspect of the invention, a method for forming a carbonated beverage includes providing a cartridge having an internal space that is sealed to enclose a gas source in the internal space where the gas source is in solid form, opening the cartridge (such as by piercing) and causing the gas source to emit gas, and carbonating a liquid by dissolving at least a portion of the gas emitted from the gas source in the liquid. The liquid may be mixed with a beverage medium by passing the liquid through a cartridge chamber that contains the beverage medium to produce a beverage. By mixing the liquid with beverage medium in a 30 cartridge, the need for a separate mixing chamber may be avoided, and flavor contamination between consecutively made beverages may be reduced (because the cartridge serves as the mixing chamber and is used only once).

In one embodiment, the cartridge that encloses the gas source also includes the cartridge chamber that contains the beverage medium. For example, liquid may be introduced into a first portion of the cartridge where the gas source is located for carbonation, and pass from the first portion to a second portion where the beverage medium is located. In another embodiment, the cartridge chamber where liquid is mixed with beverage medium may be part of a second cartridge separate from the cartridge that encloses the gas source.

Gas from the cartridge may be routed to an area where the gas is dissolved in the liquid, e.g., to a membrane contactor, a reservoir that holds a substantial portion of the liquid, or other arrangement. A pressure of the gas may be controlled by controlling an amount of fluid provided to the cartridge. As with other aspects of the invention, various embodiments and optional features described herein may be used with this aspect of the invention.

In another aspect of the invention, a kit for forming a beverage includes a first cartridge having an internal space that is sealed and contains a gas source in the internal space. The gas source may be in solid form, or stored in the internal space at pressures below 100 psi, and arranged to emit gas for use in carbonating a precursor liquid. The first cartridge may be arranged to have an inlet through which fluid is provided to activate the gas source and an outlet through which gas exits the first cartridge. For example, the first cartridge may be pierced to form the inlet and outlet, or the first cartridge may have a defined inlet/outlet. A second cartridge of the kit may include an internal space that is sealed and contains a beverage medium for use in mixing with the precursor liquid to form a beverage. The second cartridge may be arranged to mix a precursor liquid with the beverage medium in the second cartridge, and thus may be pierceable or otherwise arranged to allow inlet of liquid and outlet of mixed liquid/beverage medium. The first and second cartridges may each have a volume that is less than a volume of beverage to be formed using the first and second cartridges, e.g., the cartridge may have a volume of about 50 ml and be used to make a beverage having a volume of about 500 ml. The first and second cartridges may be joined together, e.g., such that the cartridges cannot be separated from each other, without use of tools, without damaging at least a portion of the first or second cartridge. In one embodiment, the first and second cartridges may be joined by a welded joint or by interlocking mechanical fasteners.

In another aspect of the invention, a cartridge for forming a beverage includes a container having an internal space that is sealed and contains a gas source in the internal space. The gas source may be in solid form (such as a charged zeolite or other molecular sieve) and arranged to emit gas for use in carbonating a precursor liquid. In one arrangement, the gas or other gas source may be stored in a sealed space in the cartridge for an extended period at a pressure of less than about 100 psi prior to the sealed space being opened. Thus, the cartridge need not necessarily be capable of withstanding high pressures to store the gas source. The container may be arranged to have an inlet through which fluid is provided to activate the gas source and an outlet through which gas exits the container for use in carbonating the precursor liquid. In one embodiment, the container may be pierceable by a beverage making machine to form the inlet and to form the outlet, e.g., at the top, bottom, side and/or other locations of the cartridge. In one arrangement, the container may include a lid that is pierceable by a beverage machine to form both the inlet and outlet. The container may have at least one portion that is semi-rigid or flexible, e.g., that is not suitable to withstand a pressure over about 80 psi inside the cartridge without physical support. The container may include a second chamber that contains a beverage medium for use in flavoring the precursor liquid to form a beverage, and the second chamber may be isolated from a first chamber in which the gas source is contained. The container may have a volume that is less than a volume of carbonated beverage to be formed using the cartridge.

In another aspect of the invention, a beverage making system includes a cartridge chamber arranged to hold a cartridge under a pressure that is greater than an ambient pressure, and a cartridge including an internal space containing a gas source arranged to emit gas for use in carbonating a liquid. The cartridge may have a volume that is less than a volume of beverage to be created using the cartridge, e.g., a volume of 50 ml or less for use in carbonating a volume of liquid of about 100-1000 ml to a carbonation level of at least about 1 to 4 volumes. A beverage precursor liquid supply may provide precursor liquid into the internal space of the cartridge to cause the gas source to emit gas and cause at least some of the gas to be dissolved in the precursor liquid while in the internal space. Carbonating the liquid in a cartridge chamber can simplify system operation, e.g., by eliminating the need for carbonation tanks or other carbonators. Instead, the cartridge may function as a carbonator, at least in part. In one embodiment, the cartridge includes a second chamber that contains a beverage medium for use in mixing with the precursor liquid to form a beverage. The second chamber may be isolated from a first chamber in which the gas source is contained, or the first and second chamber may communicate, e.g., liquid may be introduced into the first chamber to be carbonated and pass from the first chamber to the second chamber where the beverage medium is located.

In another aspect of the invention, a method for forming a beverage includes providing a cartridge having an internal space that is sealed to enclose a gas source in the internal space where the cartridge has a volume that is less than a volume of beverage to be created using the cartridge. Liquid may be provided into the cartridge to cause the gas source to emit gas, and the liquid may be carbonated by dissolving at least a portion of the gas emitted from the gas source in the liquid while the liquid is in the cartridge. The liquid may be mixed with a beverage medium to produce a beverage, either before or after carbonation in the cartridge. In fact, the cartridge may include a second chamber that contains a beverage medium for use in mixing with the precursor liquid to form a beverage, and the cartridge may have a volume that is less than a beverage to be made using the cartridge. The cartridge may be pierced using a beverage making machine to form an inlet and an outlet.

In another aspect of the invention, a beverage making system includes a beverage precursor liquid supply, a cartridge chamber or other interface arranged to hold a cartridge in a chamber, and a cartridge including an internal space containing a gas source that is in solid form and is arranged to emit gas for use in carbonating a liquid. A gas activating fluid supply may provide liquid to the cartridge for contact with the gas source to cause the gas source to emit gas. The system may also include a carbonator that has a membrane that separates a liquid side from a gas side, where the gas emitted by the cartridge is provided to the gas side and the beverage precursor liquid supply provides precursor liquid to the liquid side such that gas on the gas side is dissolved in the precursor liquid on the liquid side. The cartridge interface may be arranged to hold the cartridge in the chamber under a pressure that is greater than an ambient pressure, e.g., within a pressure range used to carbonate the liquid in the carbonator. A gas supply may be arranged to conduct gas emitted by the gas source, under pressure greater than the ambient pressure, from the cartridge chamber to the gas side of the carbonator. The membrane of the carbonator may include a plurality of hollow fibers where an interior of the hollow fibers is part of the liquid side and an exterior of the hollow fibers is part of the gas side.

In another aspect of the invention, a method for forming a beverage includes providing a cartridge having an internal space that is sealed to enclose a gas source in the internal space that is in solid form and arranged to emit gas, opening or otherwise accessing the cartridge (such as by piercing) and causing the cartridge to emit gas, and carbonating the liquid by dissolving at least a portion of the gas emitted from the gas source in a liquid. The gas may be located on a gas side of a membrane and the liquid being located on a liquid side of the membrane. The membrane may be formed by a plurality of hollow fibers where the liquid side is located at an interior of the fibers and the gas side is at an exterior of the fibers. A gas pressure at the gas side may be controlled based on controlling an amount of liquid provided to the cartridge.

In another embodiment, a cartridge for use by a beverage making machine in forming a beverage includes first and second portions that are attached together and separated by an impermeable barrier, such as a lid or other container part of the first and/or second portion. The first portion may contain a gas source for emitting a gas to be dissolved in a beverage precursor liquid, and the second portion may contain a beverage medium for mixing with a precursor liquid to form a beverage. The first and second portions may be arranged with respect to each other so that the cartridge has a plane where the first portion is located below the plane and the second portion is located above the plane. For example, the second portion may be stacked on top of the first portion, e.g., with lids of the first and second portions located adjacent each other.

In one illustrative embodiment, a cartridge for use by a beverage making machine in forming a beverage includes a container with first and second portions that are attached together and separated by an impermeable barrier, such as a foil lid used to close a container part of the first and/or second portion. The first portion may contain a gas source for emitting a gas to be dissolved in a beverage precursor liquid, and the second portion may contain a beverage medium for mixing with a precursor liquid to form a beverage. The second portion may include a wall, such as a lid, a sidewall of a container part, a bottom of a container part, a wall of a bag, etc., that is movable to force beverage medium to exit the second portion for mixing with precursor liquid. The wall may be movable in any suitable way, such as by air or other gas pressure, a plunger, piston or other item contacting and moving the wall, and so on.

In the embodiments above, the first portion may have an inlet through which fluid is provided to activate the gas source (e.g., a lid or other part of the first portion may be pierced to form an inlet opening) and an outlet through which gas exits the first portion for dissolving in the precursor liquid (e.g., a lid or other part of the first portion may be pierced to form an outlet opening). The inlet and outlet may be located on a same side of the first portion, such as a top of the first portion. In one arrangement, the first portion may include a surface arranged to accommodate piercing to form an inlet through which fluid is provided to activate the gas source, and the first portion may be attached to the second portion such that the surface is unexposed. For example, the second portion may be attached to the first portion so that the piercable part of the first portion is covered by the second portion. This arrangement may help reduce the likelihood that the surface is prematurely pierced, e.g., pierced by accident prior to the cartridge being associated with a beverage making machine. The second portion may have an outlet through which the beverage medium exits the container for mixing with the precursor liquid, e.g., a part of the second portion may be pierced to form an opening for beverage medium exit, the second portion may have a frangible seal or other element that opens to release beverage medium, etc.

In one embodiment, the movable wall defines, at least in part, the first portion of the cartridge. For example, the first portion may be defined at least in part by a first chamber wall, and the second portion may be defined at least in part by a second chamber wall that defines a second space. The first chamber wall may be received into the second space, e.g., like a plunger, and be movable relative to the second chamber wall to expel beverage medium from the second portion of the cartridge. In some embodiments, the wall may include a layer of barrier material, such as a metal foil, a metal foil/polymer laminate, a layer of plastic material, etc. For example, the second portion may be defined by a capsule formed by a layer a metal foil material, such as a sheet aluminum. The layer of barrier material may be arranged to open (e.g., by bursting or piercing) and allow beverage medium to exit the second portion when a force is applied to the barrier material. For example, the cartridge may include a piercing element that opens the second portion when a force is applied to the barrier material. In another embodiment, the wall includes corrugations and a frangible outlet that is openable based on pressure inside the second portion. The wall may be pressed so that the corrugations collapse, e.g., in a staged or sequential fashion, to force beverage medium through the outlet, which may include a burstable seal formed by a weakened portion of the wall (e.g., by scoring, partial perforation, etc.). Like the second portion, the first portion may be defined by a capsule formed by a layer of barrier material, and the first and second portions may be attached together, e.g., by crimping rims or edges of the barrier material together.

The first and second portions may be sealed from an exterior environment and the first portion may contain a carbon dioxide source in solid form (such as a charged zeolite) arranged to emit carbon dioxide gas for use in mixing with a beverage precursor liquid to form a beverage. In one embodiment, a pressure in the first portion prior to breaking a seal of the first portion to expose the gas source may be relatively low, e.g., less than 100 psi. However, the gas source may be arranged to emit gas suitable for forming a carbonated beverage having a volume of between 100-1000 ml and a carbonation level of about 1 to 5.

These and other aspects of the invention will be apparent from the following description and claims.

BRIEF DESCRIPTION OF THE DRAWINGS

Aspects of the invention are described with reference to the following drawings in which like numerals reference like elements, and wherein:

FIG. 5 shows an illustrative embodiment of a cartridge chamber;

FIG. 6 shows an illustrative embodiment of gas and beverage medium cartridges joined together;

FIGS. 7 and 8 shown perspective and top views, respectively, of gas and beverage medium cartridges;

FIG. 52 shows an exploded view of another embodiment of a cartridge having a filter;

FIGS. 53 and 54 show cross sectional views of the second portion and the first portion, respectively of the FIG. 52 embodiment;

FIG. 55 shows a cut away perspective view of an insert end of the cartridge of FIG. 52;

DETAILED DESCRIPTION

Figure 1:
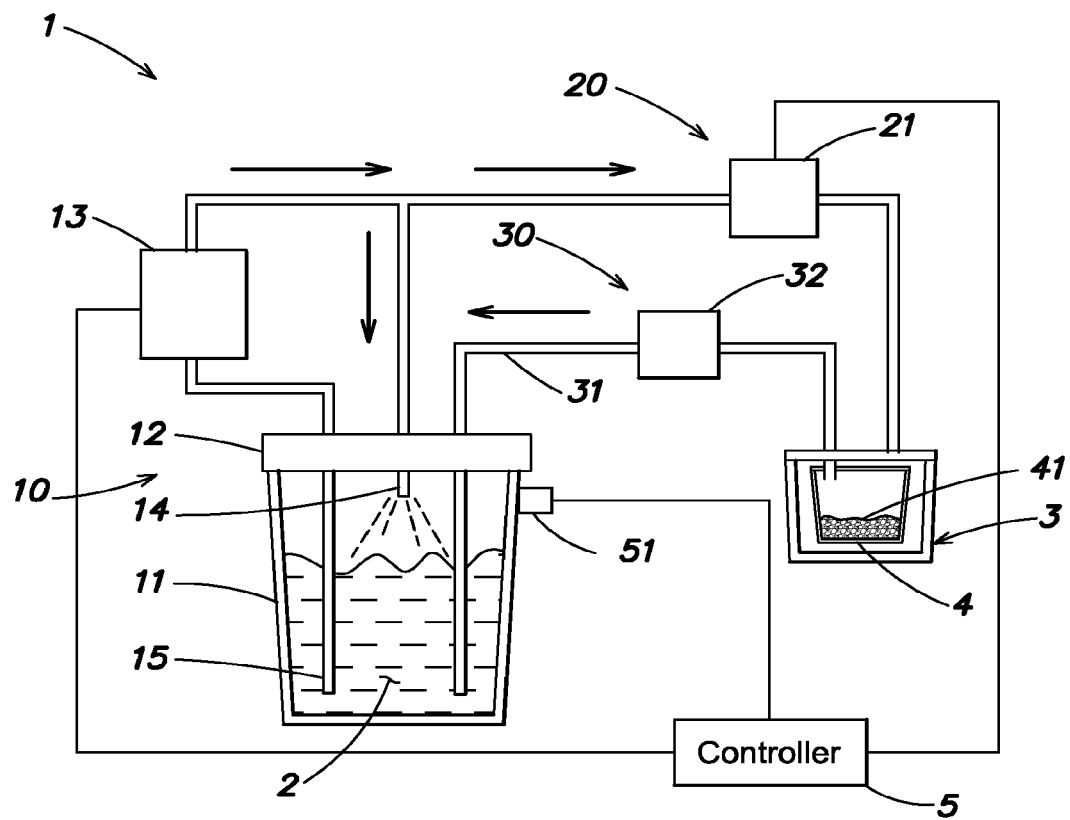
FIG. 1 shows a illustrative embodiment of a beverage making system having a removable reservoir.

It should be understood that aspects of the invention are described herein with reference to the figures, which show illustrative embodiments. The illustrative embodiments described herein are not necessarily intended to show all embodiments in accordance with the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

In accordance with one aspect of the invention, a fluid (such as water, water vapor, or other) may be provided to a carbon dioxide or other gas source in a cartridge so as to cause the gas source to emit gas that is used to carbonate or otherwise for dissolution in a liquid. In one embodiment, beverage making machine may include a gas activating fluid supply arranged to provide fluid to a cartridge chamber for contact with the gas source so as to cause the gas source to emit gas. In other arrangements, the gas source may be caused to release gas in other ways, such as by heating, exposing the source to microwaves or other electromagnetic radiation, etc. A gas supply of the machine may be arranged to conduct gas emitted by the gas source, under pressure greater than the ambient pressure, to a precursor liquid to carbonate the precursor liquid. In some embodiments, the gas source may be in solid form, such as a zeolite, activated carbon or other molecular sieve that is charged with carbon dioxide or other gas, and the use of a cartridge may not only isolate the gas source from activating agents (such as water vapor in the case of a charged zeolite), but also potentially eliminate the need for a user to touch or otherwise directly handle the carbon dioxide source.

Having a gas activating fluid supply may enable the use of another aspect of the invention, i.e., a volume or other measure of the fluid provided to the cartridge may be controlled to control the rate or amount of gas that produced by the gas source. This feature can make the use of some gas sources, such as a charged zeolite material, possible without requiring gas storage or high pressure components. For example, zeolites charged with carbon dioxide tend to release carbon dioxide very rapidly and in relatively large quantities (e.g., a 30 gram mass of charged zeolite can easily produce 1-2 liters of carbon dioxide gas at atmospheric pressure in a few seconds in the presence of less than 30-50 ml of water). This rapid release can in some circumstances make the use of zeolites impractical for producing relatively highly carbonated liquids, such as a carbonated water that is carbonated to a level of 2 volumes or more. (A carbonation "volume" refers to the number of volume measures of carbon dioxide gas that is dissolved in a given volume measure of liquid. For example, a 1 liter amount of "2 volume" carbonated water includes a 1 liter volume of water that has 2 liters of carbon dioxide gas dissolved in it. Similarly, a 1 liter amount of "4 volume" carbonated water includes a 1 liter volume of water that has 4 liters of carbon dioxide dissolved in it. The gas volume measure is the gas volume that could be released from the carbonated liquid at atmospheric or ambient pressure and room temperature.) That is, dissolution of carbon dioxide or other gases in liquids typically takes a certain amount of time, and the rate of dissolution can only be increased a limited amount under less than extreme conditions, such as pressures within about 150 psi of ambient and temperatures within about +/−40 to 50 degrees C. of room temperature. By controlling the rate of carbon dioxide (or other gas) production for a carbon dioxide (or other gas) source, the total time over which the carbon dioxide (or other gas) source emits carbon dioxide (or other gas) can be extended, allowing time for the carbon dioxide (gas) to be dissolved without requiring relatively high pressures. For example, when employing one illustrative embodiment incorporating one or more aspects of the invention, the inventors have produced liquids having at least up to about 3.5 volume carbonation levels in less than 60 seconds, at pressures under about 40 psi, and at temperatures around 0 degrees Celsius. This capability allows for a carbonated beverage machine to operate at relatively modest temperatures and pressures, potentially eliminating the need for relatively expensive high pressure tanks, conduits and other components, as well as extensive pressure releases, containment structures and other safety features that might otherwise be required, particularly for a machine to be used in the consumer's home. Of course, as discussed above and elsewhere herein, aspects of the invention are not limited to use with carbon dioxide, and instead any suitable gas may be dissolved in a liquid in accordance with all aspects of this disclosure.

In another aspect of the invention, a portion of a precursor liquid that is used to form a beverage may be used to activate the gas source. This feature may help simplify operation of a beverage making machine, e.g., by eliminating the need for special activation substances. As a result, a beverage making machine, or a method of forming a sparkling beverage, may be made less expensively and/or without special purpose ingredients. For example, in the case of a machine making carbonated water, all that is needed to activate the carbon dioxide source may be a portion of the water used to form the beverage. It should be understood, however, that other aspects of the invention need not require the use of a portion of precursor liquid to activate a carbon dioxide source, and instead may use any suitable activating agent, such as a citric acid in aqueous form that is added to a bicarbonate material, heat, microwave or other electromagnetic radiation used to activate a zeolite source, and others. For example, the cartridge that includes the carbon dioxide source may include (as part of the source), an activating agent whose addition to another component of the carbon dioxide source is controlled to control carbon dioxide production.

FIG. 1 shows one illustrative embodiment that incorporates at least the aspects of providing a fluid to a cartridge and/or cartridge chamber to activate a gas source, as well as controlling the fluid flow to control gas production, and the use of a portion of beverage precursor liquid to activate a gas source. The beverage making system 1 of FIG. 1 includes a beverage precursor liquid 2 that is contained in a reservoir 11. The beverage precursor liquid 2 can be any suitable liquid, including water (e.g., flavored or otherwise treated water, such as sweetened, filtered, deionized, softened, carbonated, etc.), or any other suitable liquid used to form a beverage, such as milk, juice, coffee, tea, etc. (whether heated or cooled relative to room temperature or not). The reservoir 11 is part of a beverage precursor supply 10, which also includes a lid 12 that engages with the reservoir 11 to form a sealed enclosure, a pump 13 to circulate the precursor liquid 2, and a nozzle, showerhead or other component 14 that serves to disperse the precursor liquid 2 in a headspace in the reservoir 11. Of course, the precursor supply 10 may be arranged in other ways, e.g., to include additional or different components. For example, the reservoir 11 and lid 12 may be replaced with a closed tank that has suitable inlet/outlet ports, the pump 13 and/or nozzle 14 may be eliminated, and or other changes.

In this embodiment, the reservoir 11 is initially provided with the precursor liquid 2 by a user, who provides the liquid 2 in the reservoir 11, e.g., from a water tap or other source. The user may also provide ice or other cooling medium in the reservoir 11 as desired, so as to cool the ultimate beverage made. In other embodiments, the system 1 may include a refrigeration system or other cooling system (such as that found in refrigerators, air conditioning units, thermoelectric cooling units, or other devices used to remove heat from a material) to cool the liquid 2 whether before, during and/or after carbonation. In some arrangements, cooling the precursor liquid 2 may help the carbonation process, e.g., because cooler liquids tend to dissolve carbon dioxide or other gas more rapidly and/or are capable of dissolving larger amounts of gas. However, in one aspect of the invention, a carbonated liquid may be cooled after the carbonation process is complete, e.g., just before discharge using a flow through chiller. This feature may allow the system 1 to chill only the beverage, and not other portions of the system, such as the reservoir 11, carbonator, pump, etc., reducing the heat output by the system 1. Although a user initially provides the beverage precursor liquid 2 in the reservoir 11, the precursor supply 10 may include other components to provide liquid 2 to the reservoir 11, such as a plumbed water line, controllable valve, and liquid level sensor to automatically fill the reservoir 11 to a desired level, a second water reservoir or other tank that is fluidly connected to the reservoir 11 (e.g., such as a removable water tank found with some coffee making machines along with a pump and conduit to route water from the removable tank to the reservoir 11), and other arrangements.

The beverage making system 1 also includes a carbon dioxide activating fluid supply 20 that provides a fluid to a cartridge 4 so as to activate a carbon dioxide source 41 to release carbon dioxide gas. In this embodiment, the carbon dioxide source 41 is located in a portion of the cartridge 4 and includes a charged adsorbent or molecular sieve, e.g., a zeolite material that has adsorbed some amount of carbon dioxide gas that is released in the presence of water, whether in vapor or liquid form. Of course, other carbon dioxide source materials may be used, such as charcoal or other molecular sieve materials, carbon nanotubes, metal organic frameworks, covalent organic frameworks, porous polymers, or source materials that generate carbon dioxide by chemical means, such as sodium bicarbonate and citric acid (with the addition of water if the bicarbonate and acid are initially in dry form), or others. In addition, aspects of the invention are not necessarily limited to use with carbon dioxide gas, but may be used with any suitable gas, such as nitrogen, which is dissolved in some beers or other beverages, oxygen, air, and others. Thus, reference to "carbonation", "carbon dioxide source" "carbon dioxide activating fluid supply", etc., should not be interpreted as limiting aspects of the invention and/or any embodiments to use with carbon dioxide only. Instead, aspects of the invention may be used with any suitable gas. In one embodiment, the charged adsorbent is a zeolite such as analcime, chabazite, clinoptilolite, heulandite, natrolite, phillipsite, or stilbite. The zeolite may be naturally occurring or synthetic, and may be capable of holding up to about 20% carbon dioxide by weight or more. The zeolite material may be arranged in any suitable form, such as a solid block (e.g., in disc form), particles of spherical, cubic, irregular or other suitable shape, and others. An arrangement that allows the zeolite to flow or be flowable, e.g., spherical particles, may be useful for packaging the zeolite in individual cartridges. Such an arrangement may allow the zeolite to flow from a hopper into a cartridge container, for example, simplifying the manufacturing process. The surface area of the zeolite particles may also be arranged to help control the rate at which the zeolite releases carbon dioxide gas, since higher surface area measures typically increase the gas production rate. Generally, zeolite materials will release adsorbed carbon dioxide in the presence of water in liquid or vapor form, allowing the zeolite to be activated to release carbon dioxide gas by the addition of liquid water to the zeolite.

The carbon dioxide activating fluid supply 20 in this embodiment includes a conduit that is fluidly coupled to the pump 13 and a valve 21 that can be controlled to open/close or otherwise control the flow of precursor liquid 2 into the cartridge 4. As can be seen, circulation of the liquid 2 by the pump 13 can allow the activating fluid supply 20 to divert some (e.g., a first portion) of the precursor liquid 2 to the cartridge chamber 3 to cause the creation of carbon dioxide gas, e.g., by opening the valve 21. Other arrangements or additions are possible for the carbon dioxide activating fluid supply 20, such as a suitably sized orifice in the conduit leading from the pump 13 outlet to the cartridge 4, a pressure-reducing element in the conduit, a flow-restrictor in the conduit, a flow meter to indicate an amount and/or flow rate of liquid into the cartridge 4, and so on. In addition the liquid source 20 need not use precursor liquid 2 to activate the carbon dioxide source 41, but instead may use a dedicated source of fluid for activation. For example, the carbon dioxide activating fluid supply 20 may include a syringe, piston pump or other positive displacement device that can meter desired amounts of liquid (whether water, citric acid or other material) that are delivered to the cartridge 4. In another embodiment, the activating fluid supply 20 may include a gravity fed liquid supply that has a controllable delivery rate, e.g., like the drip-type liquid supply systems used with intravenous lines for providing liquids to hospital patients, or may spray atomized water or other liquid to provide a water vapor or other gas phase activating fluid to the cartridge 4. Moreover, although FIG. 1 suggests that the activating fluid supply 20 provides liquid to a top of the cartridge 4, the liquid source 20 may provide the fluid to a bottom of the cartridge 4, e.g., to flood the bottom of the cartridge, or other suitable location. It is also conceivable that an activating liquid can be provided in the cartridge with the carbon dioxide source 42, e.g., in a chamber that is pierced to allow contact of the liquid with the source 42.

In accordance with one embodiment, the cartridge 4 (having one or more portions) may be located in a cartridge chamber 3 during carbon dioxide production. As a result, the cartridge 4 may be made of a relatively flexible material or otherwise constructed so that the cartridge 4 cannot withstand a relatively high pressure gradient between the interior and exterior of the cartridge 4. That is, the cartridge chamber 3 may contain any pressure generated by the carbon dioxide source 41 and support the cartridge 4 as necessary. In this illustrative embodiment, the cartridge 4 is contained in a closed and sealed chamber 3 that has a space or gap surrounding all or most of the cartridge 4. The pressure between the interior space of the cartridge 4 and the exterior of the cartridge 4 is allowed to equalize, e.g., by allowing some of the gas emitted by the carbon dioxide source 41 to "leak" into the space around the cartridge 4, and so even if the cartridge 4 is made of a relatively semi-rigid, flexible or weak material, the cartridge 4 will not burst or collapse. In alternate arrangements, the cartridge 4 may be made to fit a receiving space in the cartridge chamber 3 so that the chamber 3 supports the cartridge 4 when pressure is built up inside the cartridge 4. This support may be suitable to prevent the cartridge 4 from bursting or otherwise preventing the cartridge 4 from functioning as desired. In yet other embodiments, the cartridge 4 may be made suitably robust (either in whole or in part) so as to withstand relatively high pressures (e.g., 1 atm or more) in the cartridge interior space. In such a case, the cartridge chamber 3 need not function as much more than a physical support to hold the cartridge 4 in place or otherwise establish a connection to the cartridge for gas output by the cartridge 4 and/or liquid supply to the cartridge 4. For example, the cartridge chamber 3 in such an arrangement may simply include a connection port that serves to fluidly and physically couple the cartridge 4 to the system 1. Thus, in some embodiments, the cartridge may be mechanically robust enough to withstand pressures up to 90 psig, e.g., like a conventional carbonated soft drink can, and be fluidly coupled to the system 1, but without receiving physical support from the system 1 (e.g., the cartridge may be exposed and not enclosed by walls of a chamber) to prevent the cartridge 4 from bursting during use.

A carbon dioxide gas supply 30 may be arranged to provide carbon dioxide gas from the cartridge chamber 3 to an area where the gas is used to carbonate the liquid 2. The gas supply 30 may be arranged in any suitable way, and in this illustrative embodiment includes a conduit 31 that is fluidly connected between the cartridge chamber 3 and the reservoir 11, and a filter 32 that helps to remove materials that may contaminate the precursor liquid 2, such as particles from the carbon dioxide source 41. The gas supply 30 may include other components, such as pressure regulators, safety valves, control valves, a compressor or pump (e.g., to increase a pressure of the gas), an accumulator (e.g., to help maintain a relatively constant gas pressure and/or store gas), and so on. (The use of an accumulator or similar gas storage device may obviate the need to control the rate of gas output by a cartridge. Instead, the gas source may be permitted to emit gas in an uncontrolled manner, with the emitted gas being stored in an accumulator for later delivery and use in producing a sparkling beverage. Gas released from the accumulator could be released in a controlled manner, e.g., at a controlled pressure and/or flow rate.) In this embodiment, the conduit 31 extends below the surface of the precursor liquid 2 in the reservoir 11 so that the carbon dioxide gas is injected into the liquid 2 for dissolution. The conduit 31 may include a sparging nozzle or other arrangement to aid in dissolution, e.g., by creating relatively small gas bubbles in the liquid 2 to increase the dissolution rate. Alternately, the conduit 31 may deliver the gas to a headspace (if present) in the reservoir 11 rather than below the surface of the liquid 2.

Carbonation of the precursor liquid 2 may occur via one or more mechanisms or processes, and thus is not limited to one particular process. For example, while carbon dioxide gas delivered by the conduit 31 to the reservoir 11 may function to help dissolve carbon dioxide in the liquid 2, other system components may further aid in the carbonation process. In this illustrative embodiment, the precursor supply 10 may assist in carbonating the liquid by circulating the liquid via the pump 13 and the nozzle 14. That is, liquid 2 may be drawn from the reservoir 13 via a dip tube 15 and sprayed by the nozzle 14 into a carbon dioxide-filled headspace in the reservoir 11. As is known in the art, this process can help the liquid 2 to dissolve carbon dioxide gas, e.g., by increasing the surface area of liquid 2 exposed to gas. While in this embodiment the dip tube 15 is separate from the reservoir 11 and extends below the surface of the precursor liquid 2, the dip tube 15 may be arranged in other ways, such as being made integrally with the wall of the reservoir 11. If the dip tube 15 is made integrally with the reservoir 11, connecting the reservoir 11 to the lid 12 may establish a fluid connection between the dip tube 15 and the pump 13. Forming the dip tube 15 integrally with the reservoir 11 may allow the system 1 to accommodate differently sized (and thus different volume) reservoirs 11. In addition, this arrangement may help ensure that only suitably configured reservoirs 11 (e.g., a container arranged to withstand system pressures) is used. Alternately, the dip tube 15 could be made flexible or otherwise accommodate reservoirs 11 having a different height. Whether integral with the reservoir 11 or not, the dip tube 15 may include a filter, strainer or other arrangement to help prevent small particles, such as ice chips, from being drawn into the pump 13. In some embodiments, the reservoirs 11 can function as a drinking glass as well as a reservoir 11 in the system 1. That is, a user may provide a reservoir/drinking glass 11 to the system 1 (e.g., including a desired amount of water, ice and/or beverage medium), and after carbonation is complete, use the reservoir/drinking glass 11 to enjoy the beverage. The reservoir 11 may be insulated, e.g., to help keep a beverage cold, as well as made to withstand suitable pressures experienced in use with the system 1.

The various components of the system 1 may be controlled by a controller 5, which may include a programmed general purpose computer and/or other data processing device along with suitable software or other operating instructions, one or more memories (including non-transient storage media that may store software and/or other operating instructions), a power supply for the controller 5 and/or other system components, temperature and liquid level sensors, pressure sensors, RFID interrogation devices, input/output interfaces (e.g., to display information to a user and/or receive input from a user), communication buses or other links, a display, switches, relays, triacs, motors, mechanical linkages and/or actuators, or other components necessary to perform desired input/output or other functions. In this illustrative embodiment, the controller 5 controls the operation of the valve 21 of the activating fluid supply 20 as well as the pump 13 of the precursor liquid supply 10. Also shown in FIG. 1 is a sensor 51, which may represent one or more sensors used by the controller 5. For example, the sensor 51 may include a temperature sensor that detects the temperature of the precursor liquid in the reservoir 11. This information may be used to control system operation, e.g., warmer precursor liquid temperatures may cause the controller 5 to increase an amount of time allowed for carbon dioxide gas to be dissolved in the precursor liquid 2. In other arrangements, the temperature of the precursor liquid 2 may be used to determine whether the system 1 will be operated to carbonate the liquid 2 or not. For example, in some arrangements, the user may be required to add suitably cold liquid 2 (and/or ice) to the reservoir 11 before the system 1 will operate. (As discussed above, relatively warm precursor liquid 2 temperatures may cause the liquid to be insufficiently carbonated in some conditions.) In another embodiment, the sensor 51 may include a pressure sensor used to detect a pressure in the reservoir 11. This information may be used to determine whether the reservoir 11 is improperly sealed to the lid 12 or another pressure leak is present, and/or to determine whether sufficient carbon dioxide gas is being produced by the cartridge 4. For example, low detected pressure may cause the controller 5 to allow more liquid to be delivered by the activating fluid supply 20 to the cartridge 4, or prompt the user to check that the reservoir 11 is properly engaged with the lid 12. Likewise, high pressures may cause the flow of liquid from the activating fluid supply 20 to be slowed or stopped. Thus, the controller 5 can control the gas pressure in the reservoir 11 and/or other areas of the system 1 by controlling an amount of liquid delivered to the cartridge 4 and/or the cartridge chamber 3. The sensor 51 may alternately, or additionally, detect that the reservoir 11 is in place, and/or whether the reservoir 11 is properly engaged with the lid 12. For example, a switch may be closed when the reservoir 11 is properly seated on a seal of the lid 12, indicating proper engagement. In another arrangement, the reservoir 11 may include an RFID tag or other electronic device that is capable of communicating its identity or other characteristics of the reservoir 11 to the controller 5. This information may be used to confirm whether the reservoir 11 is suitable for use with the system 1, to control certain operating conditions (e.g., an operating pressure may be limited based on the type of reservoir used, the precursor liquid may be carbonated to a level that corresponds to the reservoir 11, and so on), and/or for other uses. The sensor 51 could also detect the presence of a cartridge 4 in the chamber 3, e.g., via RFID tag, optical recognition, physical sensing, etc. If no cartridge 4 is detected, or the controller 5 detects that the cartridge 4 is spent, the controller 5 may prompt the user to insert a new or different cartridge 4. For example, in some embodiments, a single cartridge 4 may be used to carbonate multiple volumes of precursor liquid 2. The controller 5 may keep track of the number of times that the cartridge 4 has been used, and once a limit has been reached (e.g., 10 drinks), prompt the user to replace the cartridge. Other parameters may be detected by the sensor 51, such as a carbonation level of the precursor liquid 2 (which may be used to control the carbonation process), the presence of a suitable vessel to receive a beverage discharged from the system 1 (e.g., to prevent beverage from being spilled), the presence of water or other precursor liquid 2 in the reservoir 11 or elsewhere in the precursor supply 10, a flow rate of liquid in the pump 13 or associated conduit, the presence of a headspace in the reservoir 11 (e.g., if no headspace is desired, a valve may be activated to discharge the headspace gas, or if only carbon dioxide is desired to be in the headspace, a snifting valve may be activated to discharge air in the headspace and replace the air with carbon dioxide), and so on.

The controller 5 may also be arranged to allow a user to define a level of carbonation (i.e., amount of dissolved gas in the beverage, whether carbon dioxide or other). For example, the controller 5 may include a touch screen display or other user interface that allows the user to define a desired carbonation level, such as by allowing the user to select a carbonation volume level of 1, 2, 3, 4 or 5, or selecting one of a low, medium or high carbonation level. All cartridges used by the system 1 may include sufficient gas source material to make the highest level of carbonation selectable, but the controller 5 may control the system to dissolve an amount of gas in the beverage that is consistent with the selected level. For example, while all cartridges may be arranged for use in creating a "high" carbonation beverage, the controller 5 may operate the system 1 to use less of the available gas (or cause the gas source to emit less gas than possible) in carbonating the beverage. Carbonation levels may be controlled based on a detected carbonation level by a sensor 51, a detected pressure in the reservoir or elsewhere, an amount of gas output by the cartridge 4, or other features. In another embodiment, the cartridge 4 may include indicia readably by the controller, e.g., an RFID tag, barcode, alphanumeric string, etc., that indicates a carbonation level to be used for the beverage. After determining the carbonation level from the cartridge 4, the controller 5 may control the system 1 accordingly. Thus, a user need not select the carbonation level by interacting with the system 1, but rather a carbonation level may be automatically adjusted based on the beverage selected. In yet another embodiment, a user may be able to select a gas source cartridge 4 that matches a carbonation level the user desires. (Different carbonation levels may be provided in the different cartridges by having different amounts of gas source in the cartridge 4.) For example, cartridges providing low, medium and high carbonation levels may be provided for selection by a user, and the user may pick the cartridge that matches the desired carbonation level, and provide the selected cartridge to the system 1. Thus, a gas source cartridge labeled "low" may be chosen and used with the system to create a low level carbonated beverage.

A user may alternately be permitted to define characteristics of a beverage to be made by interacting in some way with a cartridge 4 to be used by the system 1. For example, tab, notch or other physical feature of the cartridge may be altered or formed by the user to signify a desired beverage characteristic. For example, a broken tab, slider indicator, a covered or uncovered perforation on a portion of the cartridge, etc., that is created by the user may indicate a desired carbonation level, an amount of beverage medium to use in forming the beverage (where the system 1 is controllable to use less than all of the beverage medium in the cartridge to form a beverage), and so on. Features in the cartridge 4 may also be employed by the controller 5 detect features of the cartridge, a beverage being formed or other components of the system 1. For example, light guides in a cartridge 4 may provide a light path to allow the controller 5 to optically detect a level of beverage medium in the cartridge 4, a flow of precursor liquid in the cartridge 4, pressure in the cartridge (e.g., where deflection of a cartridge portion can be detected and indicates a pressure), a position of a piston, valve or other cartridge component, an absence of beverage medium in the cartridge (to signify completion of beverage formation), and so on. Other sensor features may be incorporated into the cartridge, such as electrical sensor contacts (e.g., to provide conductivity measurements representative of a carbonation level or other properties of a precursor liquid), an acoustic sensor (to detect gas emission, fluid flow, or other characteristics of the cartridge), and so on.

To cause the beverage making system 1 to create a carbonated beverage, a user may first provide a desired amount of precursor liquid 2 in the reservoir 11, along with optional ice and/or a beverage medium. Alternately, the carbonated liquid may be flavored after carbonation is complete either by automated or manual means. The reservoir 11 is then engaged with the lid 12, such as by engaging a screw thread on the reservoir 11 with the lid 12, activating a clamp mechanism, or other. A cartridge 4 containing a carbon dioxide source 41 (e.g., in solid form, such as a charged zeolite) may be placed in the cartridge chamber 3 and the chamber 3 closed. In other embodiments, the cartridge 4 may be otherwise fluidly coupled to the system 1, such as by engaging a threaded portion of the cartridge 4 with a corresponding port of the system. The cartridge chamber 3 may operate in any suitable way, e.g., like that found in many cartridge-based coffee or other beverage machines. For example, a manual lever may be operated to lift a lid of the chamber 3, exposing a cartridge receiver portion of the chamber 3. With the cartridge 4 in the chamber 3, the lever may be again activated to close the lid, sealing the chamber 3 closed. With the cartridge 4 associated with the system 1, the controller 5 may then activate the system 1 to deliver liquid to the chamber 3, e.g., to cause carbon dioxide to be generated. The controller 5 may start operation in an automated way, e.g., based on detecting the presence of a cartridge 4 in the chamber 3, liquid 2 in the reservoir 11 and closure of the chamber 3. Alternately, the controller 5 may start system operation in response to a user pressing a start button or otherwise providing input (e.g., by voice activation) to start beverage preparation. The controller 5 may start operation of the pump 13, drawing liquid from the dip tube 15 and discharging the liquid 2 at the nozzle 14. The valve 21 may be opened to deliver a suitable portion of the precursor liquid 2 to the chamber 3, and carbon dioxide gas created may be provided to the reservoir 11 by the gas supply 30. Operation may continue for a preset amount of time, or based on other conditions, such as a detected level of carbonation, a drop in gas production by the cartridge 4, or other parameters. During operation. the amount of liquid provided to the chamber 3 may be controlled to control gas output by the cartridge 4. Control of the liquid provided to the cartridge 4 may be made based on a timing sequence (e.g., the valve 21 may be opened for a period of time, followed by valve closure for a period, and so on), based on detected pressure (e.g., liquid supply may be stopped when the pressure in the chamber 3 and/or reservoir 11 exceeds a threshold, and resume when the pressure falls below the threshold or another value), based on a volume of activating liquid delivered to the chamber 3 (e.g., a specific volume of liquid may be delivered to the cartridge 4), or other arrangements. When complete, the user may remove the beverage and reservoir 11 from the lid 12.

FIG. 1 shows only one illustrative embodiment of a beverage making system 1, but other arrangements are possible, including systems that incorporate other aspects of the invention. For example, in one aspect of the invention, flavoring of a sparkling beverage may be done in an automated way, and may occur in a cartridge. This feature may make the beverage formation process easier and more convenient for a user, as well as help reduce the likelihood of cross contamination between beverages and/or the need to rinse a mixing chamber. That is, by mixing a beverage medium with the precursor liquid in a cartridge (which may be disposable), each beverage made by the system 1 may effectively be made using its own mixing chamber. For example, if a carbonated cherry beverage is made using the system 1, followed by lemon beverage, there may be a possibility that the cherry flavor left behind in a mixing chamber will carry over into the subsequent lemon beverage. Rinsing or other cleaning of a mixing chamber can help eliminate or reduce such flavor cross over, but mixing each beverage in a cartridge may eliminate the need to rinse a mixing chamber or other system components entirely. Mixing of the beverage medium with precursor liquid may occur in a dedicated mixing chamber of the cartridge(s), in a cartridge portion that holds a beverage medium, and/or in a cartridge portion that holds a gas source. However, it should be understood that a beverage medium may be mixed with a precursor liquid in other ways, such as by expelling the beverage medium from a cartridge directly into a user's cup or other container, or into a mixing chamber of the beverage making machine. Thus, the beverage medium could be mixed with sparkling water or other liquid directly in the user's cup.

In another aspect of the invention, precursor liquid may be carbonated using a contactor (a type of carbonator or gas dissolving device) that includes a porous membrane (e.g., that is porous at least to gas) having a gas side and a liquid side. Precursor liquid on the liquid side of the carbonator may be exposed to gas on the gas side of the membrane, and since the membrane may be arranged to increase the surface area of the liquid exposed to gas, dissolution of carbon dioxide or other gas into the precursor liquid may be done more rapidly than using other techniques. In one embodiment, the carbonator may include a contactor with a hollow fiber arrangement in which hollow fibers made of a hydrophobic material, such as polypropylene, carry the precursor liquid. The fibers are porous, having holes that, combined with the hydrophobicity of the material, allow for contact of gas on the exterior of the fibers with the liquid while preventing the liquid from exiting the fiber interior. Membrane contactors suitable for such use are made by Membrana of Charlotte, N.C., USA. Of course, other "membrane" arrangements may be used, such as arrangements that prevent bulk flow of liquid across a barrier, but allow gas to pass through the barrier for dissolution in the liquid. For example, a membrane having a flat, spiral wound and/or a flat, interdigitated arrangement could be used instead of a hollow fiber arrangement. Also, in some arrangements the flow of gas through the contactor may be generally opposite that of the flow of liquid through the contactor, e.g., to help with gas exchange. However, other flow arrangements are possible.

In yet another aspect of the invention, a cartridge chamber of a beverage making system may be arranged to hold first and second cartridge portions where the first cartridge portion contains a carbon dioxide source arranged to emit carbon dioxide gas for use in carbonating the precursor liquid, and the second cartridge portion contains a beverage medium arranged to be mixed with a liquid precursor to form a beverage. The cartridge chamber may have a single cartridge receiving portion for receiving both cartridge portions, or may include a plurality of cartridge receiving portions that are separate from each other, e.g., for receiving two or more cartridges that are each associated with a first or second cartridge portion. Such an arrangement may help simplify use of the system, particularly where the cartridge portions are arranged for only a single use, e.g., formation of a single volume of beverage and discarded thereafter. For example, a user may be enabled to place one or two cartridges that include the first and second cartridge portions in receiving portions of the cartridge chamber without the need for establishing pressure-tight, leak-proof or other connections needed for the system to operate properly. Instead, the cartridge portions may be simply placed in a receiver, and the cartridge chamber closed, making the system ready for beverage production.

Figure 2:
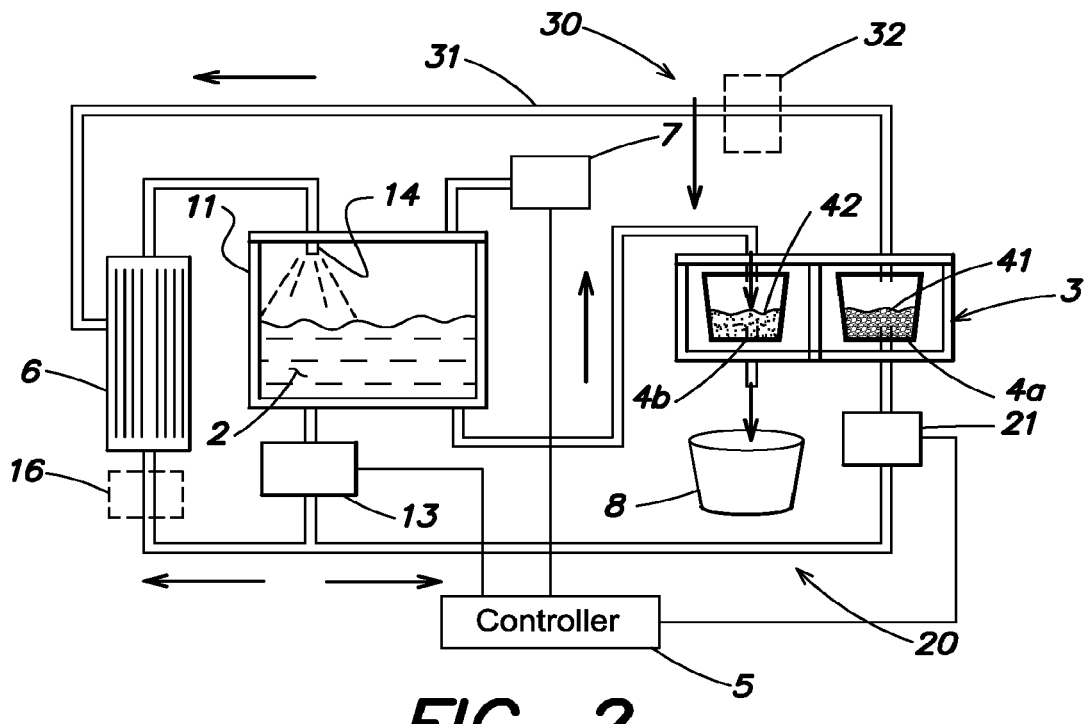
FIG. 2 shows a illustrative embodiment of a beverage making system having a contactor arranged to circulate precursor liquid.

FIG. 2 shows another illustrative embodiment that incorporates the aspects of using a membrane contactor to carbonate the precursor liquid with a cartridge-provided gas, mixing a beverage medium with liquid in a cartridge, and the use of a cartridge chamber that receives first and second cartridge portions that respectively contain a gas source and beverage medium. This embodiment is similar to that in FIG. 1 in many ways, and may be modified to have one or more components like that in FIG. 1. However, certain alternate arrangements are shown in FIG. 2 to illustrate another few ways in which a beverage making system 1 may be modified in accordance with aspects of the invention. In this embodiment, the reservoir 11 is a closed tank having no removable lid. Precursor liquid 2 may be provided to the reservoir 11 in any suitable way, such as by a plumbed water connection (not shown), by the pump 13 (or other pump) pumping liquid from a separate storage tank (not shown) into the reservoir 11, by a gravity feed of liquid from a separate storage tank through a controllable valve (not shown), and others. The reservoir 11 may have any suitable volume, and is fluidly coupled to a pump 13 that can circulate the precursor liquid 2 through a contactor 6 and back to the reservoir 11 via a nozzle 14. (Such a circulation feature may help in dissolving gas in a precursor liquid 2 and may be used in any beverage making system 1 described herein or otherwise contemplated within the scope of this disclosure.) As discussed above, the precursor liquid 2 may pass through hollow fibers in the contactor 6 to pick up carbon dioxide or other gas around the fibers, but this arrangement could be reversed, with gas flowing in the fibers and the precursor liquid 2 located on the exterior of the fibers. A filter 16 may be provided to remove materials in the precursor liquid 2 that might clog the fibers, pores in the fibers or otherwise interfere with the operation of the contactor 6. Alternately, or in addition, the filter 16 may condition the liquid 2, e.g., by softening, removing alkaline or other elements that tend to raise the pH of the liquid 2, by removing elements that may prevent the formation of a good tasting beverage, and so on. For example, the filter 16 may include an activated charcoal and/or other components found in commonly used water filters. The contactor 6 may be arranged to have a plurality of hollow fibers extending within a closed tube or other chamber so that the inner passages of the fibers fluidly connects a fluid inlet of the contactor 6 to a fluid outlet. The gas space around the fibers may communicate with the carbon dioxide supply 30 via one or more ports on the gas side of the contactor 6. It should be understood, however, that the contactor 6 may be arranged in other ways, such as having one or more membranes in the form of a flat sheet or other forms other than tubular to define a liquid side and a gas side of the contactor 6.

The activating fluid supply 20 is arranged similarly to that in FIG. 1, with a controllable valve 21 fluidly coupled to an output of the pump 13. However, in this embodiment, the activating fluid supply 20 introduces liquid near a bottom of the cartridge chamber 3 and the cartridge 4. This arrangement may help the activating fluid supply 20 to better control gas release from the carbon dioxide source 41. For example, dropping water onto the carbon dioxide source 41 from the top may allow the water to spread over a wide area, allowing charged zeolites or other source materials spread over a wide area to release gas. By providing liquid from below, the activating fluid supply 20 may flood the cartridge 4 and/or chamber 3, thereby allowing water to contact source materials 41 starting from the bottom up. This may allow for closer control of the volume of source materials 41 that are activated to release gas. In the case that the carbon dioxide source 41 can wick or otherwise move water upwardly (such as by capillary action), portions of the source 41 may be separated from each other by non-wicking agents. For example, the source 41 may include a set of stacked discs of zeolite material that are separated by a non-wicking material, such as metal or solid plastic separators. This may allow the fluid supply 20 to stepwise increase the fluid level in the cartridge 4 over a period of time to sequentially activate individual discs.

Gas produced by the cartridge 4 is routed by the gas supply 30 (via an optional filter 32 and conduit 31) to the gas side of the contactor 6. The conduit 31 may include a water-buoyant check valve or other arrangement that allows gas to pass to the contactor 6, but prevents liquid from exiting the cartridge chamber 3. For example, a floating ball in the cartridge chamber 3 may normally leave an opening of the conduit 31 free for gas flow, but may raise upwardly on the surface of liquid in the cartridge 4 to close the opening, e.g., in case that the activating fluid supply 20 provides an excess of activating liquid. The controller 5 may monitor the gas pressure in the chamber 3, in the conduit 31 and/or in the gas side of the contactor 6 to control the activating fluid supply 20 and gas production. In one embodiment, the activating fluid supply 20 may be controlled to provide approximately 35-45 psi gas pressure at the gas side of the contactor 6. This pressure has been found to work at least adequately in carbonating about 400-500 ml of water at a temperature of about 0 degrees C. in about 30-60 seconds using a hollow fiber contactor, as described in more detail below in the Examples. As carbon dioxide in the contactor is dissolved into the precursor liquid 2, the pressure on the gas side will drop, prompting the controller 5 to supply additional liquid 2 to the cartridge 4a to cause additional gas to be created. Similar to the system in FIG. 1, this process may be performed based on any criteria, such as the passage of a specific amount of time, the detection of a specified level of carbonation of the liquid 2, exhaustion of the carbon dioxide source 41, a volume of liquid delivered to the cartridge 4a, etc., so that a pressure of the carbon dioxide gas can be maintained within a desired range above ambient pressure.

Once carbonation of the precursor liquid 2 is complete, the controller 5 may direct the liquid 2 to a beverage medium cartridge 4b in the cartridge chamber 3. While the precursor liquid 2 may be caused to flow from the reservoir 11 in any suitable way (such as by gravity, a pump, etc.), in this embodiment, the controller 5 activates an air pump 7 which pressurizes the reservoir 11 such that the precursor liquid 2 is forced to flow via a conduit to the cartridge chamber 3 and the beverage medium cartridge 4b. In other embodiments, gas pressure created by the carbon dioxide source 41 may be used to pressurize the reservoir 11 and drive the flow of the precursor liquid to the beverage medium cartridge 4b. For example, when carbonation is complete, gas from the cartridge 4a may be routed directly into the reservoir 11 instead of to the contactor 6 so as to pressurize the reservoir 11. Although no valve is shown in the conduit that fluidly couples the reservoir 11 and the cartridge 4b, a controllable valve, pump or other suitable component may be added to control flow as desired. The use of air or other gas to move liquid 2 through the cartridge 4b (or to expel beverage medium from the cartridge 4b) may allow the system 1 to "blow down" the cartridge 4b at or near the end of the beverage process, e.g., to remove any remaining material from the cartridge 4b. This may be useful in making the cartridge 4b less messy to handle (e.g., by reducing the likelihood that the cartridge 4b will drip when removed from the chamber 3. A similar process may be used to blow down the cartridge 4a, e.g., using an air pump or gas produced by the source 41.

Flow of the precursor liquid 2 through the beverage medium cartridge 4b may cause the liquid 2 to mix with the beverage medium 42 before being discharged, e.g., to a waiting cup 8 or other container. The beverage medium cartridge 4b may include any suitable beverage making materials (beverage medium), such as concentrated syrups, ground coffee or liquid coffee extract, tea leaves, dry herbal tea, powdered beverage concentrate, dried fruit extract or powder, natural and/or artificial flavors or colors, acids, aromas, viscosity modifiers, clouding agents, antioxidants, powdered or liquid concentrated bouillon or other soup, powdered or liquid medicinal materials (such as powdered vitamins, minerals, bioactive ingredients, drugs or other pharmaceuticals, nutriceuticals, etc.), powdered or liquid milk or other creamers, sweeteners, thickeners, and soon. (As used herein, "mixing" of a liquid with a beverage medium includes a variety of mechanisms, such as the dissolving of substances in the beverage medium in the liquid, the extraction of substances from the beverage medium, and/or the liquid otherwise receiving some material from the beverage medium.) The liquid 2 may be introduced into the cartridge 4b in any suitable way, and/or the cartridge 4b may be arranged in any suitable way to aid in mixing of the liquid 2 with the beverage medium 42. For example, the precursor liquid 2 may be introduced into the cartridge 4b so as to cause a spiral or other flow pattern, the cartridge 4b may include a labyrinth or other tortuous flow path to cause turbulence in the flow to aid in mixing, and so on. One potential advantage of mixing the precursor liquid 2 in a beverage medium cartridge 4b is that cross contamination of beverage medium that may occur with the use of a mixing chamber that is used to mix beverage medium and liquid 2 for every beverage made by the system 1 may be avoided. However, the system 1 could be modified to employ a reused mixing chamber, e.g., a space where beverage medium 42 that is provided from a cartridge 4b and precursor liquid 2 are mixed together in much the same way that fountain drinks are formed by commercial drink machines. For example, the beverage medium 42 could be driven from the cartridge 4b (e.g., by air pressure, carbon dioxide gas pressure created by the cartridge 4a, by gravity, by suction created by an adductor pump, venturi or other arrangement, etc.) into a mixing chamber or the user's cup where the precursor liquid 2 is also introduced. Rinsing of the mixing chamber may or may not be necessary, e.g., to help prevent cross contamination between beverages. In some arrangements, the entire volume of beverage medium 42 may be discharged into the mixing chamber, causing initial amounts of flavored precursor liquid 2 exiting the mixing chamber to have a high beverage medium concentration. However, as the beverage medium 42 is swept from the mixing chamber by the precursor liquid 2, the precursor liquid itself may effectively rinse the mixing chamber. In arrangements where the beverage medium 42 is a dry material, such as a powder, some precursor liquid may be introduced into the cartridge to pre-wet the medium 42 or otherwise improve an ability to mix the medium 42 with precursor liquid 2. The wetted medium 42 may be mixed with additional precursor liquid 2 in the cartridge, or the wetted medium 42 may be expelled from the cartridge, e.g., by air pressure, a plunger, etc., to a mixing chamber or other location for additional mixing with precursor liquid 2. Liquid 2 may be introduced into a mixing chamber using multiple streams, e.g., to enhance a mixing rate using low flow speeds so as to reduce loss of dissolved gas.

Figure 3:
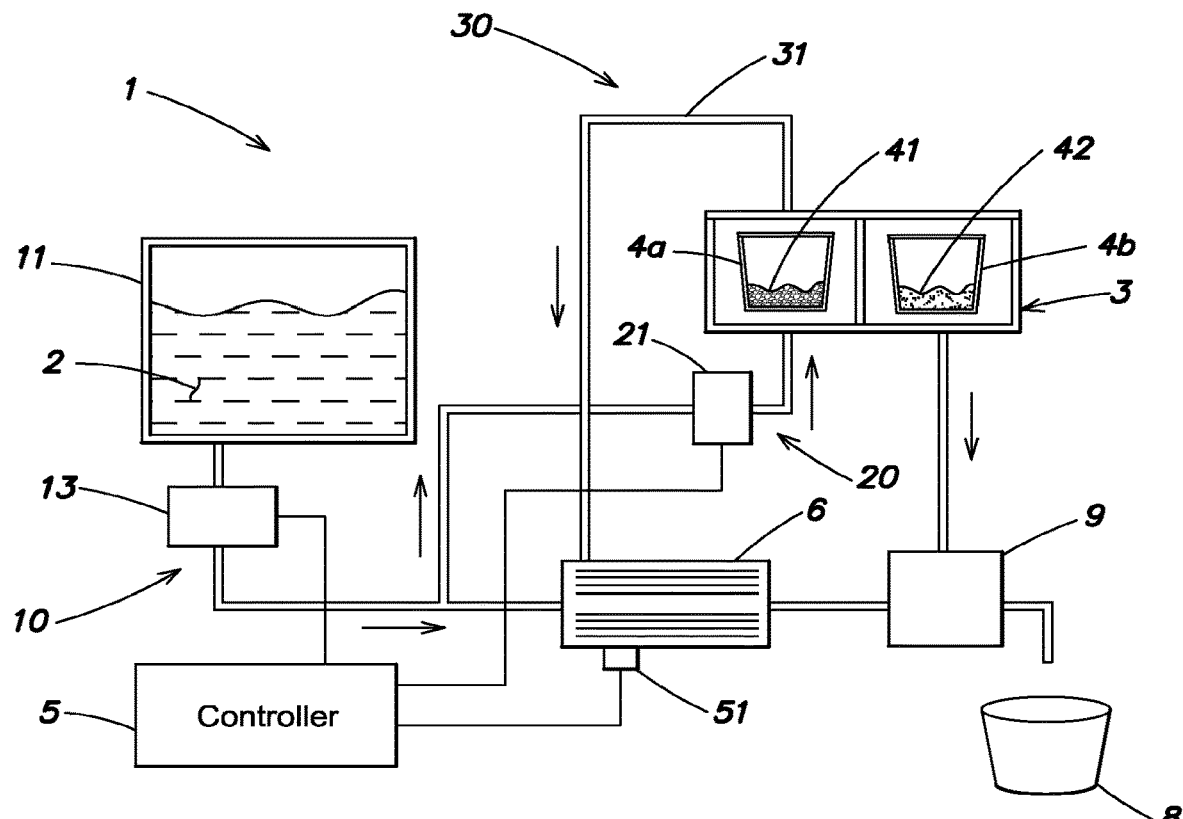
FIG. 3 shows a illustrative embodiment of a beverage making system in which liquid is carbonated in a single pass through a carbonator.

The embodiment of FIG. 2 could be modified so that flow of precursor liquid 2 exiting the contactor 6 is routed directly to the beverage medium cartridge 4b or to another mixing chamber where beverage medium 42 is mixed with the carbonated precursor liquid 2, e.g., like that shown in FIG. 3. That is, in this illustrative embodiment, carbonated precursor liquid 2 does not circulate from the reservoir 11, through the contactor 6 and back to the reservoir 11, but instead precursor liquid 2 makes a single pass through the contactor 6 and then proceeds to mixing with the beverage medium 42 in a mixing chamber 9 and discharge to a cup 8. However, the arrangement of FIG. 3 could also include a circulation circuit to allow liquid 2 to be circulated from the reservoir 11 or other tank, through the contactor 6, and back to the reservoir 11 or other tank. The mixing chamber 9 may take any suitable form, e.g., may cause the precursor liquid 2 and beverage medium 42 to move in a spiral, swirl or other fashion to enhance mixing, may have one or more motor driven blades, impellers or other elements to mix contents in the chamber 9, and so on. While the mixing chamber 9 may be separate from the cartridge 4, the mixing chamber 9 could be incorporated into a cartridge 4 if desired. The mixing chamber 9 may be cooled as well, e.g., by a refrigeration system, to help cool the beverage provided to the cup 8. Alternately, the precursor liquid 2 may be cooled in the reservoir 11 and/or any other locations in the system.

In the case where the carbonated liquid 2 is not flavored or where the liquid 2 is mixed with the beverage medium 42 before passing through the carbonator 6, the mixing chamber 9 may be eliminated or arranged to mix the precursor liquid 2 and beverage medium 42 upstream of the contactor 6. Alternately, the precursor liquid supply 10 may be arranged to mix the precursor liquid 2 with the beverage medium 42 in the cartridge 4b prior to routing the liquid 2 to the contactor 6. In this embodiment, the beverage medium 42 may be delivered to the mixing chamber 9 by any suitable means, such as air or other gas pressure (e.g., as supplied by an air pump, the gas source 41 or other), by gravity feed (e.g., by the opening of a valve or door), by introducing all or part of the precursor liquid 2 used to make the beverage into the second cartridge 4b, by compressing the cartridge 4b to force the medium 42 to flow to the mixing chamber 9, and others. The controller 5 may detect the gas pressure on the gas side of the contactor 6, and control fluid supply to the cartridge 4a accordingly, e.g., to maintain a suitable gas pressure in the contactor 6. The reservoir 11 may be a water storage tank that is not pressurized in this embodiment, and may be removable from the system 1, e.g., to make filling by a user easier. The user may add ice and/or beverage medium to the precursor liquid 2 in the reservoir 11, if desired.

Alternately, the reservoir 11 and pump 13 may be replaced by a plumbed connection to a pressurized water supply and an optional control valve and/or pressure reducer. Of course, as with other embodiments, the system 1 may be suitably enclosed in a housing having a visible display, user input buttons, knobs, or touch screen, user-operated devices for opening/closing a cartridge chamber, and other features found in beverage making machines.

Figure 4:
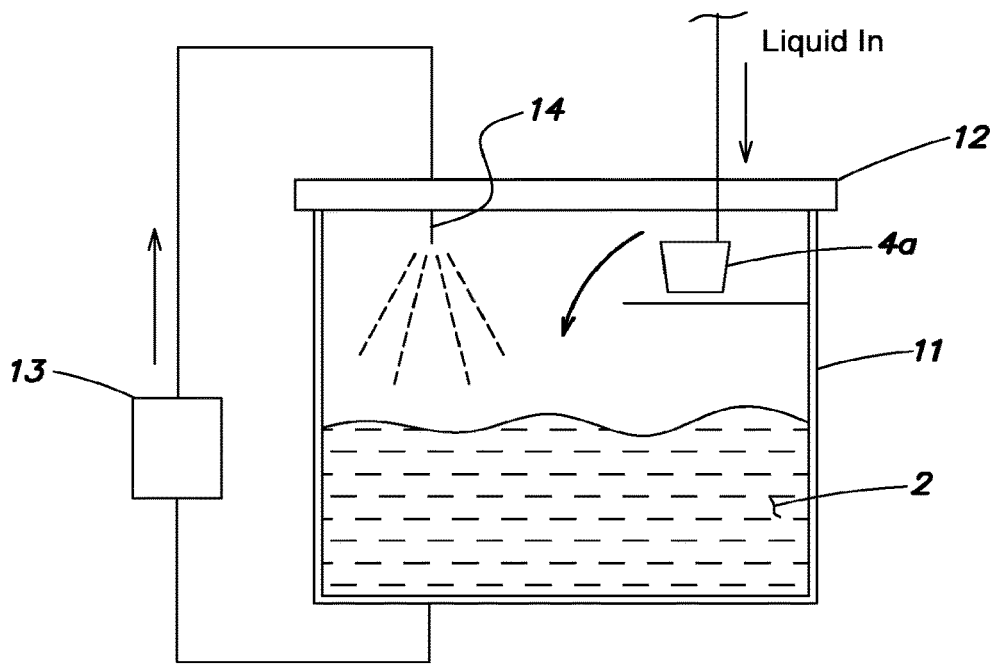
FIG. 4 shows an illustrative embodiment of a beverage making system in which a gas cartridge is located in a carbonation reservoir.

Other arrangements for a beverage forming system 1 are possible, such as that shown in FIG. 4. In this illustrative embodiment, the cartridge chamber 3 is combined with the reservoir 11 such that the cartridge 4a having a carbon dioxide source 41 is located in the reservoir 11. The cartridge 4a may be placed in the reservoir 11/cartridge chamber 3 by removing the lid 12 from the reservoir 11. Liquid may be provided to the cartridge 4a by any suitable activating fluid supply 20, such as an arrangement like that in FIG. 1, a syringe or piston pump that delivers a metered amount of liquid to the cartridge 4a, and others. In this embodiment, the carbon dioxide supply 30 is combined with the reservoir 11 such that a portion of the reservoir functions to deliver carbon dioxide gas to the precursor liquid 2. The pump 13 may aid the carbonation process by circulating the liquid 2 and spraying the liquid 2 into a carbon dioxide-filled headspace in the reservoir 11. In another embodiment, a contactor 6 may be provided in the reservoir 11 (e.g., at the location of the nozzle 14) so that the liquid 2 flows through hollow fibers extending downwardly from the lid 12 while carbon dioxide in the headspace is absorbed by the liquid while passing through the fibers. In yet another arrangement, the membrane portion of a contactor 6 may be at least partially submerged in the precursor liquid 2, and gas from the source 41 may be passed through hollow fibers of the contactor 6. As a result, the liquid 2 on the outside of the fibers may pick up carbon dioxide from the gas passing through the fibers. In such an arrangement, the fibers of the contactor 6 may be located in the reservoir 11 or other tank as shown, or could be located in the user's cup 8. In this way, liquid 2 could be carbonated or otherwise have gas dissolved while in the cup 8.

While the cartridge chamber 3 may be arranged in any suitable way, FIG. 5 shows one illustrative arrangement in which both a carbon dioxide source cartridge 4a and a beverage medium cartridge 4b can be received by the same cartridge chamber 3. In this embodiment, the cartridges 4a, 4b (which respectively have a portion that contains a gas source 41 and beverage medium 42) are received in separate cartridge receivers 33, and each cartridge receiver 33 may include a piercing element 34 at a bottom of the cartridge receiver 33. The piercing element 34, which may include a hollow needle, spike, blade, knife or other arrangement, may form an opening in the respective cartridge 4. Alternately, the cartridges 4 may have defined openings, e.g., one or more ports, that include a septum or other valve-type element that permits flow into and/or out of the cartridge 4. Similarly, the lid 12 may include piercing element 35 that form an opening in the top of the respective cartridge 4, e.g., when the lid 12 is closed. When closed, the lid 12 may form a sealed chamber in which the cartridges 4a, 4b are located and isolated from each other. The openings formed in the cartridges 4a, 4b may allow for communication with the interior space of the cartridges 4a, 4b as outlined in FIG. 5. For example, an opening at the top of the cartridge 4a may allow carbon dioxide or other gas to exit the cartridge chamber 3, while the opening at the bottom of the cartridge 4a may allow for water or other activating fluid to enter the cartridge 4a. Of course, the openings may be formed in other locations, such as an opening for allowing fluid input to occur at the top or side of the cartridge. Likewise, gas may exit the cartridge through a bottom, side or otherwise located opening. As mentioned above, gas may be permitted to leak from the cartridge 4a into the space in the cartridge chamber 3 around the cartridge 4a, e.g., through the opening in the cartridge 4a, through a hole or other opening in the piercing element 35, etc. This may allow the pressure around the cartridge to equalize with the pressure inside the cartridge during gas production, helping to prevent bursting of the cartridge 4a. Alternately, the cartridge 4a may fit closely into the cartridge receiver 33 so that the cartridge chamber 3 can support the cartridge 4a (if necessary). The opening in the top of the beverage medium cartridge 4b may allow for precursor liquid 2 to be introduced into the cartridge 4b (e.g., for mixing with the beverage medium), or for pressurized air or other gas to enter the cartridge (e.g., for forcing the beverage medium 42 from the cartridge 4b and into a mixing chamber or cup). The opening at the bottom of the cartridge 4b may allow for beverage to exit to a waiting cup or other container, or for the beverage medium to travel to a mixing chamber or cup. As with the cartridge 4a, opening in the beverage medium cartridge 42 may be arranged in any suitable location or locations.

The cartridge chamber 3 may open and close in any suitable way to allow cartridges 4 to be placed in and/or removed from the chamber 3. In the FIG. 5 embodiment, the lid 12 is pivotally mounted to the receiver portion of the chamber 3, and may be opened and closed manually, such as by a handle and linkage arrangement, or automatically, such as by a motor drive, to close the cartridge receivers 33. In other embodiments, the lid 12 may have two or more sections that are each associated with a respective cartridge receiver 33. Thus, the lid sections can be moved independently of each other to open/close the cartridge receivers 33. Of course, the lid 12 may be arranged in other ways, such as being engaged with the receivers 33 by a threaded connection (like a screw cap), by the receivers 33 moving away and toward the lid 12 while the lid 12 remains stationary, by both the lid and receiver portion moving, and so on. In addition, a cartridge chamber 3 need not necessarily have a lid and receiver arrangement like that shown in FIG. 5, but instead may have any suitable member or members that cooperate to open/close and support a cartridge. For example, a pair of clamshell members may be movable relative to each other to allow receipt of a cartridge and physical support of the cartridge. Some other illustrative cartridge chamber arrangements are shown, for example, in U.S. Pat. Nos. 6,142,063; 6,606,938; 6,644,173; and 7,165,488. As mentioned above, the cartridge chamber 3 may allow a user to place one or more cartridges in the chamber 3 without the need for the user to take special steps to establish a pressure-tight, leak-proof or other specialized connection between the cartridge and other portions of the system 1. Instead, in some embodiments, the user may be able to simply place the cartridge in a receiving space, and close the cartridge chamber.

The cartridges 4 used in various embodiments may be arranged in any suitable way, such as a relatively simple frustoconical cup-shaped container having a lid attached to the top of the container, e.g., like that in some beverage cartridges sold by Keurig, Incorporated of Reading, Mass. and shown in U.S. Pat. No. 5,840,189, for example. In one embodiment, a cartridge having a frustoconical cup-shaped container and lid may have an approximate diameter of about 30-50 mm, a height of about 30-50 mm, an internal volume of about 30-60 ml, and a burst resistance of about 80 psi (i.e., a resistance to cartridge bursting in the presence of a pressure gradient of about 80 psi from the inside to outside of the cartridge in the absence of any physical support for the cartridge). However, as used herein, a "cartridge" may take any suitable form, such as a pod (e.g., opposed layers of filter paper encapsulating a material), capsule, sachet, package, or any other arrangement. The cartridge may have a defined shape, or may have no defined shape (as is the case with some sachets or other packages made entirely of flexible material. The cartridge may be impervious to air and/or liquid, or may allow water and/or air to pass into the cartridge. The cartridge may include a filter or other arrangement, e.g., in the beverage medium cartridge 4b to help prevent some portions of the beverage medium from being provided with the formed beverage, and/or in the gas cartridge 4a to help prevent carbon dioxide source material from being introduced into the beverage or other system components.

In one aspect of the invention, the cartridge or cartridges used to form a beverage using the beverage making system may have a volume that is less, and in some cases substantially less, than a beverage to be made using the cartridge(s). For example, if carbon dioxide and beverage medium cartridges 4 are used, the cartridges may each have a volume that is about 50 ml or less, and be used to form a beverage having a volume of about 200-500 ml or more. The inventors have found (as shown in some of the Examples below) that an amount of charged carbon dioxide adsorbent (e.g., a charged zeolite) of about 30 grams (which has a volume of less than 30 ml) can be used to produce about 400-500 ml of carbonated water having a carbonation level of up to about 3.5 volumes. Moreover, it is well known that beverage-making syrups or powders having a volume of less than about 50 ml, or less than about 100 ml, can be used to make a suitably flavored beverage having a volume of about 400-500 ml. Thus, relatively small volume cartridges (or a single cartridge in some arrangements) having a volume of about 100 ml to about 250 ml or less may be used to form a carbonated beverage having a volume of about 100 to 1000 ml, and a carbonation level of at least about 1.5 to 4 volumes in less than 120 seconds, e.g., about 60 seconds, and using pressures under 50 psi.

While the carbon dioxide and beverage medium cartridges 4 can be provided separately, in one embodiment, the cartridges 4 may be joined together, like that shown in FIG. 6. The cartridges 4a, 4b may be connected together by any suitable arrangement, such as tabs 43 that extend from respective cartridges 4a, 4b and are attached together, e.g., by thermal welding, adhesive, interlocking mechanical fasteners such as snaps or clips, etc. This arrangement may allow the cartridges 4a, 4b to be made separately in the manufacturing setting, e.g., because the cartridges require very different processes for manufacturing. For example, the beverage medium cartridge 4b may require a highly sterile environment, whereas the gas cartridges 4a need not be made in such an environment. In contrast, the gas cartridges 4a may need to be manufactured in a water vapor-free environment, whereas the beverage medium cartridge 4b may not be subject to such requirements. After manufacture of the cartridges 4a, 4b, the cartridges may be attached together in a way that prevents their separation without the use of tools (such as a scissor) and/or damage to one or both of the cartridges. The cartridge chamber 3 may be arranged to accommodate the attached cartridges, allowing a user to place a single item in the chamber 3 to form a beverage. In addition, the cartridges 4 and/or the way in which the cartridges are attached, together with the arrangement of the cartridge chamber 3 may help ensure that the gas cartridge 4a and beverage medium cartridge 4b are placed in the proper cartridge receiver 33. For example, the cartridges 4 may have different sizes, shapes or other configurations so that the combined cartridges 4 cannot be placed into the chamber 3 in the wrong orientation. Alternately, the controller 5 may detect that the cartridges have been improperly placed (e.g., by communicating with an RFID tag on one or both of the cartridges, by optically or otherwise identifying the cartridges, etc.), and prompt the user to make a change as necessary.

FIGS. 7 and 8 show another embodiment in which a pair of cartridges are joined together in a way that helps prevent improper placement of the cartridges in a chamber and/or enables the cartridges to operate in other orientations. As shown in FIG. 7, the cartridges 4a and 4b are attached by a connection 43 such that with the cartridge 4a arranged in an upright orientation with the container bottom 44 facing downward and the lid 45 covering the top of the container facing upward, the cartridge 4b is on its side with the lid 45 facing to the side. FIG. 8 shows a top view of the embodiment, with the lid 45 of the cartridge 4a facing the viewer and the lid 45 of the cartridge 4b facing downwardly. This arrangement may be useful in embodiments where the cartridges 4 are pierced only at the lid area, e.g., are not pierced in the bottom 44 or other portions of the container. That is, the gas cartridge 4a may be pierced at the lid 45 to allow liquid to be introduced into the cartridge 4a, and to allow gas to exit. In some embodiments, the inlet for introduction of activating fluid (liquid and/or gas) may be the same opening as the outlet for gas emitted by the gas source. For example, a single hole may be pierced in the lid 45 through which water is introduced, and through which gas emitted by the gas source exits. Similarly, the lid 45 of the cartridge 4b may be pierced to allow liquid to be introduced into the cartridge 4b for mixing with the beverage medium 42 and to allow a flavored beverage to exit the cartridge 4b. Avoiding piercing of the container may be useful in arrangements where the container is made of a relatively thick and/or rigid material (e.g., to withstand operating pressures for the cartridge 4).

Figure 9:
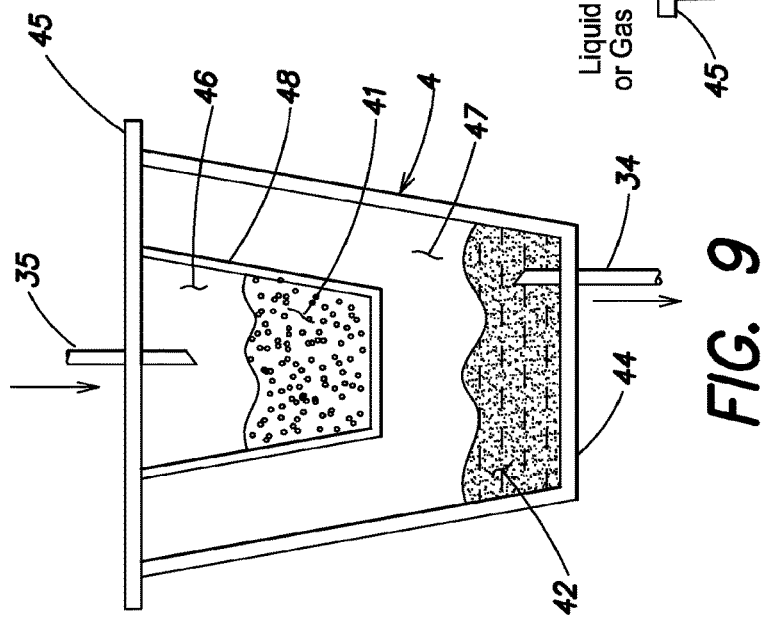
FIG. 9 shows an illustrative embodiment of a cartridge arranged to carbonate a liquid in the cartridge.

In another aspect of the invention, a single cartridge may be used to provide a carbonating gas as well as a beverage medium. In fact, in some embodiments, the precursor liquid can be both carbonated and flavored in the same cartridge. For example, FIG. 9 shows a cross sectional view of a cartridge 4 that includes both a gas source 41 (e.g., a zeolite carbon dioxide source) and a beverage medium 42. In this embodiment, the cartridge 4 includes first and second chambers (or portions) 46, 47 that respectively contain the gas source 41 and the beverage medium 42. The first and second chambers (or portions) 46, 47 may be separated from each other by a permeable element, such as a filter, or an impermeable element, such as a wall molded with the cartridge container. In this embodiment, the first and second chambers (or portions) 46, 47 are separated by a filter 48 that is attached to the lid 45, but could be arranged in other ways. Precursor liquid and/or an activating liquid may be introduced into the first chamber 46 by a piercing element 35 or other arrangement, such as a port formed as part of the cartridge 4. The interior space of the cartridge 4 may be maintained under pressure, e.g., 30-150 psi above ambient or greater, so that dissolution of carbon dioxide gas released by the source 41 occurs more rapidly than would occur at lower pressures. In addition, the system 1 arranged to use such cartridges may include a backpressure valve or other arrangement that helps to maintain a suitable pressure in the cartridge 4, e.g., as an aid to carbonation. As mentioned above, a cartridge chamber 3 that holds the cartridge 4 may be arranged to closely fit the cartridge 4 as needed to support the cartridge and prevent the cartridge from bursting. Alternately, pressure in the cartridge 4 may be allowed to leak into a space around the cartridge 4 to equalize the pressures inside and outside of the cartridge, or the cartridge may be made to withstand operating pressures without physical or other support. Carbonated precursor liquid 2 and/or a liquid/gas bubble mixture may pass through the filter 48 into the second chamber 47 for mixing with the beverage medium 42. Thereafter, the precursor liquid 2 and beverage medium 42 mixture may exit the cartridge 4, e.g., through a piercing element 34 at the container bottom 44. Dissolution of carbon dioxide into the precursor liquid 2, as well as mixing of the beverage medium 42 with the liquid 2, may continue after the materials exit the cartridge 4. For example, a mixing chamber may be located downstream of the cartridge 4 to help more thoroughly mix the beverage medium and liquid if needed. Also, a conduit downstream of the cartridge may help continue dissolution of gas, e.g., by maintaining pressure in the liquid.

Figure 10:
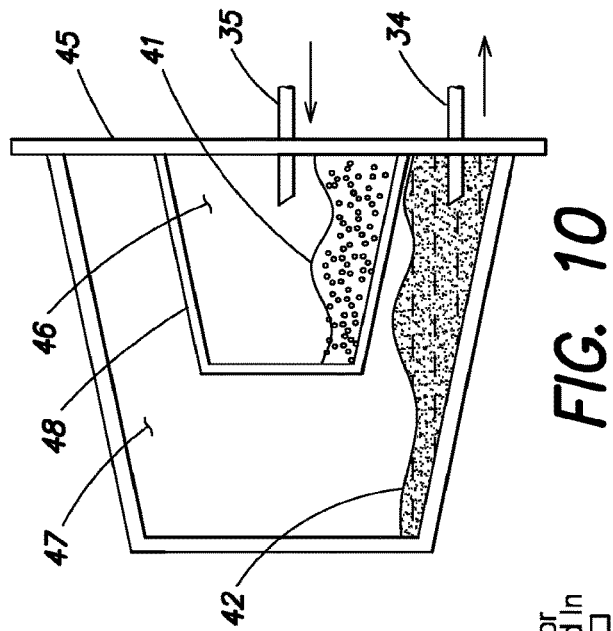
FIG. 10 shows an illustrative embodiment of a cartridge arranged to carbonate a liquid in the cartridge in an alternative orientation.

While FIGS. 9 and 10 show an arrangement in which the gas source 41 and the beverage medium 42 are separated by a filter 48, in other arrangements the gas source 41 and beverage medium 42 may be mixed together, e.g., so that a precursor liquid 2 is both mixed with beverage medium 42 and exposed to gas from the gas source 41 at a same time. In some cases, gas that is not dissolved into the liquid 2 may be routed to another location, such as a contactor 6, for exposure to and dissolution into the liquid 2 at an upstream or downstream location, e.g., to increase a level of dissolved gas. In one embodiment, particles of gas source material 41 may be coated with a beverage medium 42.

In the embodiments above, the cartridge 4 has been described to have a defined bottom and top with the cartridge operating in an upright configuration. However, as suggested in connection with FIGS. 7 and 8, a cartridge may be operated in any suitable orientation. For example, FIG. 10 shows an embodiment in which a cartridge configured like that in FIG. 9 is used while the cartridge 4 is on its side. (Note that the cartridge 4b in FIGS. 7 and 8 may be used in a similar way to that shown in FIG. 10.) Precursor liquid may be introduced into the first chamber (or portion) 46 (e.g., via the piercing element 35), causing the gas source 41 to emit gas and at least partially flooding the cartridge 4 interior space. As with the FIG. 9 embodiment, the liquid may be carbonated and mix with the beverage medium 42 before exiting the cartridge, e.g., via the piercing element 34.

Figure 11:
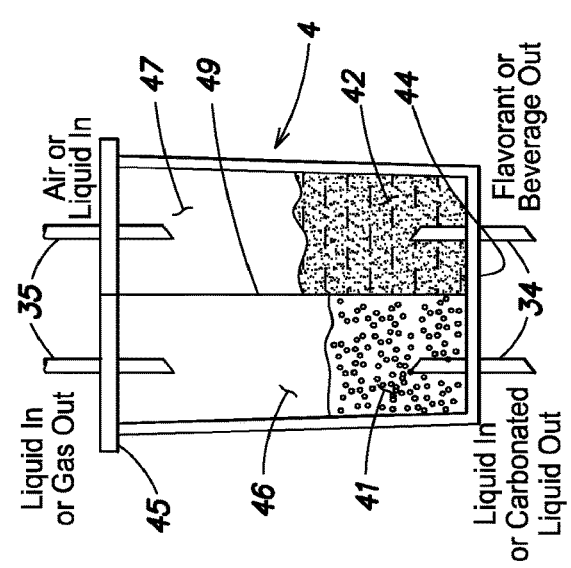
FIG. 11 shows an illustrative embodiment of a cartridge having isolated chambers containing a gas source and a beverage medium.

As also mentioned above, a single cartridge 4 may be arranged to have first and second chambers 46, 47 that are isolated or separated from each other. FIG. 11 shows one such embodiment in which first and second chambers (or portions) 46, 47 are separated by a wall 49. A cartridge like that shown in FIG. 11 may be used, for example, in a system 1 like that shown in FIG. 2, although the cartridge chamber 3 may need to be modified to accommodate the single cartridge 4. As shown in FIG. 11, in one embodiment, activating liquid may be provided via a piercing element 35 at a top of the first chamber (or portion) 46, and gas may exit via the same or a different opening. Alternately, activating liquid may be introduced via the piercing element 34 at the bottom of the first chamber (or portion) 46, and gas may exit via the piercing element 35 at the top. In yet another embodiment, precursor liquid may be introduced at the top piercing element 35 and carbonated liquid may exit via the bottom piercing element 34. The first chamber (or portion) 46 may include a filter or other suitable components, e.g., to help prevent the gas source 41 from exiting the chamber (or portion) 46. Regarding the second chamber (or portion) 47, air or other gas may be introduced via the piercing element 35 at a top of the second chamber (or portion) 47, causing beverage medium 42 to be moved out of the piercing element 34 at the bottom of the second chamber (or portion) 47, e.g., to a mixing chamber or user's cup. Alternately, precursor liquid may be introduced via the piercing element 35 at a top of the second chamber 47, may mix with the beverage medium 42 and exit the cartridge 4 out of the piercing element 34. As discussed above, the piercing element 34, 35 arrangement in this illustrative embodiment should not be interpreted as limiting aspects of the invention in any way. That is, piercing elements need not be used, but instead flow into/out of the cartridge 4 may occur through defined ports or other openings in the cartridge 4. Also, flow ports or other openings in the cartridge need not necessarily be located at the top, bottom or other specific location.

The cartridge(s) may be made of any suitable materials, and are not limited to the container and lid constructions shown herein. For example, the cartridge(s) may be made of, or otherwise include, materials that provide a barrier to moisture and/or gases, such as oxygen, water vapor, etc. In one embodiment, the cartridge(s) may be made of a polymer laminate, e.g., formed from a sheet including a layer of polystyrene or polypropylene and a layer of EVOH and/or other barrier material, such as a metallic foil. Moreover, the cartridge(s) materials and/or construction may vary according to the materials contained in the cartridge. For example, a gas cartridge 4a may require a robust moisture barrier, whereas a beverage medium cartridge 4b may not require such a high moisture resistance. Thus, the cartridges may be made of different materials and/or in different ways. In addition, the cartridge interior may be differently constructed according to a desired function. For example, a beverage medium cartridge 4b may include baffles or other structures that cause the liquid/beverage medium to follow a tortuous path so as to encourage mixing. The gas cartridge 4a may be arranged to hold the gas source 41 in a particular location or other arrangement in the interior space, e.g., to help control wetting of the source 41 with activating liquid.

A cartridge may also be arranged to provide a visual or other detectable indication regarding the cartridge's fitness for use in forming a beverage. For example, the cartridge may include a pop-up indicator, color indicator or other feature to show that the gas source has been at least partially activated. Upon viewing this indication, a user may determine that the cartridge is not fit for use in a beverage making machine. In another embodiment, an RFID tag may be associated with a sensor that detects gas source activation (e.g., via pressure increase), beverage medium spoilage (e.g., via temperature increase), or other characteristic of the cartridge, which may be transmitted to a reader of a beverage making machine. The machine may display the condition to a user and/or prevent activation of the machine to use the cartridge to form a beverage.

Figure 12:
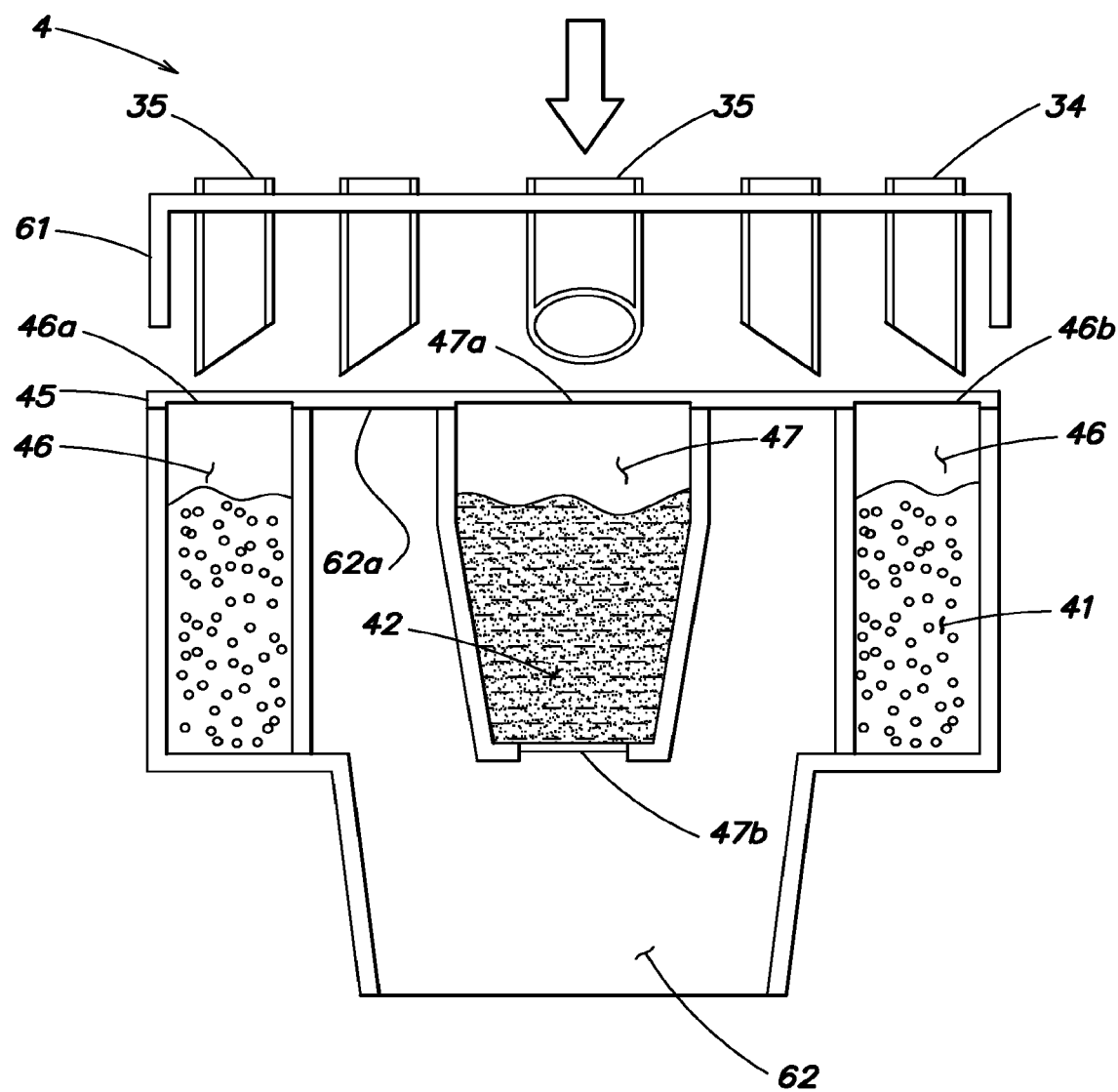
FIG. 12 shows a cross sectional view of a cartridge having a movable part to configure the cartridge for use in forming a beverage.
Figure 13:
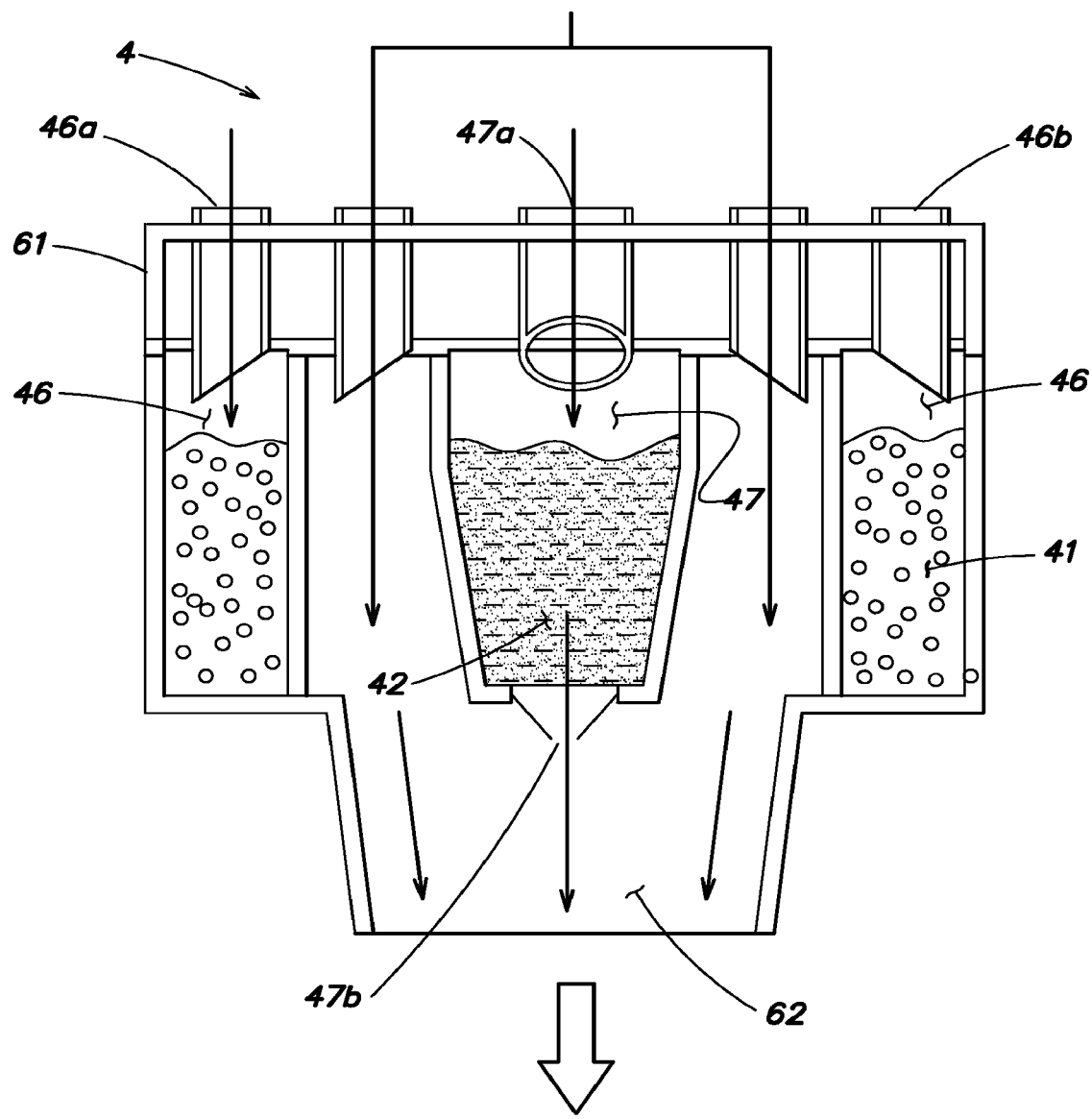
FIG. 13 shows a cross sectional view of the FIG. 12 cartridge after movement of the movable part.
Figure 14:
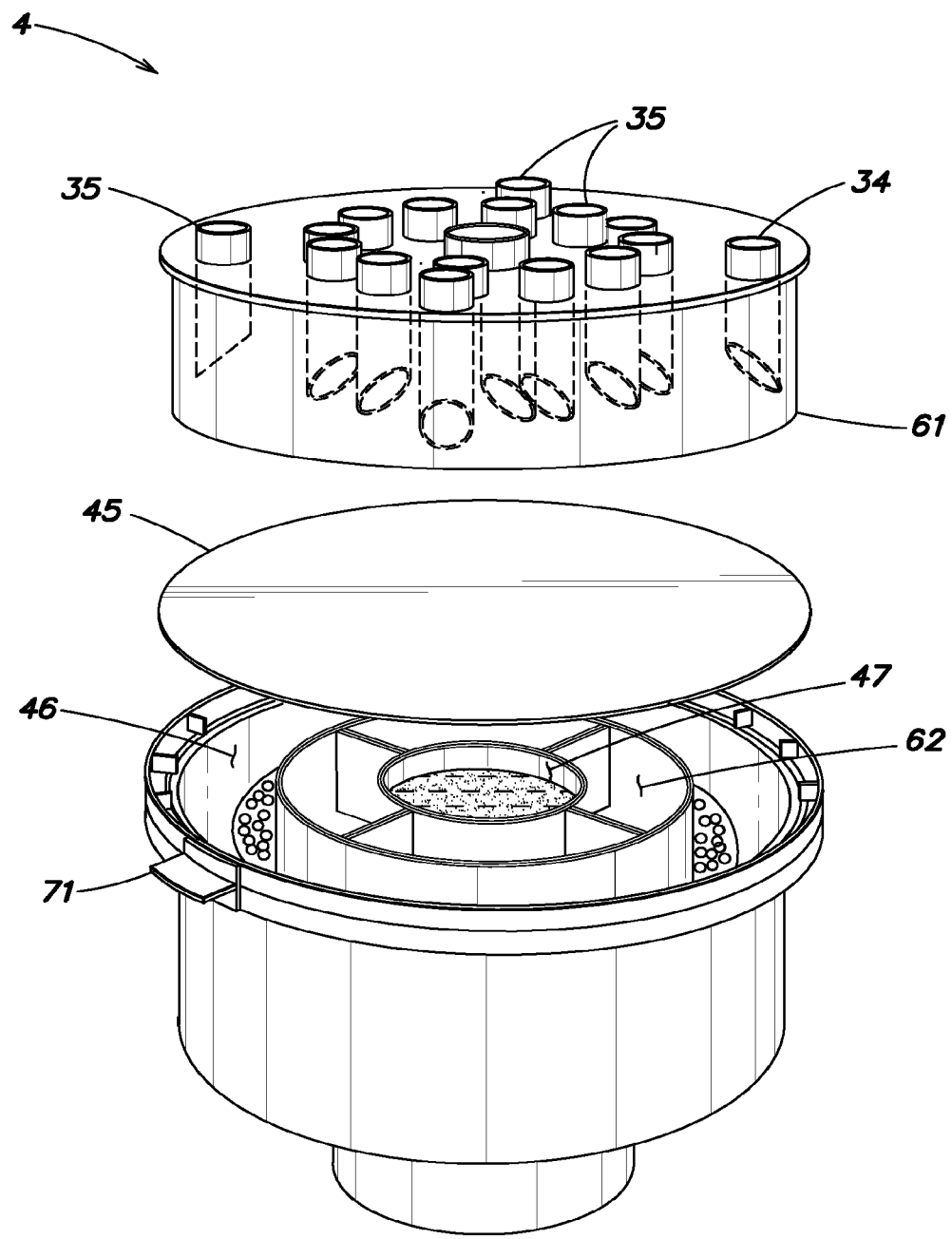
FIG. 14 shows an exploded view of the FIG. 12 cartridge.

In another aspect of the invention, a cartridge may include a gas source portion, a beverage medium portion and a mixing chamber portion (also referred to as first, second and third portions, respectively) that are separated from each other. Thus, as discussed above, a cartridge may include a mixing chamber that is separate from a portion that is used to hold a beverage medium prior to use of the cartridge. The first portion may contain a gas source for emitting a gas to be dissolved in a beverage precursor liquid, the second portion may contain a beverage medium for use in mixing with a beverage precursor liquid to form a beverage, and the third portion may be arranged to receive beverage medium from the second portion and receive precursor liquid to mix the precursor liquid with the beverage medium. The precursor liquid may enter the third portion with the beverage medium and/or enter the third portion via a separate flow path. Thus, the cartridge may be capable of mixing a precursor liquid (e.g., whether carbonated or not) with beverage medium and outputting a mixed beverage (e.g., for later carbonation). This may help avoid the need to clean a mixing chamber, e.g., because the cartridge may be made disposable so that each beverage is made using its own mixing chamber. FIGS. 12, 13 and 14 show a cross sectional view of a cartridge 4 having first, second and third portions prior to configuration ready to make a beverage, a cross sectional view of the cartridge 4 after being configured to make a beverage, and an exploded perspective view of the cartridge, respectively. In this embodiment, the cartridge 4 includes a first portion 46 that partially surrounds a second portion 47 and a third portion 62, e.g., the first portion 46 has parts positioned around the second and third portions 47, 62 in at least one plane. Also, the third portion 62 partially surrounds the second portion 47. However, this concentric arrangement of the first, second and third portions 46, 47, 62 is not required, as these portions may be arranged in any suitable way with respect to each other. A top end of the first, second and third portions 46, 47, 62 is sealed closed by a lid 45, e.g., a foil laminate that is part of the cartridge container. (In one embodiment, the lid 45 may include two or more separate portions, such as a first part that covers the second portion 47 after beverage medium is placed, and a second part that covers the first portion 46 (and possibly the second portion 47 as well) after the gas source 41 is placed. This may make filling of the first and second portions 46, 47 easier during manufacturing.) As a result, the first portion 46 may be isolated from an external environment, e.g., to help resist contact of the gas source 41 with moisture or other materials. By virtue of a closure at the beverage medium outlet 47b of the second portion, e.g., a burstable or frangible membrane, septum, etc., the second portion 47 is likewise isolated from an exterior environment, so as to help prevent spoilage of the beverage medium 42, as necessary. While a top region of the third portion 62 is closed by the lid 45, a bottom region of the third portion 62 may be left open, or may be covered by another element, such as a second lid or other cover.

This embodiment incorporates another aspect of the invention, i.e., that a cartridge may include a movable part arranged to move so as to configure the cartridge useable for making a beverage. For example, the movable part may move relative to the cartridge container to open the gas source portion and/or the beverage medium portion, e.g., as shown in FIG. 13. In the illustrative embodiment of FIG. 12, the movable part 61 includes a plurality of piercing elements 34, 35 arranged to form one or more openings in the lid 45, although other arrangements are possible. For example, a movable part 61 may move to open a valve so as to open an inlet or outlet of the cartridge 4, to break off a tab or other frangible element to open an inlet or outlet, couple a pair of conduits together, and so on. In this embodiment, the movable part 61 includes a piercing element 35 to form an activator inlet 46a into the first portion 46, e.g., to allow the introduction of fluid (liquid water or water vapor) to activate the gas source 41. The movable part 61 also includes a piercing element 34 to form a gas outlet 46b into the first portion 46, allowing for gas emitted by the gas source 41 to exit the cartridge 4, e.g., for dissolving into a precursor liquid and forming of a beverage. It is also possible that a single piercing element 34/35 may function to form the inlet 46a and the outlet 46b, e.g., where a same hole in the lid 45 serves to admit activating fluid and emit gas. A piercing element 35 is also included to form a precursor liquid inlet 47a into the second portion 47 to allow the introduction of precursor liquid (whether having a substantial amount of dissolved gas or not) for mixing with the beverage medium 42 and helping to move the beverage medium 42 from the second portion 47 and into the third portion 62. Precursor liquid may also be introduced into the third portion 62 by one or more piercing elements 35 for mixing with the beverage medium 42. Thus, in accordance with an aspect of the invention, the cartridge 4 may be arranged to direct a portion of precursor liquid used to make a beverage through a beverage medium portion, and bypass or otherwise direct a remaining portion of the precursor liquid into a mixing chamber portion of the cartridge. In one embodiment, approximately 10-40% of the precursor liquid used to form a beverage may be introduced into the second portion 47 and about 60-90% of the precursor liquid may be introduced into the third portion 62. Of course, other relative amounts may be used, as suitable. Precursor liquid may be introduced into the third portion 62 to creating a swirling action, turbulence or other motion to help mix the precursor liquid and the beverage medium. The portion of precursor liquid introduced into the second portion 47 may help wet the beverage medium 42, e.g., where the beverage medium 42 is a powdered material, which may help with mixing.

In accordance with an aspect of the invention, the cartridge 4 may include a lock element that prevents movement of a movable part, e.g., which is movable to configure the cartridge suitable to form a beverage, and the lock element may be releasable by a user. As shown in FIG. 12, the cartridge container or the movable part 61 may include a lock ring 71 that prevents the movable part 61 from moving relative to the container, e.g., to pierce the lid 45. The lock ring 71 may be removable or otherwise releasable by a user, e.g., by pulling on a tab that causes the lock ring 71 to separate from the container at a perforation or other line of weakness. The lock element may take other arrangements, such as one or more break-off fins or tabs, a removable plug, or other structure. In another arrangement, the lock element may be removed or otherwise released by the beverage making machine, e.g., after the cartridge 4 is associated with the machine and a door closed.

Another aspect of the invention incorporated into the cartridge of FIG. 12 is that the gas source portion at least partially surrounds the beverage medium portion and/or the mixing chamber portion. This feature may help enlarge the volume of the gas source portion without unnecessarily enlarging the cartridge, e.g., to help the gas source portion store gas emitted by the gas source without experiencing large pressure changes that might be present in a smaller volume chamber. That is, a somewhat larger gas source chamber volume may provide the gas source chamber with an ability to store gas emitted by the gas source while smoothing pressure variations. Thus, the gas source portion may be arranged to function as a kind of accumulator that stores gas emitted by the gas source.

While in this embodiment the cartridge 4 includes a movable part 61 with piercing elements, the cartridge 4 need not include a movable part 61 that moves to configure the cartridge for forming a beverage. Instead, the cartridge 4 may be arranged without the movable part 61, and a beverage machine that uses the cartridge may include a suitable set of piercing elements or other components arranged to interact with the cartridge to communicate with inlets and/or outlets of the cartridge as suitable.

In another aspect of the invention, a cartridge may include an activation fluid inlet that directs an activation fluid to a bottom of the gas source portion. This arrangement may allow for improved control of gas release, e.g., because a gas source may be exposed to activation fluid from a bottom to a top. Thus, if the activation fluid is water, a lower part of the gas source portion may be flooded with water, causing a lower layer of the gas source to be activated. However, higher layers of gas source may remain unactivated because the activation water does not reach above a lower part of the gas source. To activate upper players of the gas source, more water may be provided to the gas source portion, raising the top level of the activation fluid in the gas source portion. Flooding of the gas source portion may be continued at a controlled rate, thereby controlling gas emission of the gas source. This arrangement may help avoid wetting a gas source from a top surface of the source, such as by sprinkling water on the top surface of a charge of zeolite material. This sprinkling may cause uncontrolled wetting, and thus activation, of the source, causing the gas source to emit gas in a less controlled way.

Figure 15:
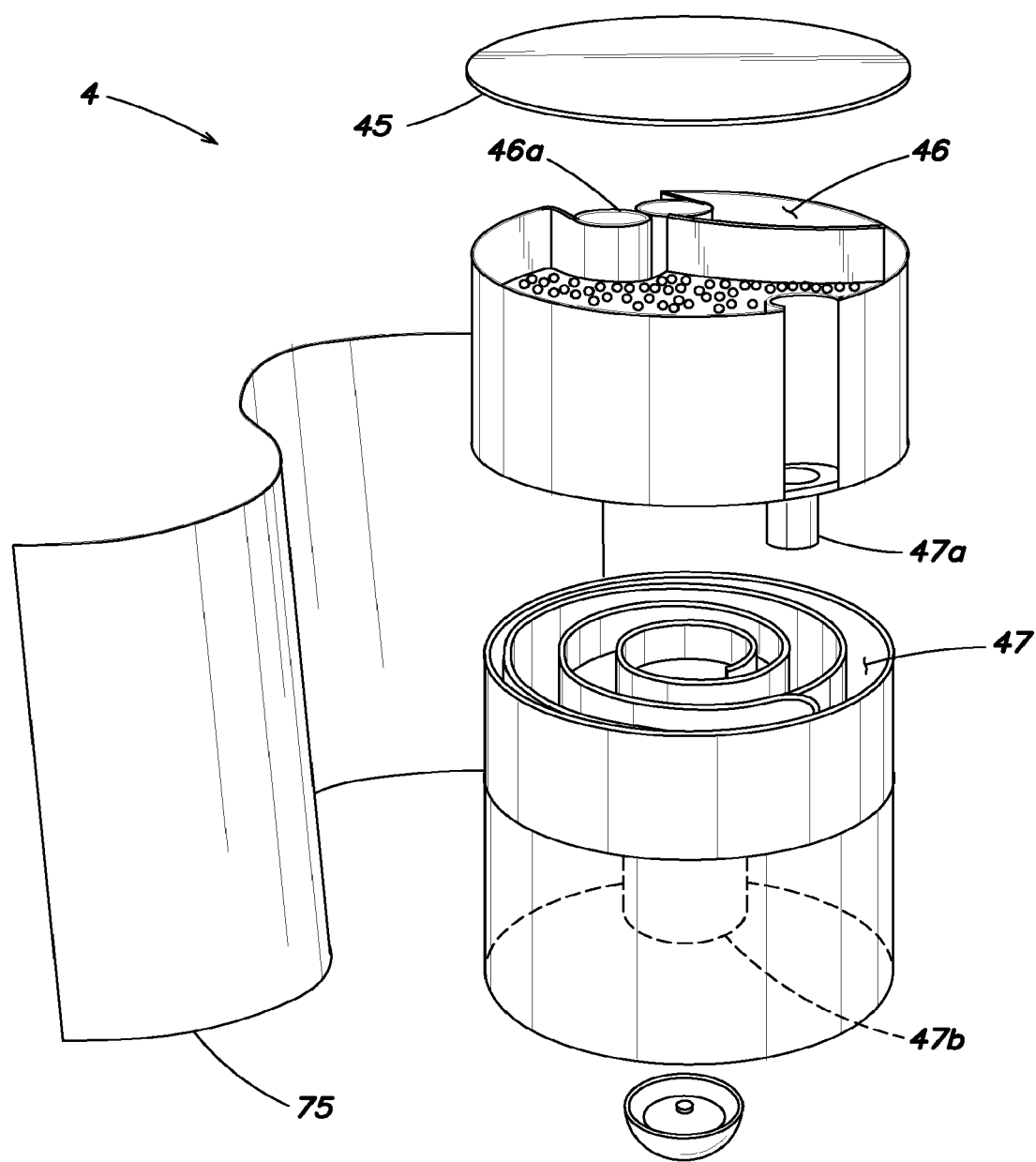
FIG. 15 shows an exploded view of a cartridge having a first portion located over a second portion.
Figure 16:
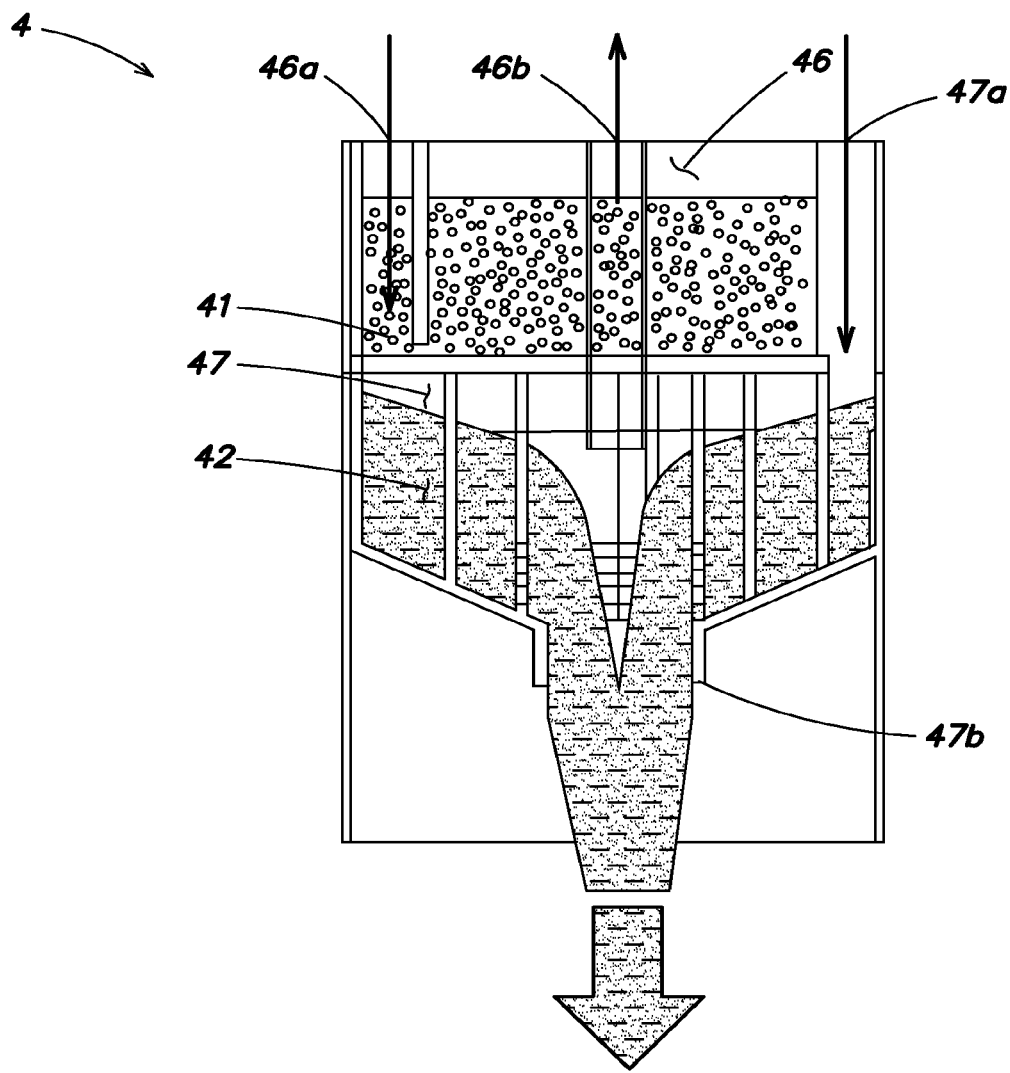
FIG. 16 shows a cross sectional view of the FIG. 15 cartridge.
Figure 17:
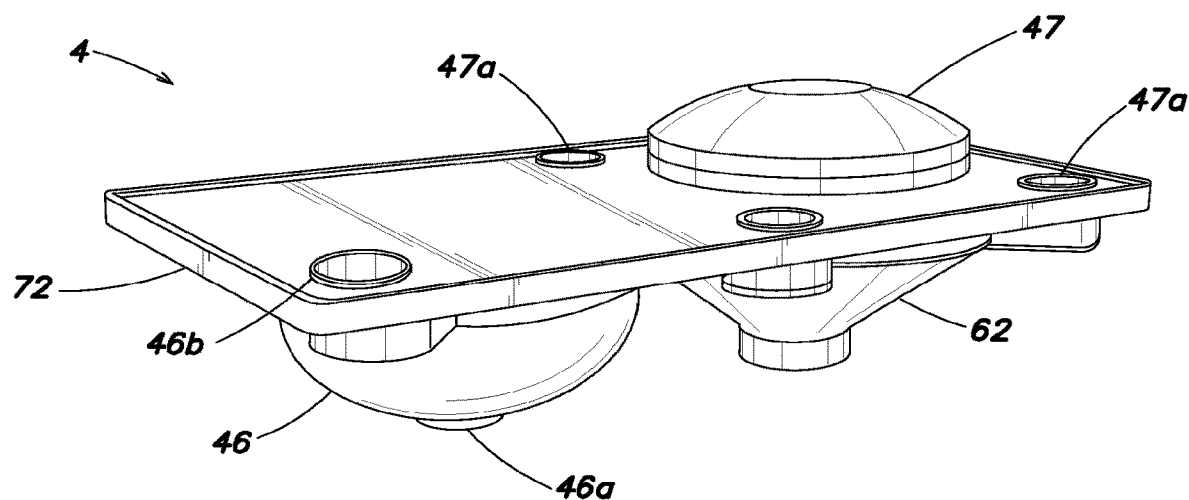
FIG. 17 shows a perspective view of a cartridge having a planar support.
Figure 18:
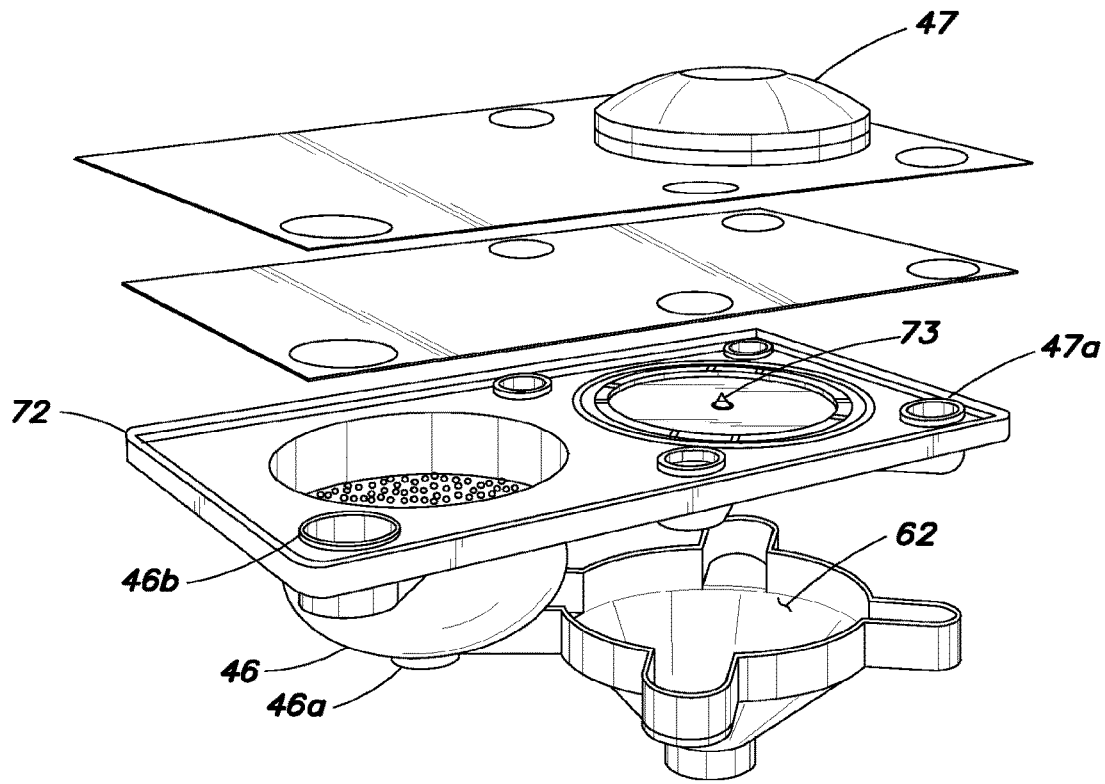
FIG. 18 shows an exploded view of the FIG. 17 cartridge.
Figure 19:
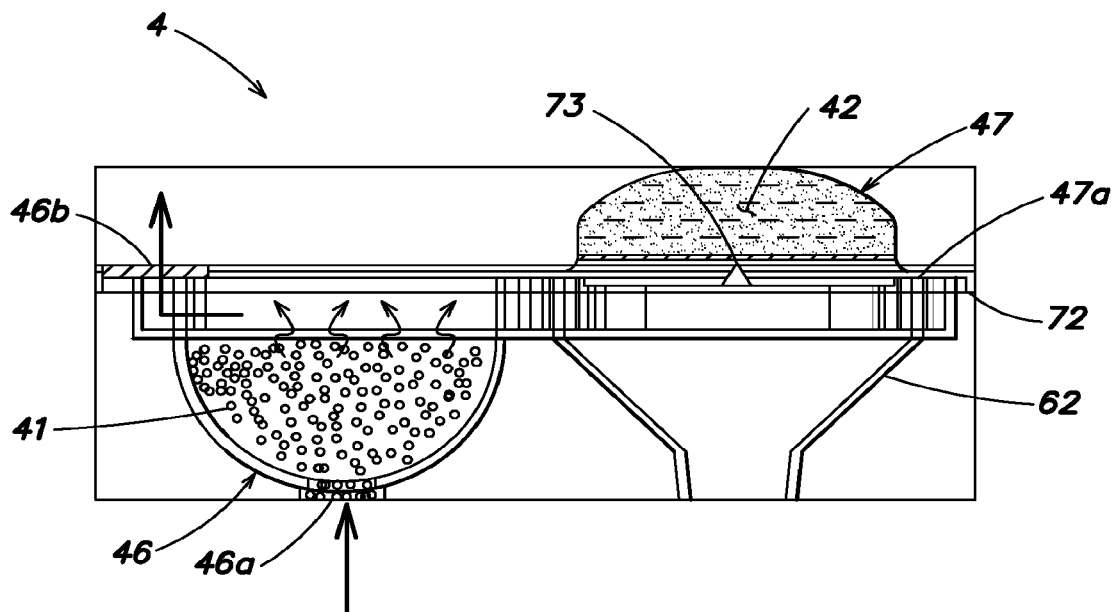
FIG. 19 shows a cross sectional view of the FIG. 17 cartridge.

FIGS. 15 and 16 show an exploded view and a cross sectional view, respectively, of an illustrative embodiment of a cartridge 4 that includes an activation fluid inlet that provides activation fluid to a bottom of the gas source portion. In this illustrative embodiment, the first portion 46 includes a gas source 41 and an activator inlet 46a with a conduit that extends from near a top of the first portion 46 to near a bottom of the first portion 46. Thus, for example, a beverage making machine may pierce a lid 45 that seals the first portion 46 and the activator inlet 46a closed, and introduce water into the activator inlet 46a. The water may flow down the conduit of the inlet 46a and into the bottom of the first portion 46, wetting a lower layer of gas source and causing the gas source to emit gas. Of course, other activation fluids may be used, such as citric acid, water vapor, etc. Also, while in this embodiment the activator inlet 46a includes a conduit that is molded into the sidewall of the container body, the activator inlet 46a may be arranged in other ways, such as by a conduit that extends from a bottom wall of the first portion 46, a conduit that extends downwardly from a piercing element, and so on. Emitted gas may exit via another opening in the first portion 46 (such as a molded port or pierced opening) or may exit via the activator inlet 46a (e.g., via small holes in the inlet 46a near a top of the conduit that allow gas to pass but resist the passage of liquid water, or via a trap such as an "S" shaped conduit that resists liquid water flow).

Other ways of controlling gas release may be used in a cartridge, such as encapsulating gas source material 41 in a structure that bursts, dissolves or otherwise degrades to expose the interior gas source to activating fluid. For example, capsules containing gas source 41 may be arranged to dissolve at different rates, thereby releasing gas source material for activation in a time-release fashion. Other arrangements are possible as well, such as a first portion 46 that has multiple steps or platforms on which gas source 41 is located. As the first portion 46 is flooded with water or other activator, the gas source 46 at each step may be exposed one after the other, thereby causing a staged emission of gas.

Another aspect of the invention incorporated into the embodiment of FIGS. 15 and 16 is a spiral-shaped, helical, zig-zag or other tortuous flowpath channel that holds beverage medium and helps precursor liquid flowing in the spiral-shaped channel to mix with the beverage medium. For example, the cartridge 4 includes a precursor liquid inlet 47a that directs precursor liquid into an outer region of a spiral-shaped channel (in this case, via a downwardly extending conduit that extends from a top of the first portion 46 to the second portion 47). Beverage medium 42 is arranged in the spiral-shaped channel to partially fill the depth of the channel so that precursor liquid may flow over and/or in the beverage medium. As the precursor liquid flows through the spiral-shaped channel, beverage medium may mix with the liquid, forming the beverage. The spiral-shaped channel may be arranged to provide for laminar flow, e.g., to help reduce loss of carbonation or other dissolved gases in the precursor liquid, if present. Alternately, the spiral shaped or other tortuous channel may be arranged to provide turbulent flow, potentially helping to mix the precursor liquid and beverage medium. Mixed beverage medium and precursor liquid exiting the cartridge near a center of the spiral shaped channel may pass directly into a user's cup or may enter a mixing chamber, whether part of the cartridge or the beverage making machine. Flow channel shapes other than spiral may be used, e.g., a helical, zig-zag, and/or serpentine pathway may be arranged to provide laminar or other flow characteristics. Thus, a cartridge second portion that contains beverage medium may include any suitable flow arrangements to help mix a precursor liquid with beverage medium.

The embodiment of FIGS. 15 and 16 also includes a feature that an outlet of the second portion 47 may include a closure (e.g., a cap) that is arranged to be broken off, pierced, removed or otherwise opened by a user and/or by a beverage making machine. Thus, the outlet need not necessarily be opened by a presence of pressure in the second portion 47. Also, the first and second portions 46, 47 in this embodiment are made of separate parts that are held together by a sleeve 75 that wraps around the portions 46, 47. The sleeve 75 may also function to seal the side of the precursor inlet 47a, and/or the activator inlet 46a. However, it should be understood that the first and second portions 46, 47 may be made as a single, unitary piece, and configured to eliminate any need for a sleeve 75.

In accordance with another aspect of the invention, a beverage medium portion of a cartridge may include a wall that is movable to expel beverage medium from the beverage medium portion. For example, the beverage medium portion may be defined by a barrier layer (e.g., a foil laminate) that is arranged to surround a beverage medium. The barrier layer may be flexible so that the second portion of the cartridge can be squeezed, pressed or otherwise have a force exerted on it so as to reduce the volume of the second portion to force the beverage medium from the second portion. For example, the barrier layer may form a pouch that contains beverage medium, and the pouch may be squeezed to force the beverage medium to exit, e.g., into a user's cup, a mixing chamber of the cartridge, or other location where the beverage medium is mixed with a liquid precursor. In another illustrative arrangement, the second portion may include a syringe-type arrangement where a plunger is moved in the second portion to force beverage medium from the second portion. Other arrangements are possible, as discussed more below.

FIGS. 17-20 show a perspective view, an exploded view, a cross-sectional view during gas output and a cross-sectional view during beverage medium mixing of an illustrative embodiment having a movable element to expel beverage medium from the cartridge. In this embodiment, the cartridge container includes a planar support 72 that supports a first portion 46, located below the support 72, and a second portion 47 located above the support 72. The first portion 46 is formed integrally with the support 72, e.g., is molded as a unitary part with the support 72, but could be formed in other ways, such as by a separate part that is attached to the support 72. The first portion 46 has a hemispherical shape with an activator inlet 46*a* near a bottom of the first portion 46 and a gas outlet 46*b* on a top side of the planar support 72. (As with all embodiments described herein, relative terms "top", "bottom", etc., are used for ease of description and understanding, and should not be understood as limiting the cartridge arrangements, their orientation during use, or other features of the cartridge.) Thus, water or other activation fluid may be introduced near a bottom of the first portion 46, e.g., to controllably flood the first portion 46, with gas emitted by the gas source 41 exiting via a port on the support 72. The activator inlet 46*a* and gas outlet 46*b* may be opened by a piercing element, physical action to remove a break off tab, removal of a peel off foil, etc.

Figure 20:
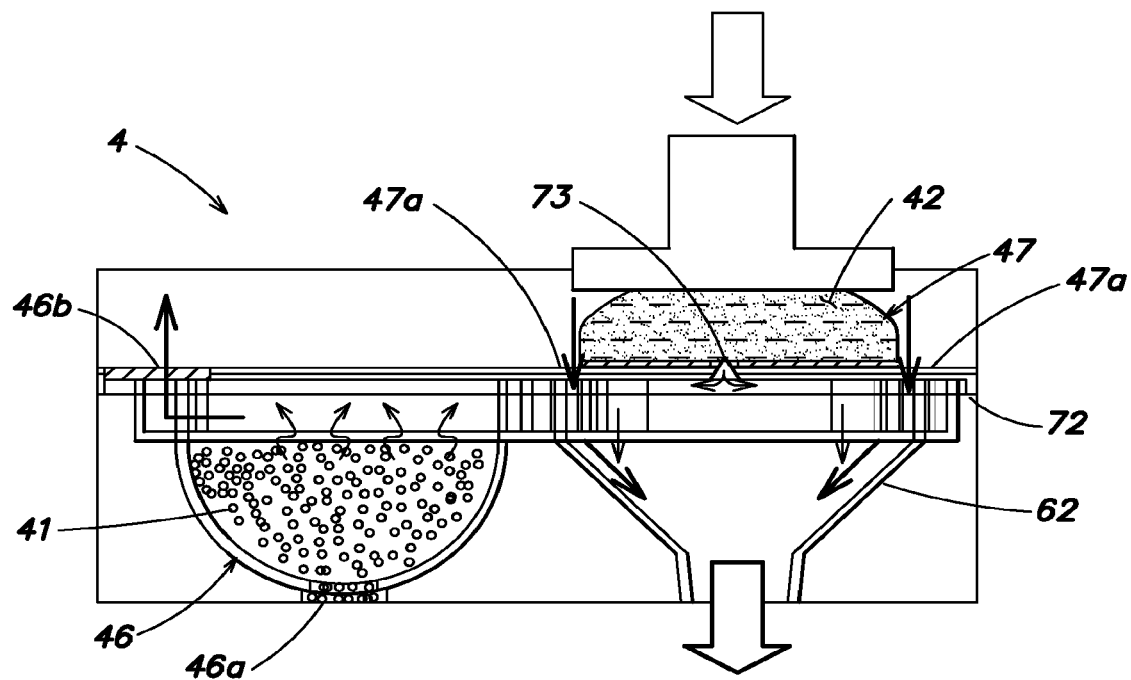
FIG. 20 shows a cross sectional view of the FIG. 17 cartridge with beverage medium being expelled from a second portion of the cartridge.

The second portion 47 in this embodiment includes a blister pouch that is formed by a layer of barrier material, such as a foil laminate. The second portion 47 may have any shape or size, but in this embodiment has a generally disc-like shape with a dome-like upper surface. A lower part of the blister pouch includes a layer of barrier material that covers a substantial part of the top surface of the support 72, e.g., to seal the first portion 46 closed as well as form a bottom of the second portion 47, but may be arranged in other ways. The blister pouch overlies a spike 73 on the support 72 so that if the blister pouch is urged toward the support 72, e.g., as shown in FIG. 20, the spike 73 may pierce the second portion 47, releasing the beverage medium. Accordingly, movement of a wall (e.g., an upper part of the blister pouch) of the second portion 47 may cause beverage medium to exit the second portion 47. Movement of the wall may be caused by a plunger of the beverage making machine pressing down on the second portion 47 (as shown in FIG. 20), or in other ways. For example, gas pressure generated by the gas source 41 may be routed to a suitable location (such as into the second portion 47, a pneumatic bladder, or to the plunger of the beverage making machine) to force beverage medium from the second portion 47.

Figure 21:
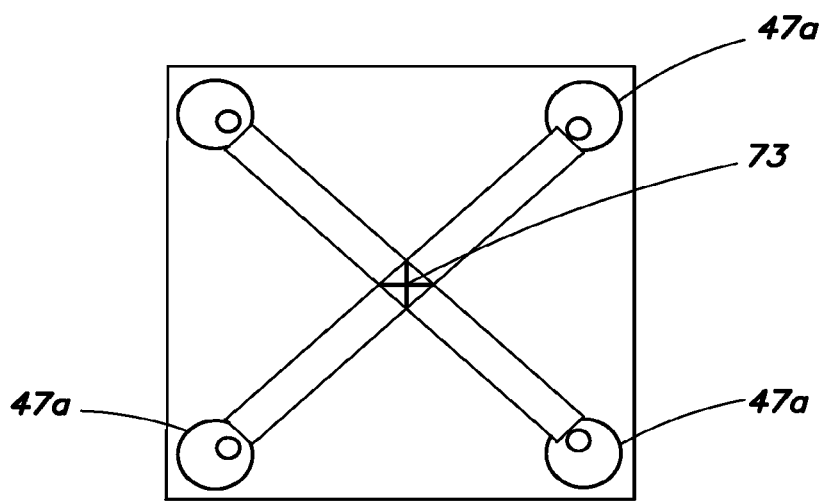
FIG. 21 shows a top view of a part of the support of the FIG. 17 cartridge below the second portion.

In accordance with another aspect of the invention, beverage medium exiting the second portion 47 may be directed to a precursor liquid inlet 47*a*, e.g., where carbonated water is introduced into the cartridge. In this embodiment, the cartridge includes four precursor inlet ports, though other numbers of ports may be used. Also, an upper surface of the support 72 around the spike 73 is arranged to provide flow paths for the beverage medium so as to direct the beverage medium to areas near the precursor liquid inlets 47*a*. For example, FIG. 21 shows a top view of a portion of the support 72 that underlies the second portion 47. In this embodiment, the support 72 defines four flow paths for the beverage medium 42 to travel from near the spike 73 to each of the precursor liquid inlets 47*a*. As a result, when the second portion 47 is pierced by the spike 73 and beverage medium is released, the beverage medium may flow outwardly to the inlets 47*a*. (Flow of beverage medium 42 may occur with both liquid and solid (e.g., powdered) beverage media.) Thus, beverage medium may be encouraged to dissolve more rapidly and/or completely, e.g., because the beverage medium may be divided into relatively small portions to increase its surface area and contact with precursor liquid. It should be understood that other arrangements may be used to route beverage medium movement to a precursor liquid inlet 47*a*. For example, four spikes 73 may be provided on the support 72, with one spike 73 located near a respective inlet 47*a*. Thus, the second portion 47 may be pierced in locations adjacent each inlet 47*a*, causing beverage medium to be released from the second portion 47 directly into the inlets 47*a*. In another embodiment, the spikes 73 may each include a flow channel (e.g., include a hollow piercing needle) so that beverage medium 42 is caused to flow through the spike 73 to a desired location adjacent an inlet 47*a*. Other configurations will occur to those of skill in the art.

Figure 22:
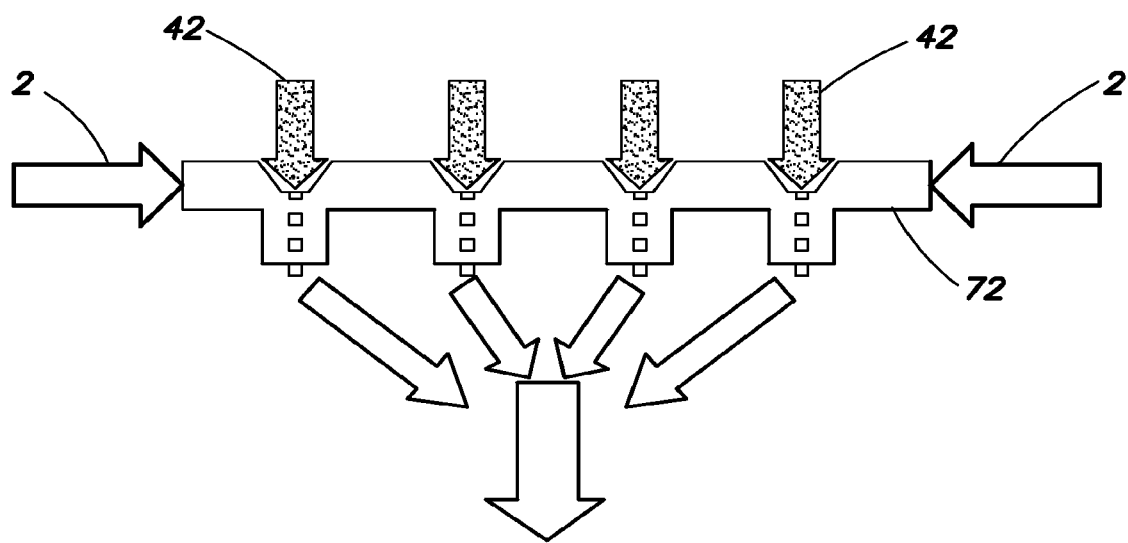
FIG. 22 shows a schematic view of an arrangement in which precursor liquid and beverage media have a coaxial flow.

One feature of the arrangement shown in FIG. 21 is that beverage medium may be introduced to precursor liquid in a direction transverse to the flow of the precursor liquid, which may help break the flow of beverage medium up into smaller particles and increase a dissolution rate. For example, beverage medium 42 introduced at each of the inlets 47*a* may flow generally perpendicularly to the flow of precursor liquid into the inlets 47*a*. Alternately, beverage medium may be directed into a flow of precursor liquid in a coaxial fashion, e.g., a central flow of beverage medium may be surrounded by a coaxial flow of precursor liquid. For example, FIG. 22 shows an illustrative embodiment in which the support 72 includes flow channels to direct precursor liquid 2 to multiple locations where beverage medium 42 is released from the second portion 27, e.g., by multiple spikes 73 on the support 72. The regions where the precursor liquid 2 and beverage medium 42 meet may be configured so that the liquid 2 generally surrounds the beverage medium 42, e.g., in a coaxial flow. The flow rates of the respective flows may be adjusted to help enhance mixing or other characteristics of beverage production, such as foam production, air entrainment, and so on. For example, faster flowing precursor liquid 2 may help to draw and thin the beverage medium 42 flow, thereby helping to increase the surface area of the beverage medium exposed to the liquid. A mixing chamber may be arranged to help enhance this effect, e.g., by providing progressively elongated flow. In addition to potentially aiding mixing, providing a coaxial flow of precursor liquid and beverage medium may also help prevent contact of the beverage medium (which may be relatively more viscous) with a wall of a mixing chamber or other conduit, helping to reduce the chance of the beverage medium sticking to the wall. In fact, less viscous material (precursor liquid) may be directed to the walls of a mixing chamber or other conduit with more viscous material (beverage medium) located away from the walls. In addition, or alternately, a less viscous material may be introduced into a mixing chamber to wet the walls of the mixing chamber prior to introduction of beverage medium, e.g., to help prevent sticking of beverage medium to the chamber wall.

The embodiment of FIGS. 17-20 also includes a third portion 62, located below the second portion 47 and the support 72. Precursor liquid introduced via the precursor liquid inlet 47*a* and beverage medium 42 forced from the second portion 47 may enter into the third portion 62, e.g., for thorough mixing, foam production, or other processing to create a beverage. In this embodiment, the third portion 62 includes a funnel shape, e.g., to induce a swirling motion of the precursor liquid and beverage medium to help with mixing, but could be arranged in other ways. For example, the third portion 62 may include an eductor (e.g., to entrain air, liquid or other materials in a beverage), a jet (e.g., to increase the speed of beverage medium flow and/or contact with surrounding air), a flow straightener (e.g., to help output the beverage from the cartridge in a predictable and desired way), and others. Like the first portion 46, the third portion 62 may be formed unitarily with the support 72 or may be made as a separate component and joined to the support 72. Of course, the third portion 62 is not required for the cartridge, e.g., where a beverage making machine that uses the cartridge 4 includes a mixing chamber or other feature.

Figure 23:
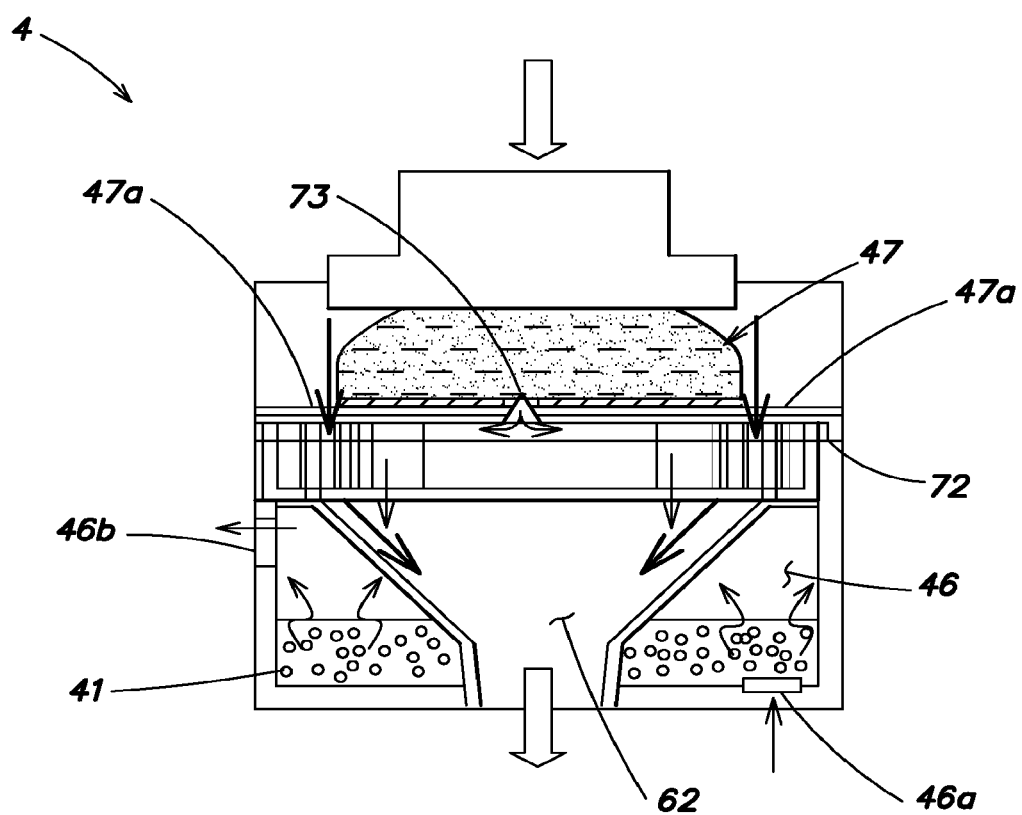
FIG. 23 shows a modification of the FIG. 17 cartridge in which the second portion is positioned over the first portion.
Figure 24:
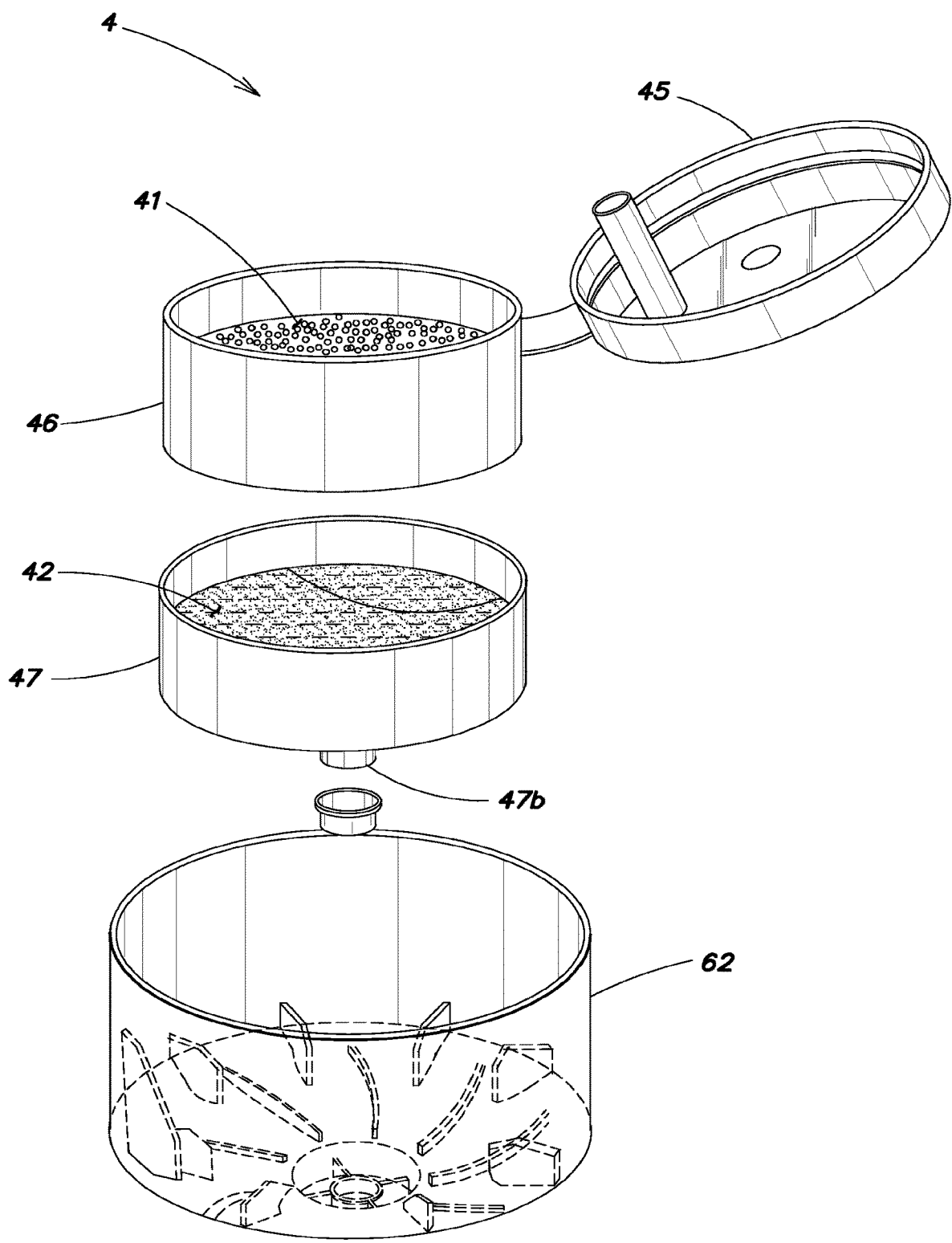
FIG. 24 shows an exploded view of a cartridge having a mixing chamber portion.
Figure 25:
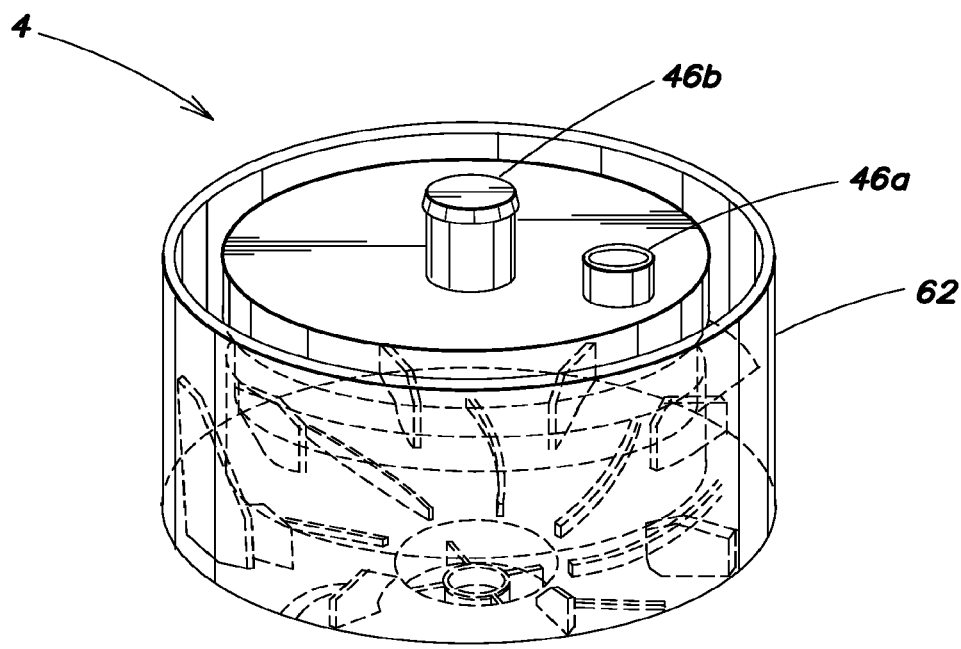
FIG. 25 shows an assembled perspective view of the FIG. 24 cartridge.

While FIGS. 17-20 show an arrangement in which the first and second portions 46, 47 are offset from each other, other configurations are possible. For example, FIG. 23 shows a cross sectional view of a cartridge similar to that in FIGS. 17-20, but with the first chamber 46 located directly below the second portion 47. In addition, the first portion 46 may be arranged around a portion of a third chamber 62, e.g., to help make the cartridge more compact. Thus, the cartridge in FIG. 23 may incorporate aspects of the invention regarding having a second portion 47 above a plane and a first portion 46 below the plane, as well as having the first portion 46 surround a part of the third portion 62. As with the cartridge of FIGS. 17-20, the cartridge in FIG. 23 may include a sidewall that extends around the periphery of the cartridge 4, e.g., to make the cartridge 4 easier to handle by a user, to help protect portions of the cartridge 4 from damage, and/or help orient the cartridge 4 properly when associated with a beverage making machine. The arrangements of FIGS. 17-23 may include other physical features, such as features that help ensure proper orientation and placement of the cartridge 4 when associated with a beverage making machine. For example, the cartridge of FIGS. 17-23 may include a vertical sidewall that extends around the support 72, e.g., forming a wall around the other cartridge 4 portions. The configuration may help protect cartridge components from damage (e.g., accidental piercing of the second portion 47), help make handling of the cartridge easier (e.g., allow the cartridge to be placed on a table without rolling), and/or help properly orient the cartridge with respect to a beverage machine.

In another aspect of the invention, a second portion of a cartridge may include two or more sub-portions that each hold a corresponding volume of beverage medium 42. The cartridge may operate so that a controllable number of the sub-portions is caused to deliver its corresponding charge of beverage medium, e.g., to allow for different amounts of beverage medium to be used in making a beverage, to provide for staged release of different beverage media (e.g., flavoring beverage medium may be released prior to a foaming medium so that the resulting beverage has a foam provided on the top of the beverage), to accommodate the separation of incompatible components (e.g., components that do not mix well with each other or react together in an undesirable way prior to beverage formation), or others. For example, the second portion 47 in the FIG. 23 embodiment may include two or more pouches formed inside of the second chamber 47, e.g., that are separated from each other by a frangible impermeable membrane. Thus, a plunger of the beverage making machine may depress the second portion 47 a corresponding amount to cause delivery of a suitable number of the sub-portions. For example, the sub-portions may be stacked and separated by respective membranes like layers of a cake. Initial depression of the second portion 47 may cause a lowermost sub-portion to open and deliver its contents. Further depression by the plunger may cause a next sub-portion to open and deliver its contents and so on. In this way, any desired number of sub-portions may be deployed, or not, as optionally set by a user of the machine itself. By having separated sub-portions, less than all of the beverage medium in a cartridge may be used to form a beverage while minimizing leakage of the unused beverage medium when the cartridge is removed from the beverage making machine.

Figure 26:
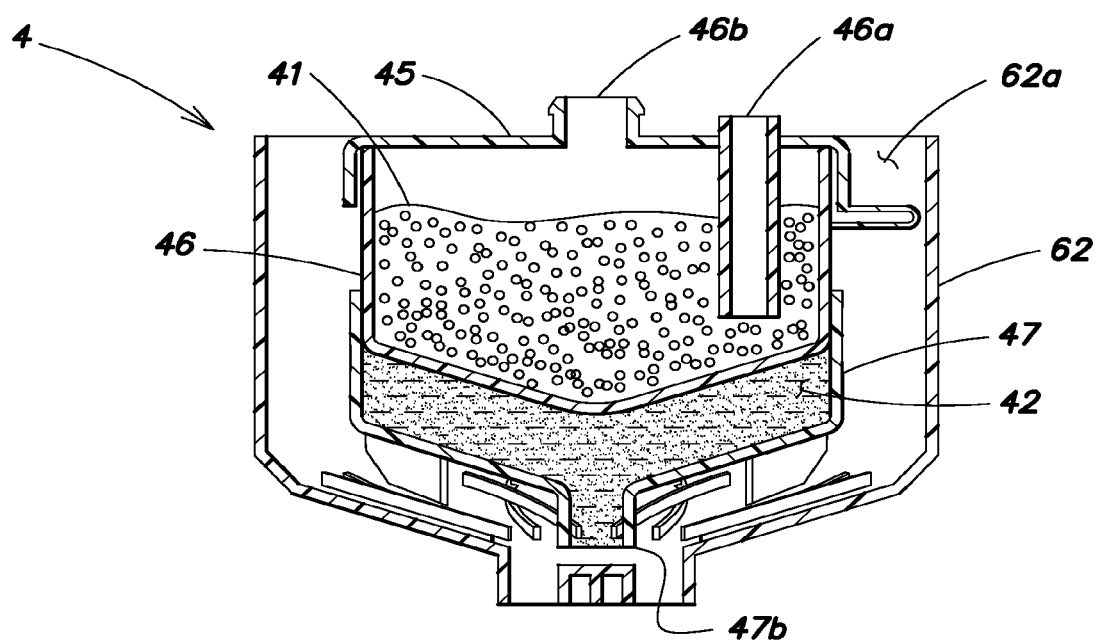
FIG. 26 shows a cross sectional view of the FIG. 24 cartridge.
Figure 27:
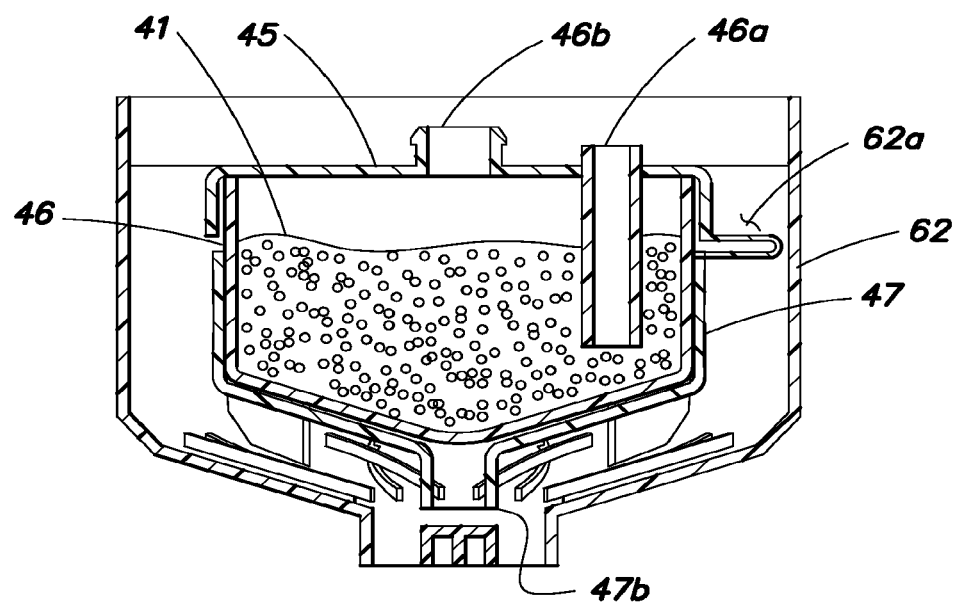
FIG. 27 shows a cross sectional view of the FIG. 24 cartridge with beverage medium expelled from the second portion.

In another aspect of the invention, a first portion of a cartridge may move relative to a second portion to force beverage medium to exit from the second portion. For example, FIGS. 24-27 show an exploded view, a perspective view, a cross-sectional view with a beverage medium in a second portion, and a cross-sectional view with beverage medium expelled from the second portion of a cartridge, respectively, in which a first portion may act as a plunger to drive beverage medium from a second portion of the cartridge. The first portion 46 may be defined at least in part by a first chamber wall, e.g., a cup-shaped element that is received into the second portion 47. The second portion may be defined at least in part by a second chamber wall that defines a second space, e.g., where beverage medium is located. The first chamber wall of the first portion 46 may be received into the second space and be movable relative to the second chamber wall to expel beverage medium from the second portion of the cartridge. For example, FIGS. 26 and 27 show how the first portion 46 may be moved downwardly relative to the second portion 47 so that the first portion is further received into the second portion to force beverage medium from the second portion. In essence, the first portion 46 may function as a plunger in the second space of the second portion 47 to force beverage medium 42 to the outlet of the second portion. Movement of the first portion 46 relative to the second portion 47 may be caused in any way, such as by a beverage making machine including a motor drive that moves the first portion 46, introducing gas pressure (e.g., created by the gas source 41) into a bladder that expands to cause movement of the first portion 46, moving the second portion 47 upwardly relative to the first portion 46 (which may remain stationary relative to the machine), and so on. Also, the cartridge 4 may include a lock element that prevents relative movement of the first and second portions 46, 47 until released by a user and/or a beverage making machine. The second portion 47 may include an outlet closure at the beverage medium outlet 47b that opens in response to increased pressure in the second portion 47, in response to piercing, mechanical fracture, etc. Thus the outlet 47b of the second portion 47 may open in any suitable way to allow for beverage medium 42 to exit the second portion 47.

Another aspect of the invention incorporated into this embodiment is that a mixing chamber portion of the cartridge (a third portion) may partially surround the first and second portions 46, 47. Such an arrangement may help to make the cartridge 4 more compact, as well as provide a larger space in which precursor liquid and beverage medium can move to help with mixing. In addition, when coupled with an arrangement in which the first portion is received in the second portion, the overall size of the cartridge may be reduced, particularly after use of the cartridge. It is also possible to make the third portion reusable, e.g., a user could remove and clean the third portion as needed, and replace the first and second portions for each new beverage to be made. This feature may help reduce waste, yet provide the user with the ability to replace a third portion used with the cartridge only as needed. In this embodiment, the third portion 62 is arranged with vanes, fins or other features to help induce movement of precursor liquid and beverage medium, e.g., to help with mixing. However, other arrangements are possible. (As with any features described herein, the use of vanes, fins or other features to help induce mixing may be used with any suitable cartridge configuration.)

Moreover, different arrangements for the third portion 62 may be provided for different beverages. For example, highly carbonated beverages made with readily dissolvable beverage media may have the third portion arranged to induce little movement, e.g., to help reduce loss of carbonation due to turbulent motion of the liquid. However, with other beverages, such as hot chocolate, more turbulent motion may be induced in the third chamber to help with mixing, and with no concern for loss of carbonation (since the beverage is not carbonated). Thus, a beverage making machine may be configured to make a wide variety of hot, cold, carbonated, still and other beverages by, at least in part, providing different cartridge arrangements.

Close proximity of the gas source 41 and the beverage medium 42 in a cartridge 4 may provide the cartridge 4 with the ability to control or use heat generated by the gas source 41. For example, heat emitted by a zeolite gas source material during gas release may be absorbed by a beverage medium 42. In the case where the beverage medium 42 is a relative viscous liquid at lower temperatures, heating of the beverage medium 42 by the gas source 41 may reduce the viscosity of the beverage medium and enhance its dissolution into precursor liquid. In addition, or alternately, receipt of heat by the beverage medium 42 or other portion of the cartridge 4 from the gas source 41 may help prevent or otherwise resist excessive heat buildup in the cartridge 4. This may help reduce the risk of heat damage to the cartridge and/or help the gas source 41 emit gas more efficiently, e.g., where high heat levels may inhibit gas release.

In another aspect of the invention, a cartridge may be arranged to have a gas outlet and a beverage medium outlet on a same side of the cartridge container. In some embodiments, the cartridge may further have an activator inlet through which fluid is provided to activate a gas source and/or a precursor liquid inlet through which precursor liquid is introduced into the container for mixing with the beverage medium on a same side of the container as the gas outlet and the beverage medium outlet. Such an arrangement may make for a conveniently handled and used cartridge. For example, by providing inlet(s) and outlet(s) on a same side of the cartridge, an interface between the beverage making machine and the cartridge may be simplified. For example, in some cases, a cartridge may be simply plugged into or otherwise associated with the beverage making machine in a simple way with needed connections made in one local area on a single side of the cartridge.

Figure 28:
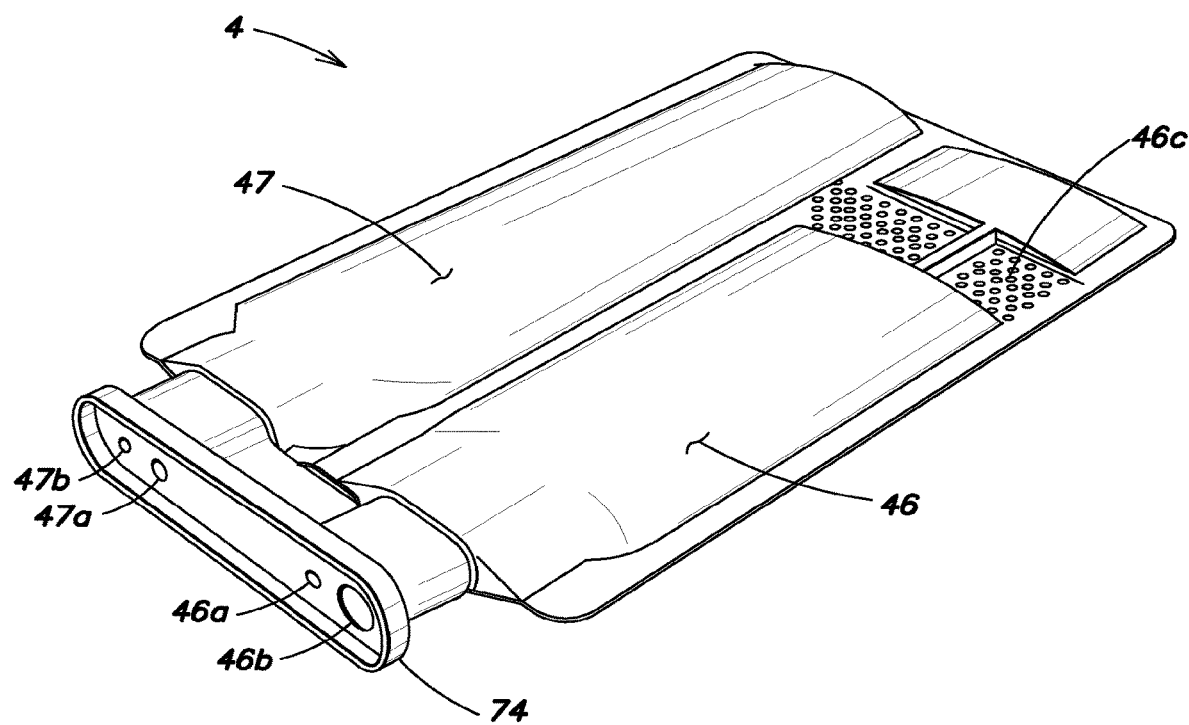
FIG. 28 shows a perspective view of a cartridge including side-by-side gas source and beverage medium portions.
Figure 29:
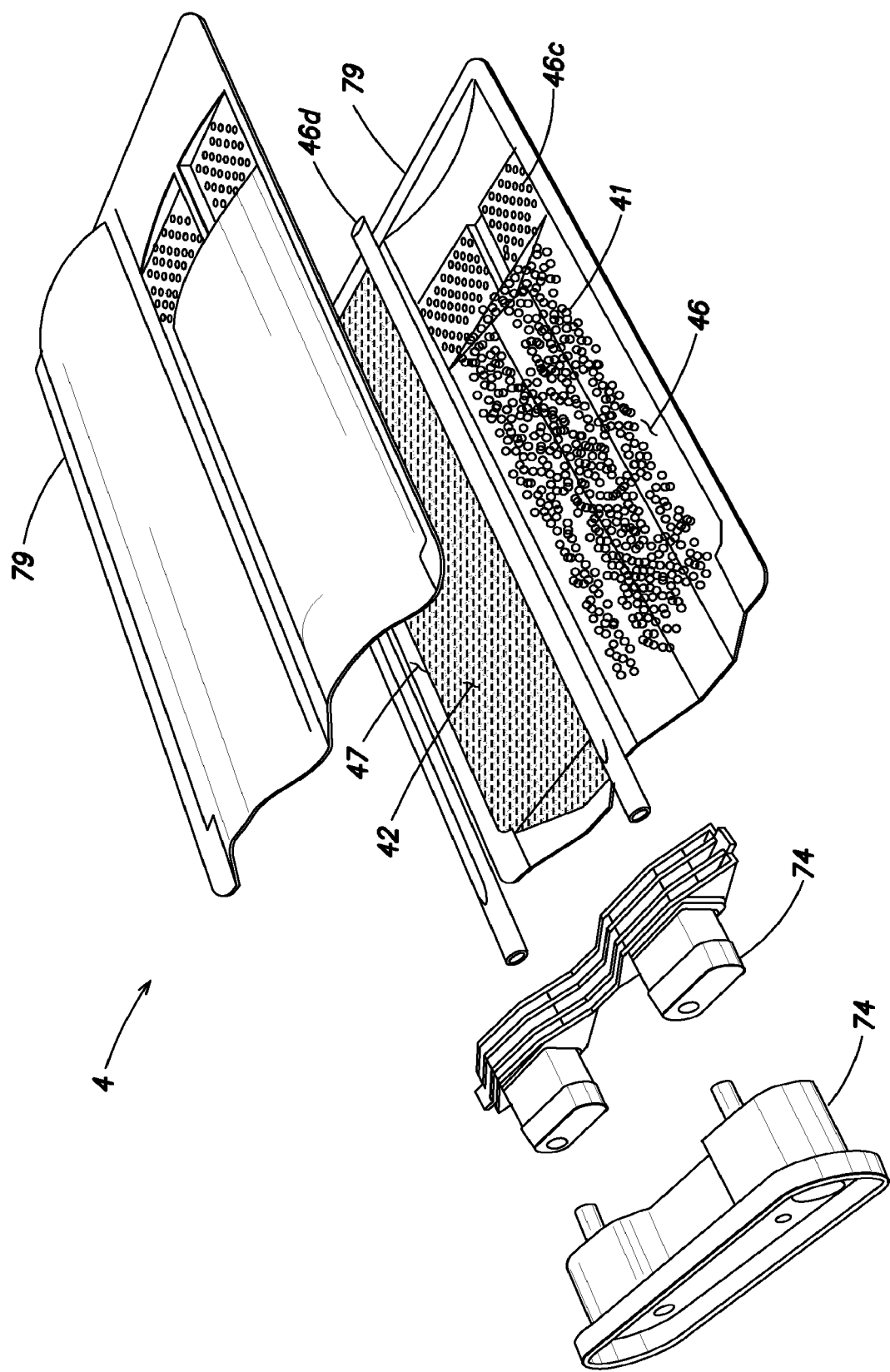
FIG. 29 shows an exploded view of the FIG. 28 cartridge.
Figure 30:
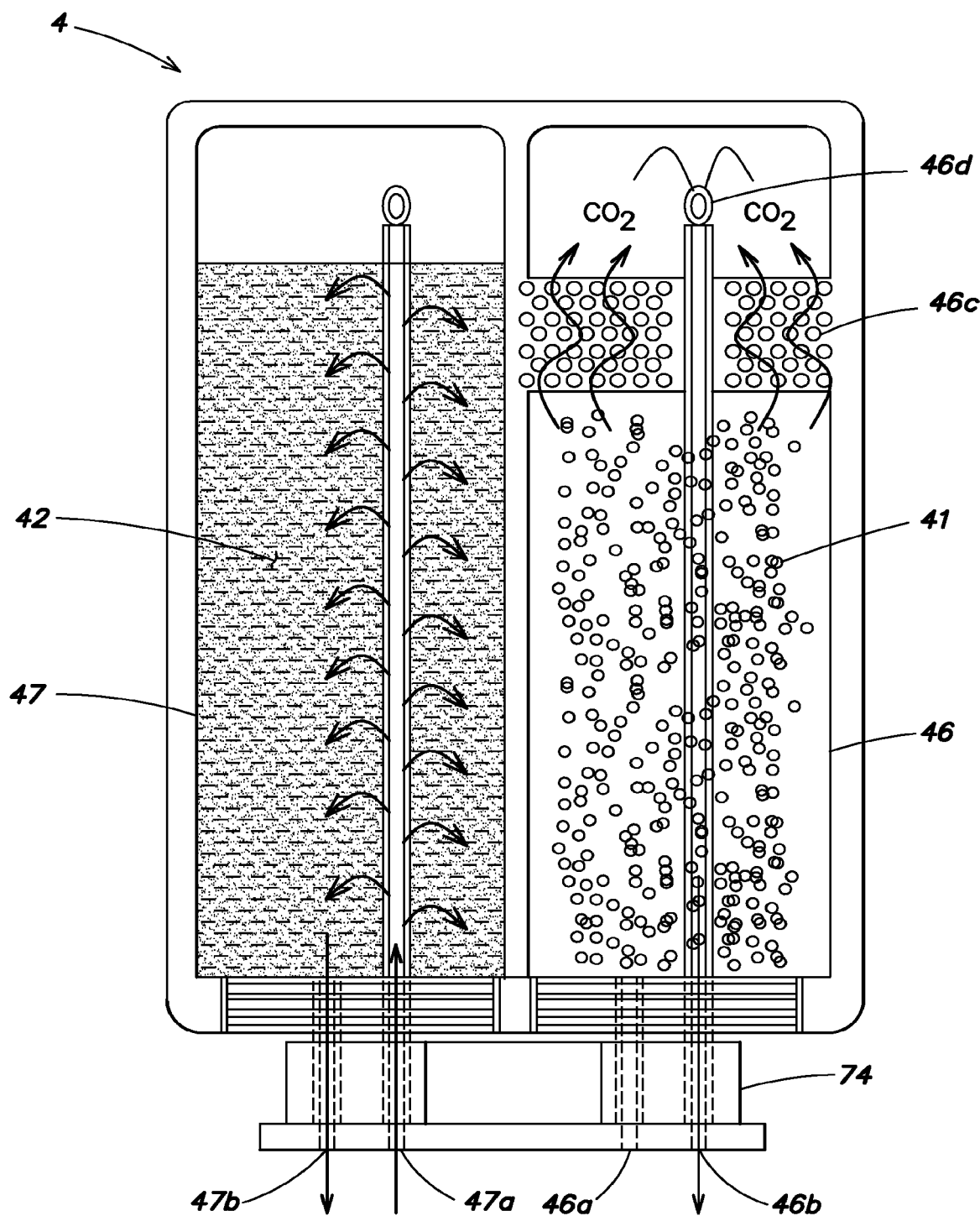
FIG. 30 shows a cross sectional view of the FIG. 28 cartridge.

FIGS. 28-30 show an illustrative embodiment of a cartridge that includes a gas outlet, beverage medium outlet, activator inlet and precursor liquid inlet all located on a same side of the container. While a cartridge having these features may be arranged in other ways, in this embodiment, first and second portions 46, 47 of the cartridge container are formed by a pair of layers of barrier material 79, e.g., a foil laminate, that are joined together to form a pair of pouches for the first and second portions 46, 47. Of course, the container could be arranged otherwise, e.g., by a molded plastic body that defines the first and second portions 46, 47 with a shape like that shown in FIG. 28. The layers of barrier material 79 are bonded together to form the first and second portions 46, 47, and are also joined to an insert 74 that defines, at least in part, the gas outlet 46b, activator inlet 46a, precursor liquid inlet 47a and beverage medium outlet 47b. The insert 74 in this embodiment includes a pair of molded plastic parts arranged to not only define the inlets/outlets, but also to enhance bonding of the barrier layers to the insert 74. For example, an inner part of the insert 74 may be bonded to the barrier material 79, allowing the cartridge 4 to be provided with gas source 41 and beverage medium 42, and then the outer part of the insert 47 (which may define the inlet/outlet interfaces to the beverage making machine) to be engaged, closing the first and second portions 46, 47. However, other arrangements are possible, such as one in which the insert 74 is eliminated and the layers of barrier material 79 are pierced to form the inlets/outlets as needed, or a single piece insert 74. In this embodiment, the insert 74 is arranged to close the inlets/outlets, e.g., by a foil lid, and require piercing at each of the inlets/outlets to open the inlets/outlets. Alternately, one or more of the inlets/outlets may include a closure that can be opened by breaking off a tab, peeling a foil cover from the inlet/outlet, exposing the inlet/outlet to a suitable pressure threshold to cause the closure to burst or otherwise open, and so on.

By forming the first and second portions 46, 47 in a side-by-side arrangements like that in FIGS. 28-30, a surface area between the first and second portions 46, 47 may be reduced and/or have its moisture permeability reduced so as to reduce migration of moisture from the beverage medium 42 in the second portion 47 into the first portion 46. That is, if the beverage medium includes moisture (such as with some concentrated syrups), water may migrate from the beverage medium 42 and into the first portion 46, which may cause partial activation of a gas source 41 (if the gas source 41 is activatable by water). This may cause problems where a wall or other element separating the beverage medium 42 from the gas source 41 is relatively permeable. However, a side-by-side arrangement like that in FIGS. 28-30 may allow for adjustment of the width of the barrier layer seal between the portions 46, 47, thereby controlling the permeability of the joint. Other arrangements may be used to reduce moisture migration between the first and second portions 46, 47 (or other cartridge portions), such as through a choice of materials, relative positions of the first and second portions 46, 47 (e.g., moisture is very unlikely to travel from the beverage medium 42 to the gas source in the embodiments of FIGS. 12 and 17, for example, because of the physical separation of the portions), and so on.

Another aspect of the invention incorporated into this embodiment is that the gas outlet 46b includes a conduit 46d that extends from the gas outlet, through the gas source part of the first portion (i.e., where the gas source 41 is located), through a filter 46c, and into the gas outlet part of the first portion. While in this embodiment the conduit 46d is formed by a tube, the conduit 46d could be formed by the barrier layers themselves, e.g., by joining the barrier layers in a way to form a conduit 46d. In accordance with another aspect of the invention and as can be seen in FIGS. 28-30, the barrier layers are joined together in a pattern to form a filter 46c that helps to keep gas source materials 41 in a gas source part of the first portion and permits primarily gas to pass through the filter 46c to a gas outlet part of the first portion where the gas can enter the conduit 46d and pass to the gas outlet 46b. While the pattern in which the barrier layers 79 may be joined together to form the filter 46c can vary, in this embodiment, the barrier layers are joined at locations having a circular (or other suitable) shape that are separated from each other by a suitable distance and configuration to help prevent gas source materials 41 from passing between the joined areas. Other arrangements are possible for the filter 46c however, such as a piece of filter paper, a hydrophobic non-woven material that permits gas to pass, but resists liquid passage, or other element that permits gas to move toward the conduit 46d, but resists movement of gas source material and/or liquid. In addition or alternately to the filter 46c, the conduit 46d may include a filter element, such as a filter plug in the conduit 46d, to help further resist movement of gas source materials 41 from the gas outlet 46b. In accordance with another aspect of the invention, a conduit of the gas outlet 46b may extend from a bottom of the first portion 46 to a top of the first portion 46 without the presence of a filter 46c. Instead, gravity may be relied on to maintain gas source material 41 from traveling toward a top of the first portion 46 and entering the conduit 46d. Alternately, a filter in the conduit 46d (such as a plug mentioned above) may function to resist entry of gas source material into the conduit 46d. Thus, the distal end of the conduit at the upper end of the first portion 46 may receive emitted gas and conduct the gas to the gas outlet 46b.

The way in which the barrier layers 79 are joined together to form the first chamber 46, e.g., including the filter 46c, may help to hold the gas source material 41 in a fixed bed arrangement. That is, the gas source 41 may be held relatively firmly, so that the gas source 41 does not freely move in the first portion 46. This may help with controlled wetting of the gas source 41, since the distribution of the gas source in the first portion 46 may be known, and the interaction of activating fluid with the gas source predictable and repeatable. The gas source 41 may be arranged to allow for free movement of gas through the fixed bed of materials, e.g., by sizing and shaping particles of gas source material so as to prevent extremely close packing. In another embodiment, rather than have the cartridge arranged to exert a force on the gas source 41 so as to form a fixed bed of material, an external force may be exerted on the first portion 46 to provide a fixed bed of material. For example, the air bladder arrangement discussed above may be used to squeeze the gas source 41 in the first portion 46, thereby preventing flowing of the gas source 41 in the first portion 46. In other cartridge embodiments, such as that in FIG. 24, for example, the first portion 46 may include a component, such as a resilient sponge material or a permeable membrane that is positioned at the top of the gas source 41 and is attached to the wall of the first portion 46, to help keep the gas source 41 in a fixed bed arrangement.

Another aspect of the invention incorporated into this embodiment is that the precursor liquid inlet 47a may include a conduit extending into the second portion 47 that is arranged to introduce precursor liquid into the second portion at multiple locations along the conduit. Such an arrangement, e.g., as can be seen in FIG. 30, may help to better distribute the liquid in the second portion and mix the precursor liquid with the beverage medium which exits the second portion 47 via the beverage medium outlet 47b. Features may be provided to help prevent entry of beverage medium 42 into the conduit and its perforations or other openings, e.g., to help ensure even and predictable flow of precursor liquid into the second portion 47. For example, a perforated conduit may be sheathed in a frangible cover that separates the conduit from the beverage medium 42 prior to use, but breaks, dissolves or otherwise opens to permit entry of precursor liquid into the second portion 47. In another embodiment, the conduit may include a plug, filter or other component to help prevent ingress of beverage medium into the conduit and/or its perforations. As with the gas outlet conduit, the precursor liquid inlet conduit could be formed by the barrier layers, e.g., which may be joined to form a flow path extending along the length of the second portion 47, as well as to have multiple outlets along its length to help distribute fluid into the second portion 47. Such outlets may be formed to be closed prior to cartridge use, but may burst or otherwise open with the introduction of precursor liquid into the second portion 47. This arrangement may also provide the additional feature of allowing the second portion 47 to be squeezed flat to expel beverage medium. In yet another embodiment, the precursor inlet 47a may include a trouser valve, e.g., a flat, relatively flexible tube, that may be folded or rolled in the second portion prior to use of the cartridge. With introduction of precursor liquid into the inlet 47a, the trouser valve may unroll/unfold, allowing precursor liquid to enter the second portion 47. However, the rolled/folded configuration of the valve prior to deployment may help prevent the ingress of beverage medium into the precursor liquid inlet 47a.

Another aspect of the invention relates to the arrangement that allows the second portion 47 to be squeezed or otherwise manipulated by an external force to cause beverage medium to be expelled from the beverage medium outlet 47b. This feature may be used whether or not precursor liquid is introduced into the second portion 47. For example, the cartridge may be modified to eliminate the precursor liquid inlet 47a, and instead, the second portion 47 may be squeezed to force the beverage medium 42 to exit via the beverage medium outlet 47b, e.g., for mixing with precursor liquid outside of the cartridge 4. Alternately, the second portion 47 may be squeezed after precursor liquid has been introduced into the second portion 47, e.g., to help remove liquid from the second portion and reduce dripping of the cartridge when removed from the beverage making machine. In yet another arrangement, a cartridge holder of a beverage making machine may apply a force to the cartridge that tends to squeeze the second portion 47 and expel beverage medium 42, but with a force or pressure that is less than a pressure of precursor liquid introduced into the second portion 47. Thus, the second portion 47 may expand to receive precursor liquid 2, but when precursor liquid 2 stops, the cartridge holder may squeeze the second portion 47 to substantially evacuate its contents. The cartridge holder may apply the squeezing force in any of a variety of ways, such as by employing an air bladder to which a suitable air pressure is applied to squeeze the cartridge in the cartridge holder. The force of the air bladder or other component may vary during use of the cartridge, e.g., to help with mixing and/or expulsion of beverage medium from the second portion 47. For example, a pressure applied to the bladder may be relatively high during an initial portion of the beverage making cycle to expel beverage medium from the second portion 47 and reduce the volume of the second portion 47. Thereafter, the pressure of the bladder may be released or otherwise reduced, allowing precursor liquid to be introduced into the second portion 47, enlarging its volume. Again, the pressure of the bladder may be increased to expel mixed liquid and beverage medium from the second portion 47, and reducing the volume of the second portion 47. This cycling of the bladder pressure may be repeated to effect better mixing in the second portion 47 and/or complete expulsion of beverage medium 42. Again, an air bladder is not required to perform this function, as other arrangements, such as a motor driven wall, plunger, roller, etc., may be used. In short, the cartridge may be manipulated by an external force prior to, during or after introduction of precursor liquid to help with mixing, expulsion of beverage medium, and/or reducing dripping of the cartridge after use.

Figure 31:
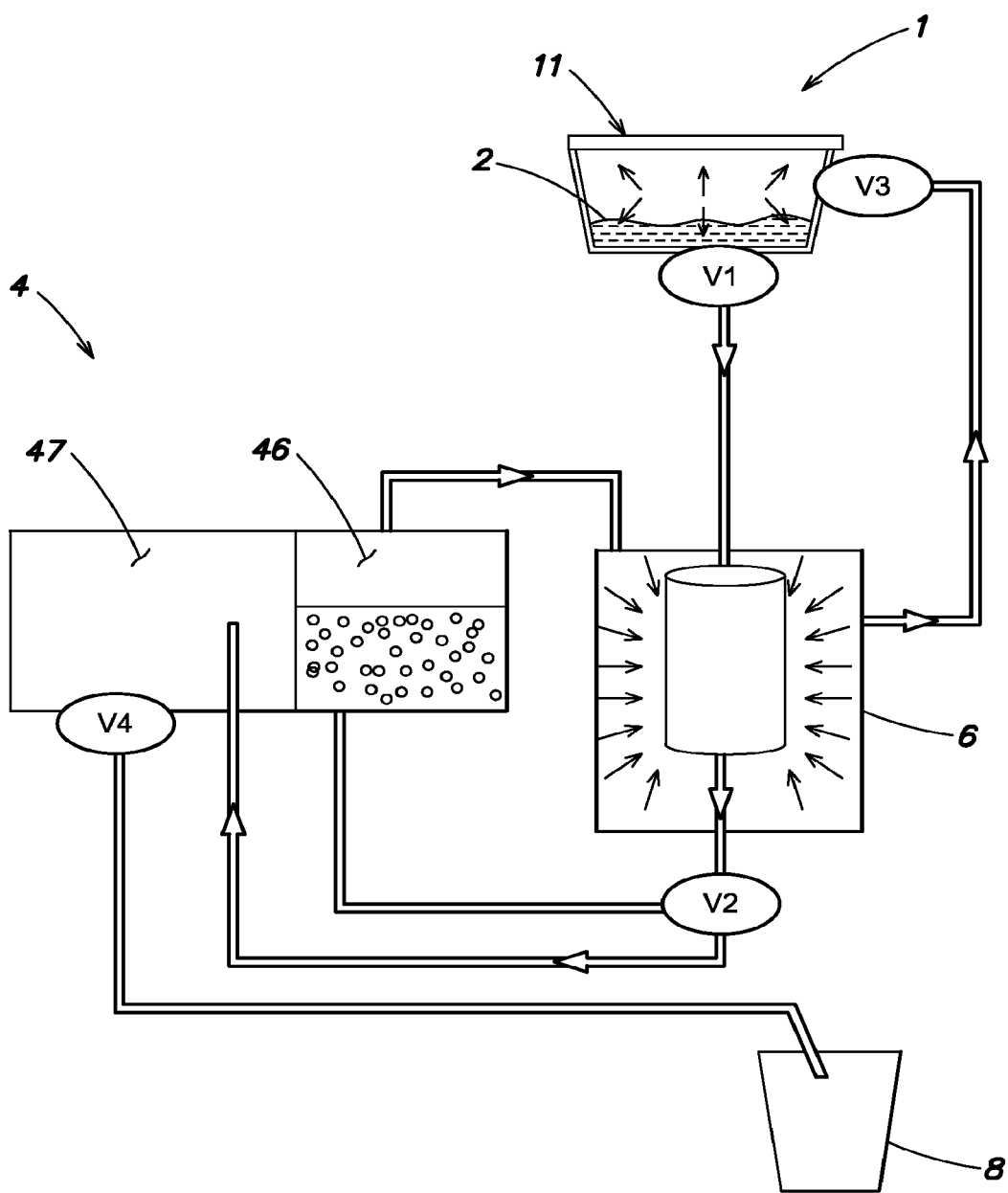
FIG. 31 shows a schematic view of a beverage making system employing gravity and/or pressure feed of precursor liquid.

As mentioned above, the system schematics shown in FIGS. 1-4 are only a few of the possible arrangements regarding a beverage making system 1. For example, FIG. 31 shows another schematic diagram of a beverage making system 1 that may use any of the cartridge arrangements discussed herein or an alternate cartridge arrangement. In this embodiment, a reservoir 11 is arranged to provide precursor liquid 2 to a contactor 6 by gravity feed and/or gas pressure. Of course, other arrangements are possible for moving liquid from the reservoir 11 to the contactor 6, such as the use of a pump. Also, although a contactor 6 is shown in this illustrative embodiment and others discussed below, other carbonation or gas dissolving devices may be used instead, such as a carbonation tank. The system 1 of FIG. 31 may operate as follows: valves V1 and V2 may be opened, allowing delivery of liquid 2 to the first portion 46 of a cartridge 4 by gravity feed via the contactor 6. The liquid 2 may activate a gas source 41, which emits gas that is directed to the contactor 6. Some of the gas introduced into the contactor 6 may be dissolved in liquid 2 in the contactor 6, while another portion of the gas may be directed to the reservoir 11. Gas provided to the reservoir 11 may increase a pressure in the reservoir 11, forcing liquid 2 to flow toward the contactor 6. Pressure in the reservoir 11 may help to increase the overall carbonation level of the precursor liquid, e.g., by pre-carbonating the water as the reservoir 11 acts as a carbonation tank. Increased acidity of the liquid 2 in the reservoir 11 may also help reduce scale build up and/or bacterial growth in the reservoir. The pressure in the reservoir 11 may be controlled by controlling a valve V3 to control an amount of gas admitted into the reservoir 11. In addition, the valve V2 may be controlled to control the amount of liquid 2 that enters the first portion 46, thereby controlling activation of the gas source 41. The valve V2 may be operated to pass liquid 2 having a suitable amount of dissolved gas (e.g., carbonated liquid 2) to the second portion 47 of the cartridge 4 for mixing with beverage medium 42. Another valve may be provided to vent gas from the gas dissolution device (e.g., contactor 6) in this and other embodiments, if desired. An optional valve V4 may be opened to allow the formed beverage to flow to a waiting cup or other holder 8, and an optional valve may be opened to vent gas pressure from the gas side of the contactor 6. By feeding gas emitted by the gas source 41 to the reservoir 11, the system may be flushed of liquid, e.g., by the gas pushing liquid out of the reservoir 11, the contactor 6 and the second portion 47 of the cartridge 4. This may help prevent dripping of the cartridge 4 when it is removed from the system 1 and/or help prevent liquid from stagnating in the system 1 between uses. A volume of liquid used to form the beverage may be controlled by a user, e.g., by providing a desired amount of liquid into the reservoir 11, or by the system 1 itself, such as by a fill level sensor that operates to fill the reservoir 11 to a suitable level, by a flow meter that detects a volume of water delivered to the second portion 47, and so on.

Figure 32:
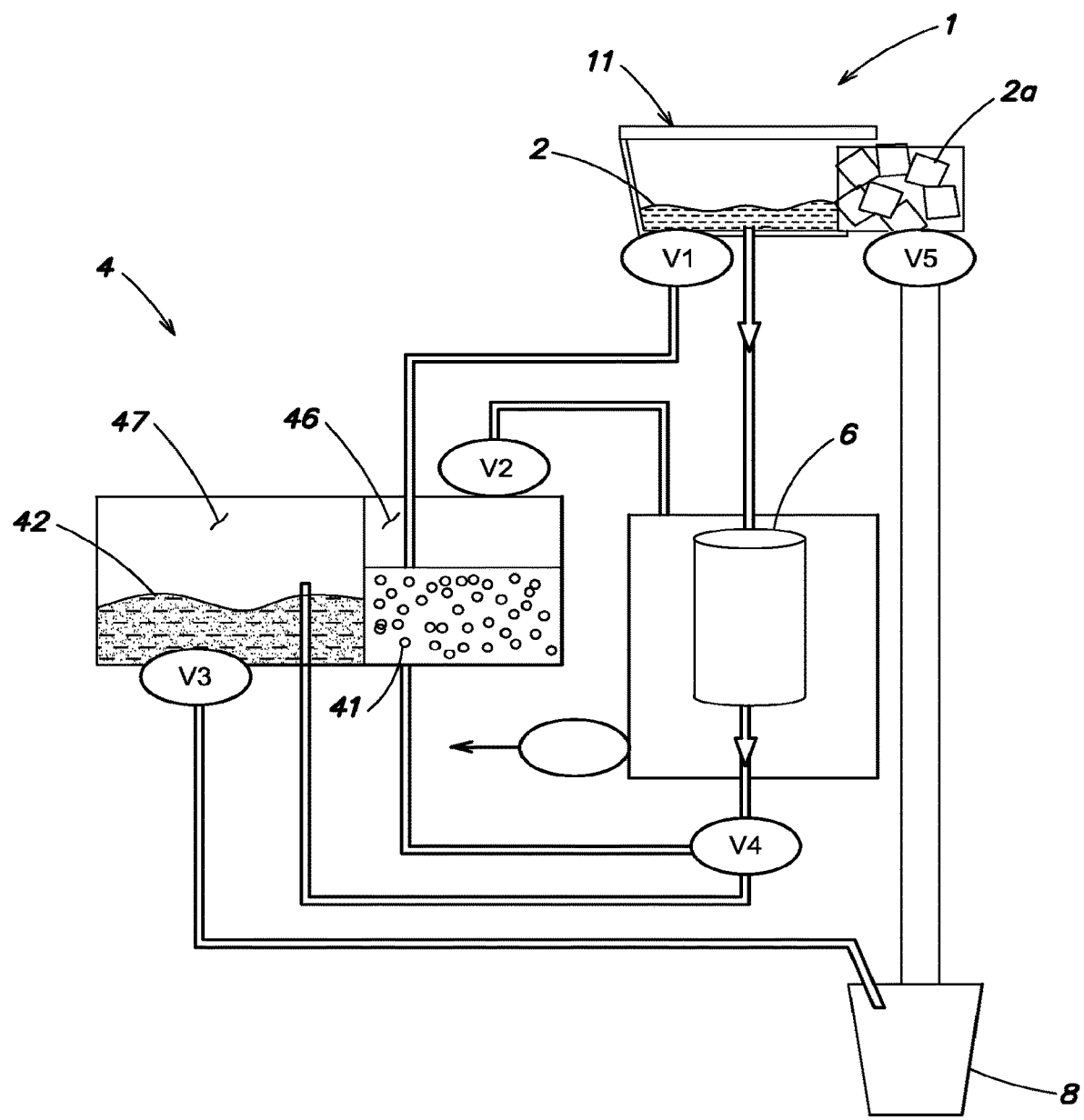
FIG. 32 shows a schematic view of a beverage making system with an ice dispensing function.

FIG. 32 shows a schematic diagram of another beverage making system 1, which again, can be used with any suitable cartridge arrangement. In this embodiment, a reservoir 11 provides precursor liquid 2 to a contactor 6 under the control of a valve V4. Liquid 2 may flow into the contactor 6 by gravity, pump, gas pressure, etc., although in this embodiment gravity is employed. Liquid provided to the gas source 41 to activate the gas source 41 is controlled by a valve V1, which may control flow based on any suitable characteristic, such as elapsed time, a sensed gas pressure, a detected volume in the cartridge 4, etc. With suitable gas emitted by the gas source 41 and routed to the contactor 6, the valve V4 may be opened to permit now carbonated liquid or other liquid having dissolved gas to flow into the second portion 47 of the cartridge 4 for mixing with the beverage medium 42. Again, the liquid need not be routed to the second portion 47, but instead may be routed to a mixing chamber portion of the cartridge or other area where beverage medium is mixed with the liquid 2. Alternately, the liquid 2 may pass directly to the cup 8 where the liquid is mixed with a beverage medium. A valve V3 may be opened to allow beverage to flow from the cartridge 4 to the cup 8. At a suitable timing, e.g., before, during or after beverage formation, a valve VS may open to allow ice 2a to pass into the cup 8. The ice 2a may additionally serve to help cool the precursor liquid 2 in the reservoir 11 before passing to the cup 8. A filter or other separator may be employed in the reservoir 11 between the ice and the precursor liquid 2, e.g., to help reduce bacterial contamination of the precursor liquid 2 by the ice 2a. That is, ice 2a may be stored in the reservoir 11 in a compartment separate from the liquid 2, e.g., by a permeable or impermeable barrier, and delivered to the cup 8 upon opening of the valve VS. It should also be noted that any gas pressure in the contactor 6 may be vented by a valve or other suitable arrangement before, during or after beverage formation.

Figure 33:
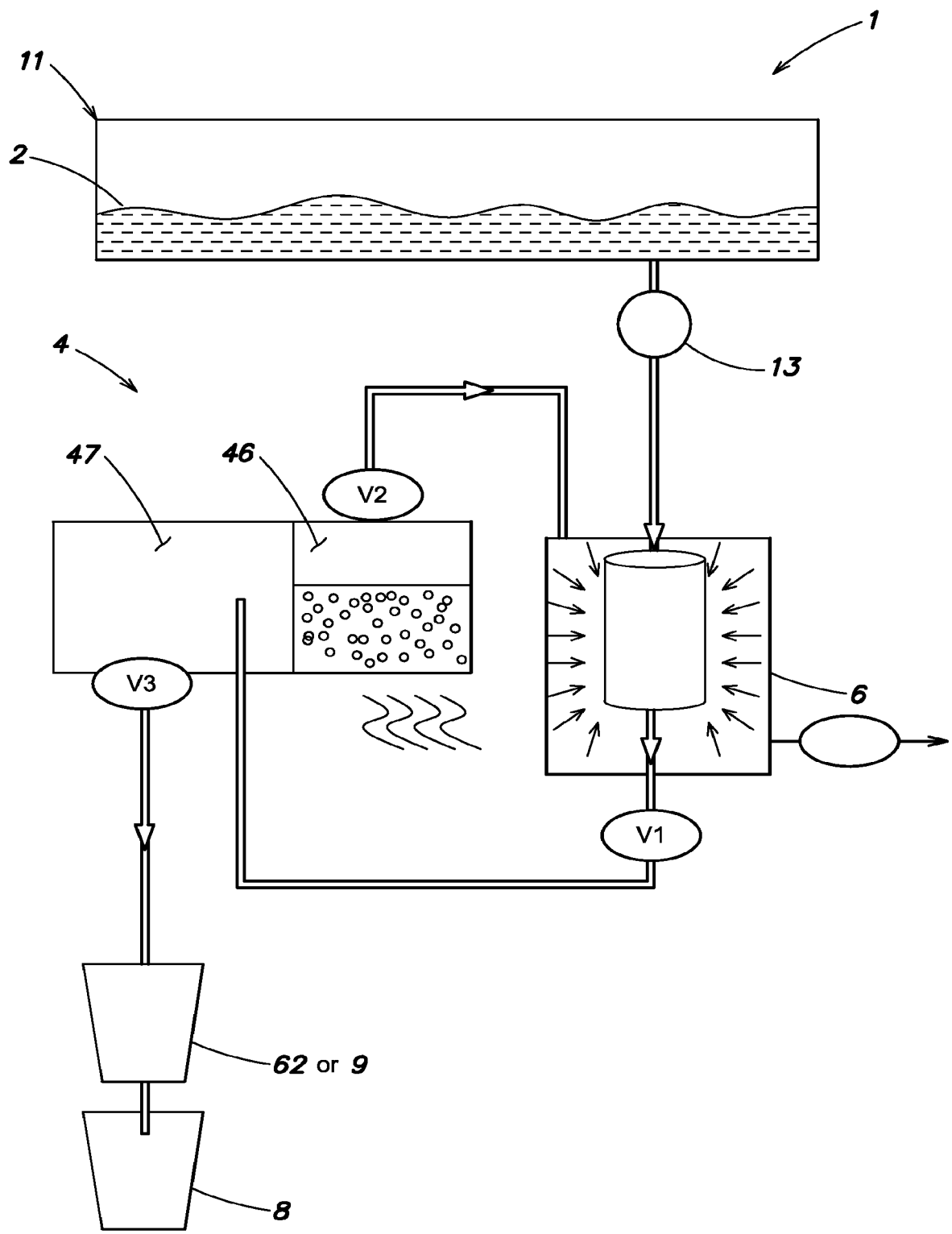
FIG. 33 shows a schematic view of a beverage making system employing heat or other activation of a gas source.

FIG. 33 shows another schematic diagram of a beverage forming system 1 that, like others, may be used with any suitable number and/or combination of aspects of the invention or other features. In this embodiment, the reservoir 11 may hold a volume of precursor liquid 2 equal to several beverages. Thus, the system 1 may make multiple beverages without requiring the addition of liquid to the reservoir 11. A pump 13 and valve V1 control the flow of liquid through a contactor 6 and to the second portion 47 of a cartridge 4. The gas source 41 may be activated in any suitable way to emit gas that is routed to the gas side of the contactor 6 under the control of a valve V2. For example, the gas source 41 may emit gas in response to being exposed to microwave energy, thermal heat energy, other electromagnetic radiation, liquid water or water vapor, etc. Gas emitted by the gas source 41 may be dissolved in the liquid 2 in the contactor 6, which may then be mixed with beverage medium 42 in the cartridge 4 or elsewhere. A valve V3 may control the flow of beverage from the system 1, e.g., through a nozzle which may be incorporated into the cartridge and may help to further mix the liquid and beverage medium, may help direct the beverage into a cup 8, may help to aerate or form a foam in the beverage, etc.

Although FIGS. 31-33 are described as involving the direction of all or substantially all of the precursor liquid 2 used to form a beverage through the cartridge 4, other arrangements are possible. For example, as discussed above, only a portion of the liquid 2 may be routed through the cartridge 4, e.g., to expel beverage medium 42 from the cartridge to the cup 8 (or other mixing chamber), while a remaining portion of the liquid 2 is routed directly to the cup 8 (or other mixing chamber). Also, a chiller circuit, e.g., including a thermoelectric device, refrigeration device, heat exchanger that employs user-supplied ice, or other arrangement, may be included in the system 1 to chill the precursor liquid 2 before, during and/or after gas dissolution, and/or before, during and/or after mixing of beverage medium with the precursor liquid.

Figure 34:
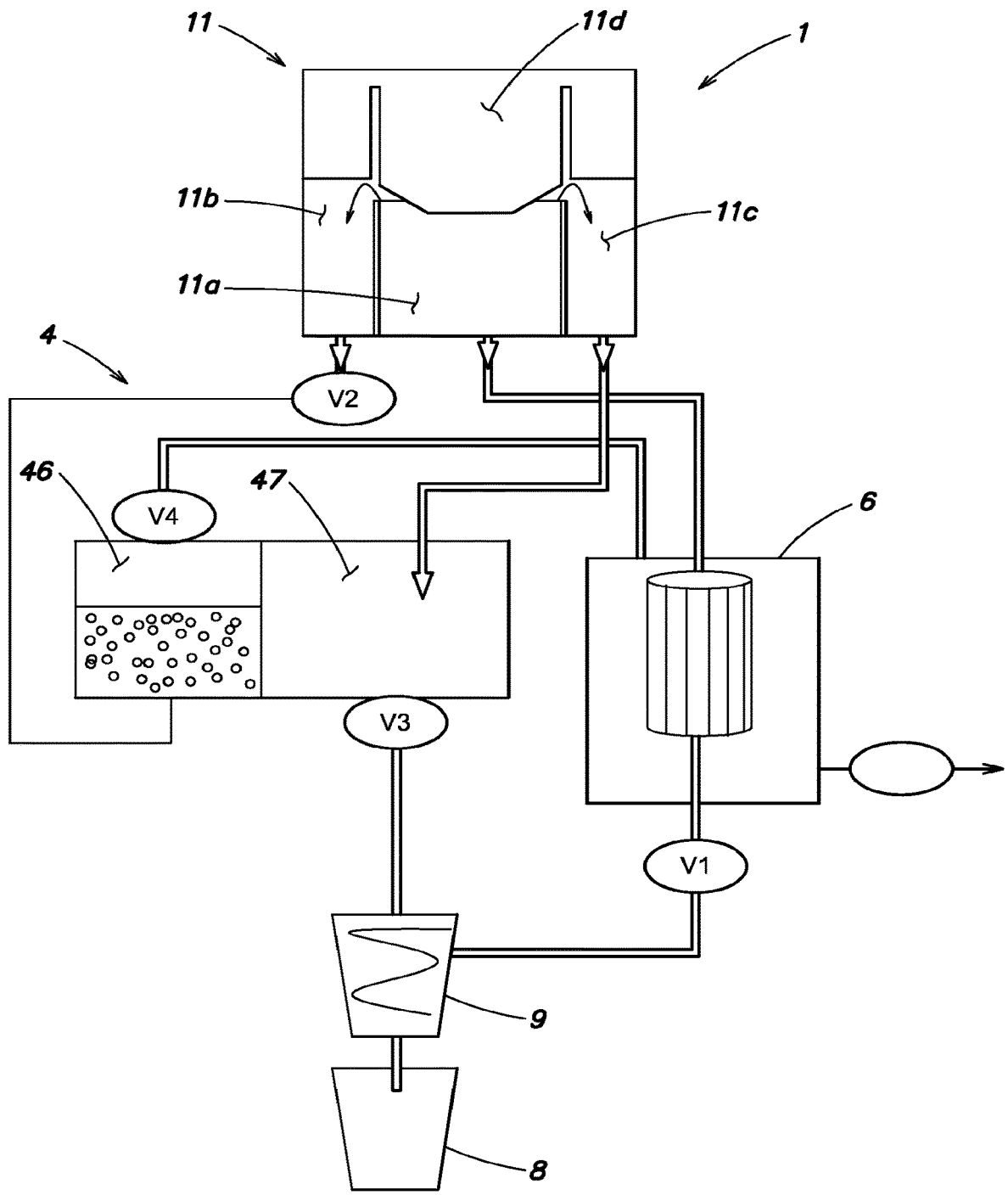
FIG. 34 shows a schematic view of a beverage making system employing a plunger to supply precursor liquid.

FIG. 34 shows another illustrative embodiment of a beverage making system 1. In this embodiment, a reservoir 11 includes three portions, i.e., a main reservoir portion 11a, a gas source activating portion 11b and a pre-mix portion 11c. Initially the main reservoir portion 11a may be filled to a desired level, and the gas source activating portion 11b and the pre-mix portion 11c may be empty. At the start of a beverage formation cycle, a plunger lid may be lowered into the main reservoir portion 11a, which causes a controlled amount of precursor liquid 2 to spill or otherwise be directed into the gas source activating portion 11b and the pre-mix portion 11c. Thereafter, as the plunger 11d is inserted further into the main reservoir portion 11a, the plunger 11d may form a seal with the main reservoir portion 11a, preventing any further amounts of liquid 2 from being passed into the gas source activating portion 11b and the pre-mix portion lie. Further lowering of the plunger 11d (and with opening of the valve V1) may cause liquid 2 to pass from the main reservoir portion 11a through the contactor 6. In addition, liquid 2 in the gas source activating portion 11b may be forced through the (open) valve V2 and into the first portion 46 of the cartridge to activate the gas source 41. The valve V2 may control an amount of liquid passed to the first portion 46, e.g., to control an amount and/or pressure of gas emitted, provided that with the valve V2 closed, liquid in the portion 11b is permitted to exit with movement of the plunger 11d so as not to resist its movement. A pressure of gas emitted by the gas source that is passed to the contactor 6 may be additionally, or alternately, controlled by a pressure regulating valve V4. Thus, a desired gas pressure may be maintained in the gas side of the contactor 6. Liquid 2 in the pre-mix portion 11c may also be forced to flow into the second portion 47 of the cartridge 4 to mix with beverage medium 42. Mixing of the liquid and medium may be complemented by physical disturbance of the materials in the second portion 47, such as by kneading of the second portion 47 (e.g., by a roller or other element), stirring, shaking, etc. This may help to pre-mix the beverage medium 42, and make later mixing with additional precursor liquid 2 more effective. With valve V3 open, pre-mixed beverage medium 42 may pass into a mixing nozzle or other chamber (e.g., which may be part of a third portion 62 of the cartridge 4 or a part of the beverage making machine), while liquid 2 having dissolved gas from the contactor 6 may also be introduced into the mixing nozzle. (Note that the valve V3 in this and other embodiments may include a valve that is incorporated into the cartridge 4, such as a burst valve, duckbill valve, split septum, or other. The mixed precursor liquid 2 and beverage medium 42 may then be routed to a waiting cup 8 or other container.

Figure 35:
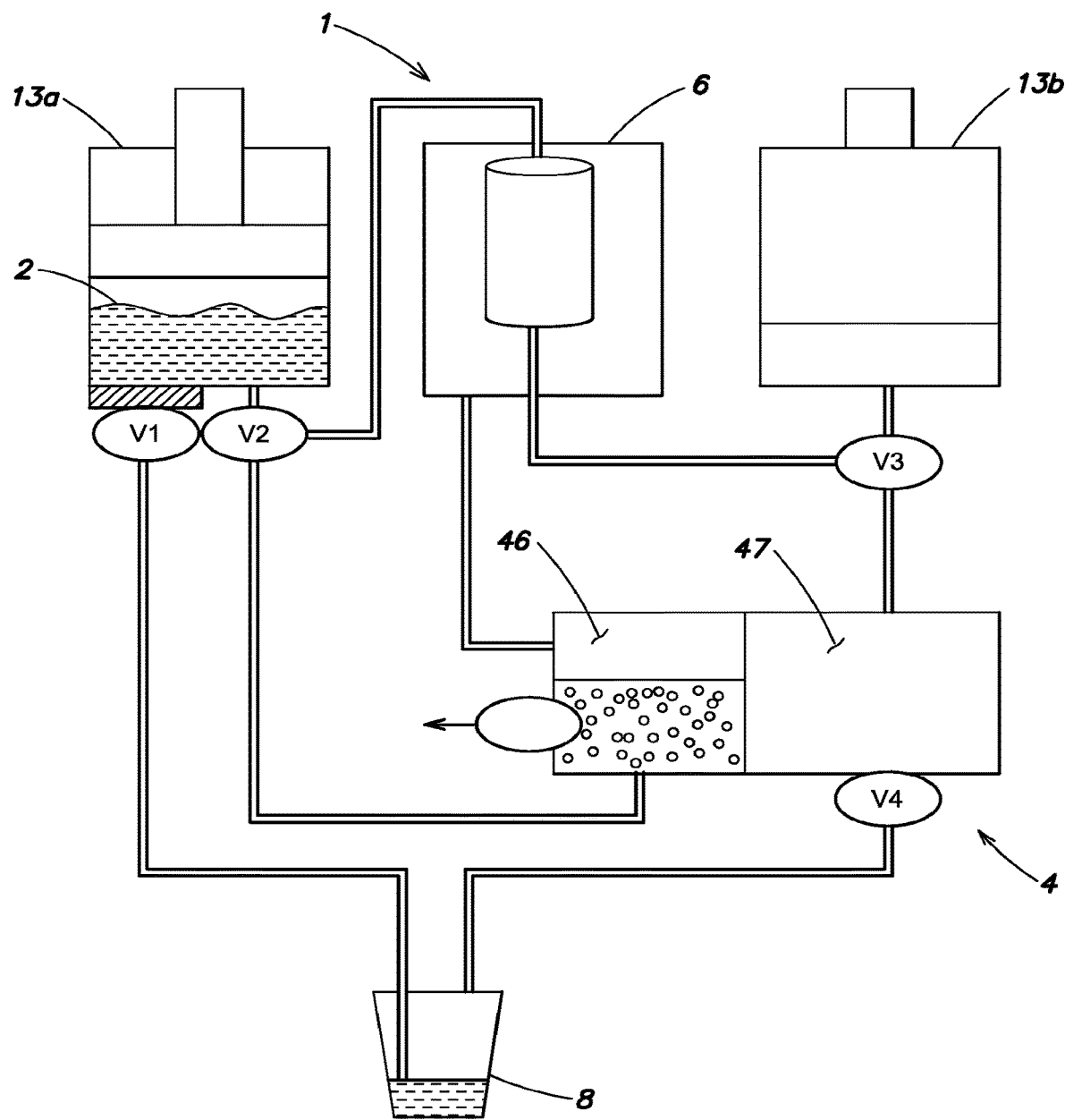
FIG. 35 shows a schematic view of a beverage making system arranged to cycle precursor liquid through a gas dissolution device.

FIG. 35 shows another illustrative embodiment of a beverage making system 1 that, like those embodiments discussed above, incorporates one or more aspects of the invention. This illustrative embodiment includes a pair of syringe pumps 13a, 13b that are arranged to cause precursor liquid 2 to flow from one pump 13, through the contactor 6 and into the other pump 13, and vice versa. In this way, the system 1 can pass precursor liquid 2 through the contactor 6 one or more times, e.g., to increase an amount of dissolved gas in the precursor liquid 2, as desired. Of course, the system 1 could achieve multiple passes through a contactor or other gas dissolving device in other ways, such as by a single pump that directs liquid to flow from a reservoir 11, through a contactor 6 and back to the reservoir 11. However, in this embodiment, the syringe pump 12a is arranged to draw precursor liquid 2 from a cup 8 or other container through a valve V1. Thus, a user may place a cup 8 containing a desired volume or type of precursor liquid 2 in association with the system 1, and the system 1 may use the precursor liquid 2 in the cup 8 to form a beverage. A filter at the valve V1 or elsewhere may help reduce a number of bacteria or other organisms that enter the system 1, helping to reduce potential system contamination. Also, the syringe pump 13 or other pump arrangement may be configured to aspirate a suitable volume of liquid 2 from the cup 8, e.g., by controlling a stroke length of the syringe piston, by detecting flow with a flow meter, by detecting a liquid level in the pump or other reservoir, etc.

With the precursor liquid 2 aspirated into the first syringe pump 13a, the valve V1 may be closed, and the valve V2 opened to so that the pump 13a can force the liquid 2 into the contactor 6. (While FIG. 35 shows there may be gas as well as liquid 2 in the pump 13a, it may be the case that no gas is present in the pump 13a.) Meanwhile, the valve V2 (or another valve) may allow some liquid 2 to flow into the first portion 46 of a cartridge 4 to activate a gas source 41. Thus, liquid may dissolve gas emitted by the gas source 41 as the liquid 2 passes through the contactor 6. The valve V3 may be arranged to allow the liquid 2 flowing from the contactor 6 to enter the second syringe pump 13b for temporary storage therein. With a desired amount of liquid transferred from the first syringe pump 13a to the second syringe pump 13b via the contactor 6, flow may be reversed with the second syringe pump 13b causing flow through the contactor 6 and to the first syringe pump 13a. This cycling may be repeated a desired number of times, e.g., based on the output of a carbonation detector, to achieve a desired level of carbonation of the liquid 2. With carbonation or other gas dissolving complete, the valve V3 may be arranged to pass liquid 2 to the second portion 47 of the cartridge, e.g., for mixing with beverage medium 42 and transfer of beverage (via open valve V4) to the cup 8. A system like that in FIG. 33 may allow a user to define a carbonation or other dissolved gas level for a beverage, and may operate to dissolve gas into the precursor liquid 2 up to the set level, whether before or after mixing beverage medium with the precursor liquid 2.

Figure 36:
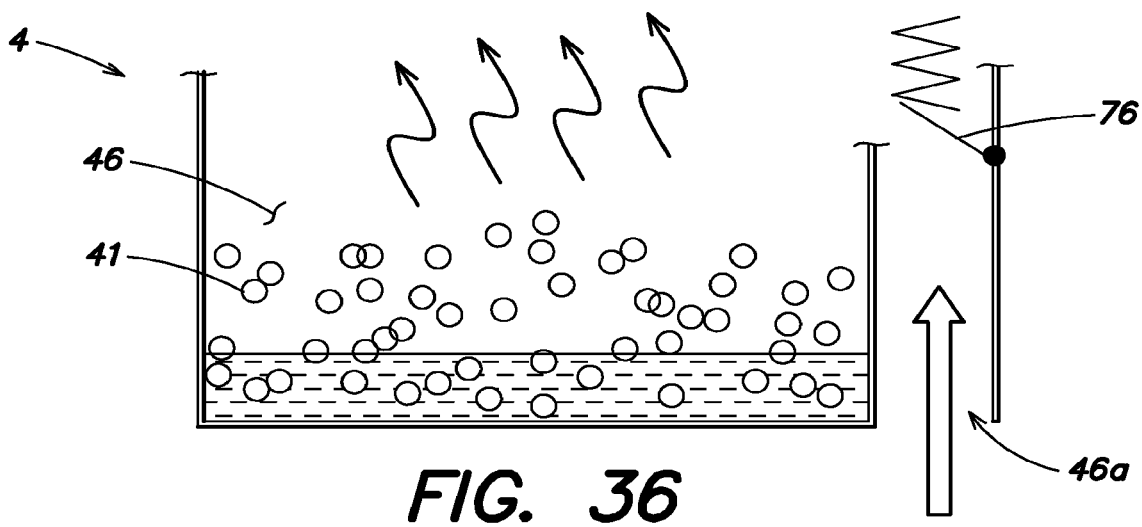
FIG. 36 shows a schematic view of a cartridge having an activation fluid flow controller.
Figure 37:
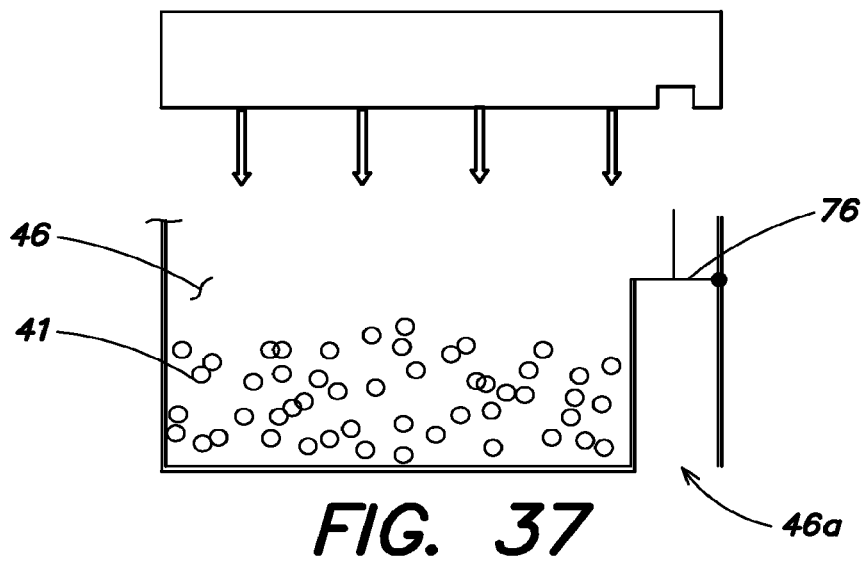
FIGS. 37 and 38 show a schematic view of a cartridge having an activation fluid flow controller that interacts with a beverage making machine.
Figure 38:
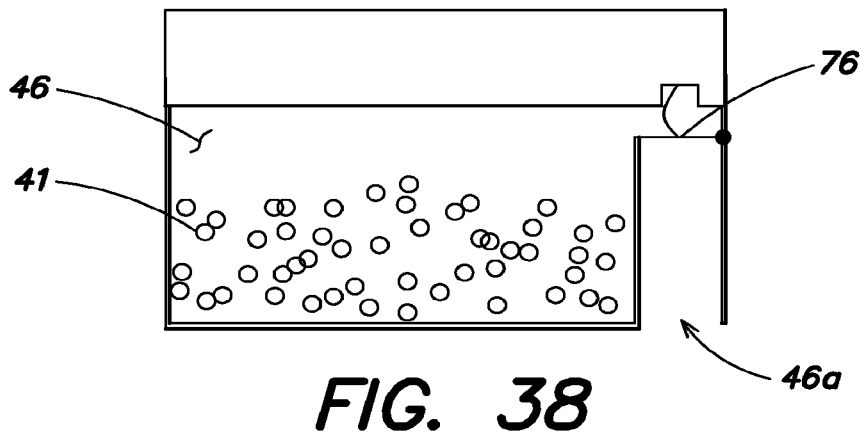

In another aspect of the invention, a cartridge may be arranged to control a flow of activation fluid into the cartridge to activate a gas source. As discussed above, one option is to have a beverage making machine control flow of activation fluid into the cartridge. However, the cartridge itself may also help to control activation of the gas source. Such an arrangement may allow the cartridge itself to define a carbonation or other gas dissolution level, allowing different cartridges to define different gas dissolution levels without requiring a change in system operation. For example, FIG. 36 shows a schematic view of a first portion 46 of a cartridge 4 that includes a flow controller 76 in the form of a valve (such as a pressure regulator or pressure activated valve). Activation fluid (e.g., water) may be provided at the activator inlet 46a under a set pressure. When a pressure in the first portion 46 is suitably low, the flow controller 76 may open to allow water to enter the first portion 46, which causes activation of the gas source 41. However, once pressure in the first portion 46 reaches a threshold level, the flow controller 76 may close, stopping flow of water into the first portion 46. This stop in flow will tend to lower the pressure in the first portion 46 as gas is routed to a contactor or other gas dissolution device or vented, and when the pressure again drops suitably, the flow controller 76 may again open. In this embodiment, the flow controller 76 is shown to include a spring that urges a valve gate to close, where the force of the spring is set to provide suitable gas pressure control in the first portion 46. However, other arrangements are possible, such as those found in pressure regulator valves, an arrangement in which high pressure in the first portion 46 tends to expand a part of the cartridge to pinch (and thereby close) a flow path from the activator inlet 46a, and so on. FIGS. 37 and 38 show another illustrative embodiment in which a cartridge 4 includes a flow controller 76 similar to that in FIG. 36. However, in this embodiment, the flow controller 76 (specifically an upstanding strut functioning as a spring element) interacts with a part of the beverage making machine. Thus, when the cartridge 4 in this embodiment is properly associated with the beverage making machine, the flow controller 76 may be caused to operate to control activation fluid flow into the cartridge. Other arrangements similar to that in FIGS. 37 and 38 are possible, including arrangements in which the beverage making machine may control the opening and closing of a flow controller 76 of the cartridge 4. For example, the arrangement in FIGS. 37 and 38 may be modified so that the beverage making machine moves the strut or other portion of the flow controller 76 (such as a valve gate) to cause the flow controller 76 to open and close. Other flow controller arrangements are possible in such an embodiment, such as a membrane valve, flapper valve, plunger valve, etc., which may be manipulated and controlled by the beverage making machine.

Figure 39:
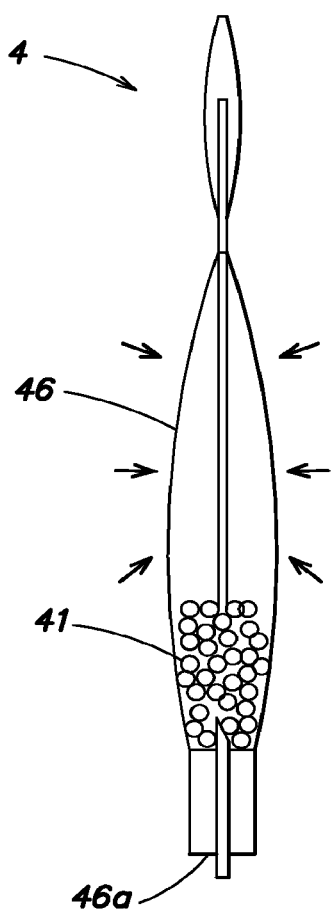
FIGS. 39 and 40 show an arrangement in which pressure in a cartridge moves the cartridge to control activation fluid flow.
Figure 40:
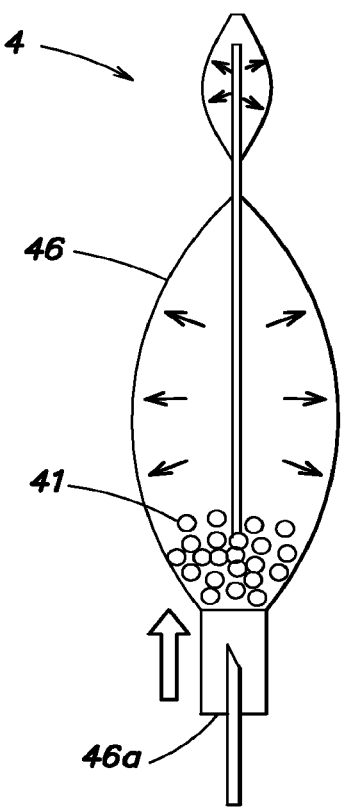
Figure 41:
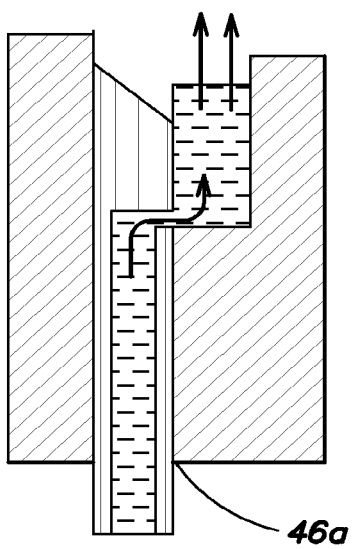
FIGS. 41 and 42 show a close up view of an activation fluid supply needle and activator inlet of a cartridge for use in the FIGS. 39 and 40 embodiment.
Figure 42:
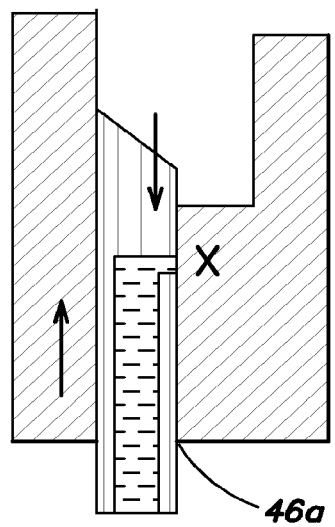

FIGS. 39-42 show another illustrative embodiment of an arrangement for controlling activation fluid flow into a cartridge. In this embodiment, the cartridge 4 has an arrangement similar to that in FIGS. 38-30. The cartridge is shown in FIGS. 39 and 40 in a mounted orientation in a beverage making machine. An activation fluid inlet needle or other port extends into an activator inlet 46a of the cartridge and remains stationary during beverage formation. In addition, a part of the cartridge 4 near an upper end is held fixed relative to the fluid inlet needle. When a pressure in the cartridge 4 is relatively low, a distal end of the inlet needle is positioned relative to the activator inlet 46a of the cartridge 4 so that activation fluid is delivered to the cartridge 4. However, when a pressure in the cartridge increases, the cartridge expands, pulling the activator inlet 46a away from the inlet needle. This movement stops flow of activation fluid, which does not resume until pressure drops in the cartridge and the cartridge moves to the orientation shown in FIG. 39. FIGS. 41 and 42 show one arrangement of the fluid inlet needle and the activator inlet 46a for this embodiment. The inlet needle has an opening on its side so that when the needle extends into the cartridge 4, the activation fluid flow path is open. However, withdrawal of the inlet needle into the activator inlet 46a blocks the flowpath, stopping activation fluid flow. Other arrangements for opening and closing an activation fluid flowpath based on cartridge movement are possible, such as a valve in the activator inlet 46a that opens and closes based on cartridge movement or pressure change, and others.

Figure 43:
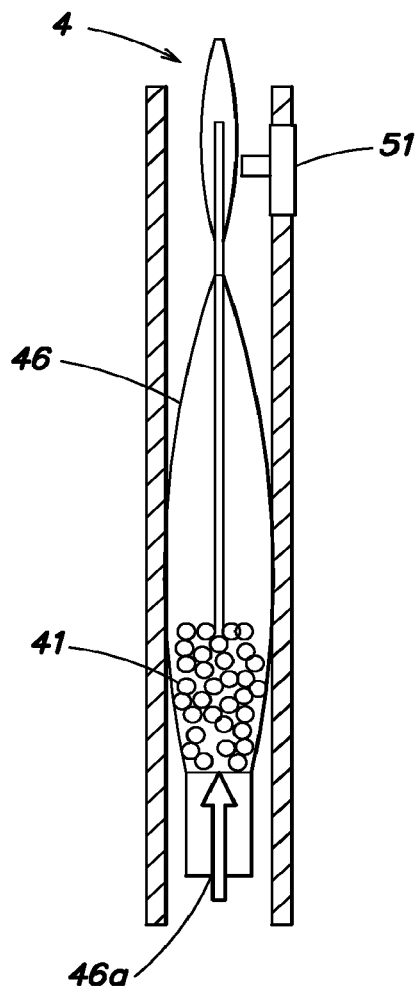
FIGS. 43 and 44 show an illustrative embodiment in which pressure in a cartridge is detected by a beverage making machine.
Figure 44:
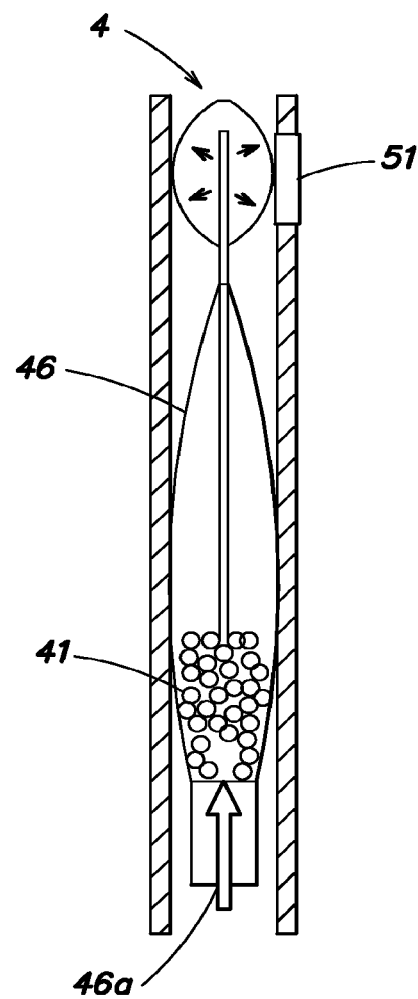

FIGS. 43 and 44 show another arrangement for controlling activation fluid control. In this embodiment, the cartridge again has an arrangement similar to that in FIGS. 28-30. When activation fluid is provided to the cartridge and the gas source is activated (as shown in FIG. 43), the cartridge will generate gas, which causes a pressure build up and enlargement of the cartridge 4 (as shown in FIG. 44). An increase in size of the cartridge in at least one portion may activate a switch or other sensor 51, which causes the system controller 5 to stop activation fluid flow to the cartridge 4. When the pressure reduces, the cartridge may reduce in size and the switch or other sensor 51 will be deactivated, allowing activation fluid flow to resume, if appropriate.

Figure 45:
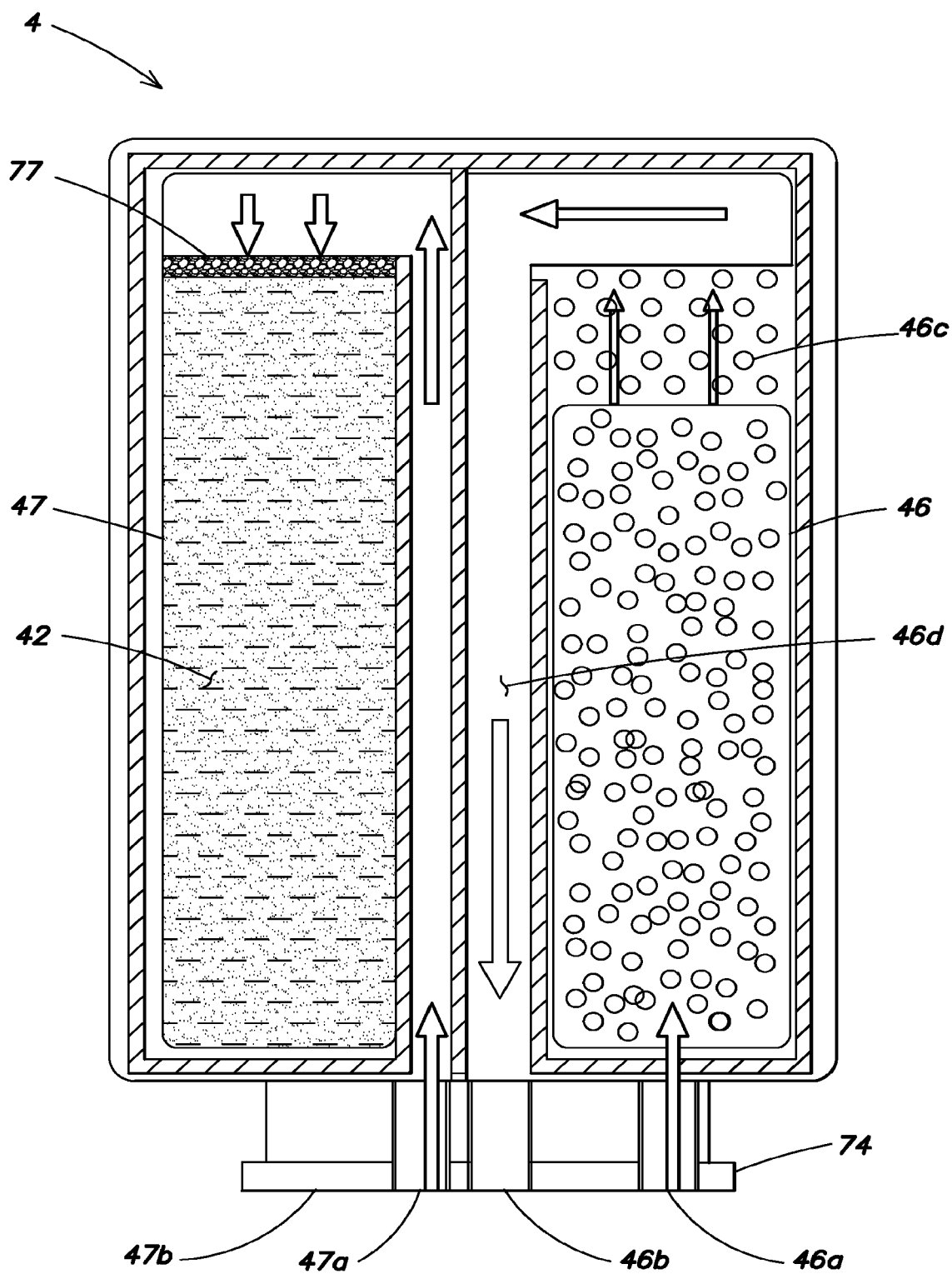
FIG. 45 shows a cross sectional view of a cartridge arranged similarly to that in FIGS. 28-30 and arranged to allow for pinch control of fluid flow in the cartridge.

FIG. 45 shows yet another embodiment, again with an arrangement similar to that in FIGS. 28-30. However, in this embodiment, the gas outlet conduit 46d and the precursor inlet 47a conduit are both formed by suitable weld lines joining the layers of barrier material 79. That is, the conduits for gas outlet and precursor inlet into the first and second portions 46, 47, respectively, are formed by the barrier layers 79 only, and do not include a tube or other structure. As a result, flow of activation fluid and/or precursor liquid into the cartridge may be controlled by pinching the cartridge 4 so as to close one or both of the inlets 46a, 47a. It should be understood that the outlet of gas and/or beverage medium from the cartridge may be similarly controlled. Flow control may be based on any suitable criterion, such as a detected gas pressure, an elapsed timer, detected movement of the cartridge or portions of the cartridge (e.g., caused by a pressure increase in the cartridge), and so on.

Figure 46:
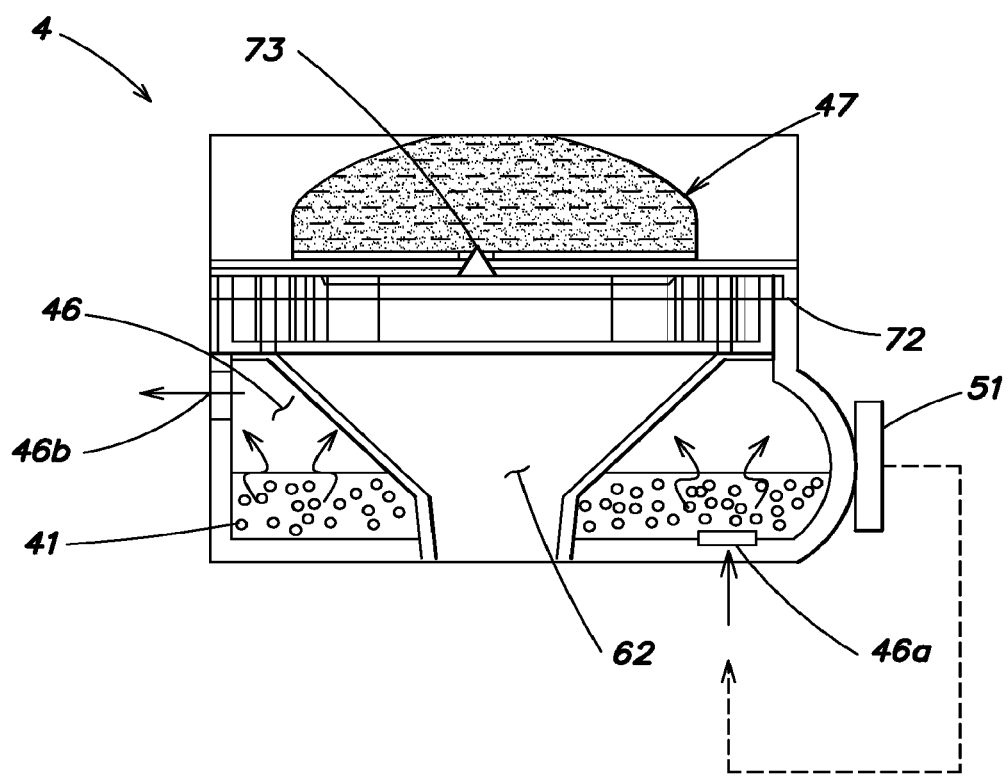
FIG. 46 shows another embodiment in which pressure in a cartridge is detected by a beverage making machine.

FIG. 46 shows yet another illustrative embodiment regarding control of flow of activation fluid into a cartridge. In this embodiment, the cartridge 4 has an arrangement like that in FIG. 23, and has a flexible wall or other part at the first portion 46 of the cartridge. As a result, when pressure in the first portion 46 increases to or beyond a threshold level, the flexible wall may expand outwardly. Movement of the cartridge wall or other part may be detected by the beverage making system 1, such as by a switch or other sensor 51. In response, the controller 5 may stop flow of activation fluid into the cartridge 4 until pressure in the first portion 46 is reduced, and the movable part of the cartridge retracts or otherwise moves to indicate a suitable drop in pressure. While in this embodiment, the movable part that indicates pressure in the first portion includes a flexible wall, other configurations are possible, such as a movable piston or plunger, etc.

Figure 47:
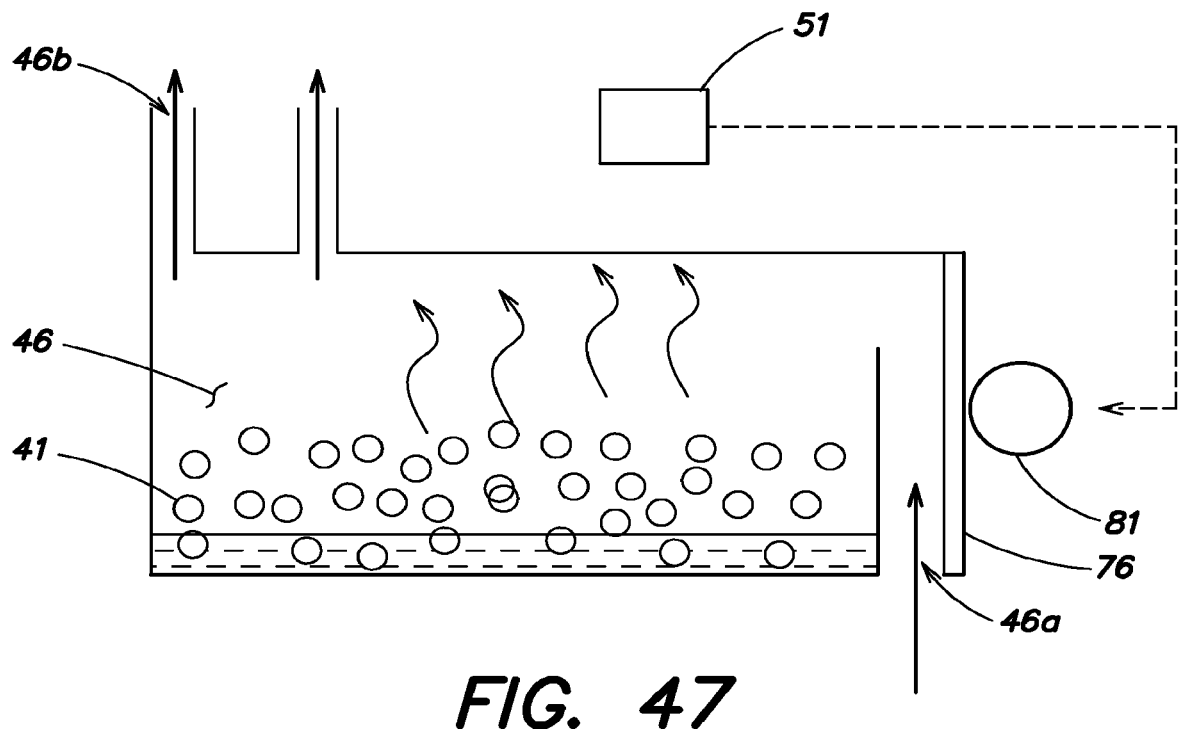
FIGS. 47 and 48 show an embodiment in which pressure in a cartridge is detected by a beverage making machine and activation fluid flow is controlled by a valve actuator of the machine.
Figure 48:
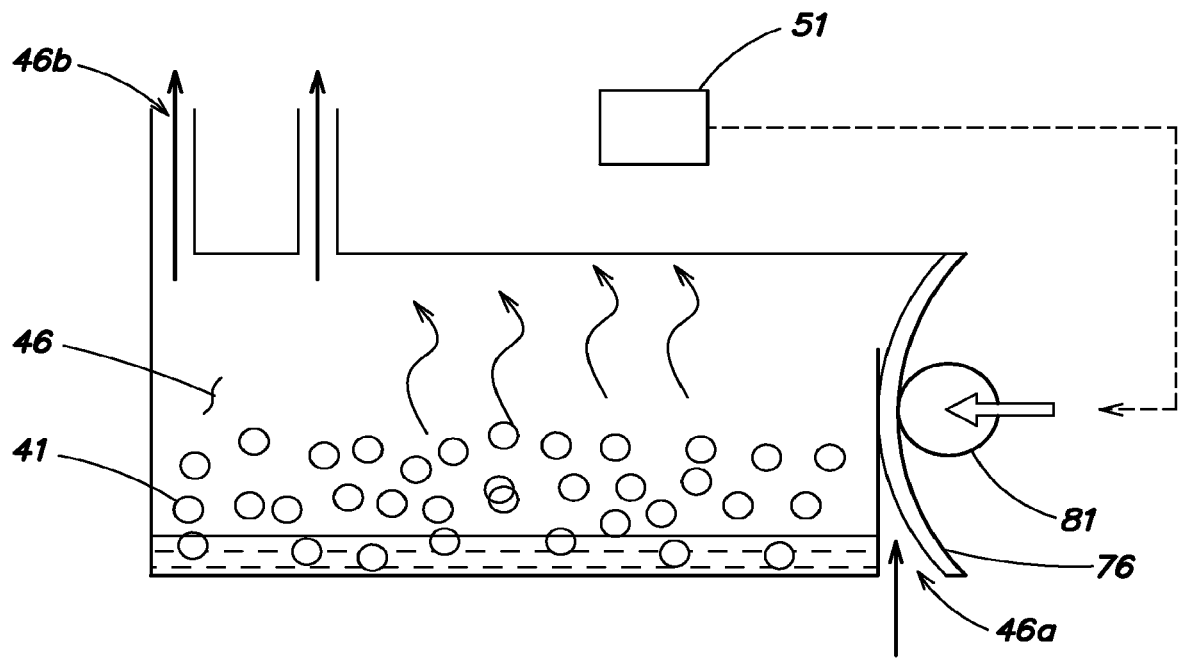

FIGS. 47 and 48 show yet another embodiment regarding control of activation fluid in a cartridge. In this embodiment, the cartridge includes a flow controller 76 in the form of a valve that may be pinched closed by a valve actuator 81 of the beverage making system 1. In this embodiment, a pressure in the cartridge may be sensed by a sensor 51 that detects a pressure in a line leading from the first portion 46. If a suitably high pressure is detected, the system 1 may cause the valve actuator 81 to move so as to pinch the valve of the flow controller 76 closed. With a pressure at or below a threshold detected, the valve actuator 81 may allow the valve to open. While in this embodiment the valve of the flow controller 76 is a relatively simple structure in which a portion of the cartridge 4 may be moved to close a flow path (e.g., as in the embodiment of FIG. 45), other arrangements are possible, such as valves with movable valve gates, plungers, or other structures that may be actuated by a valve actuator. For example, the flow controller 76 may include a membrane valve in which an impermeable membrane may be moved toward and away from a port so as to control flow into the first portion 46.

Figure 49:
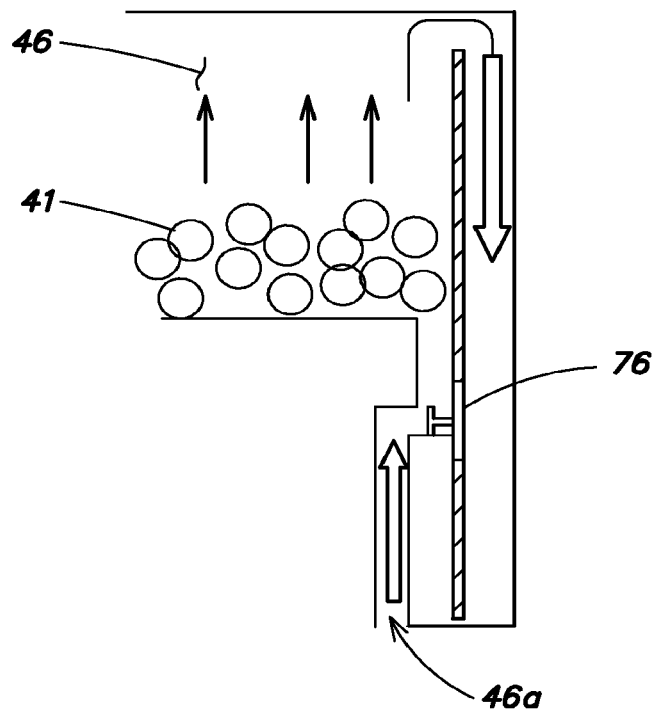
FIGS. 49 and 50 show a schematic diagram of a flow controller arrangement for a cartridge for automatic gas pressure control.
Figure 50:
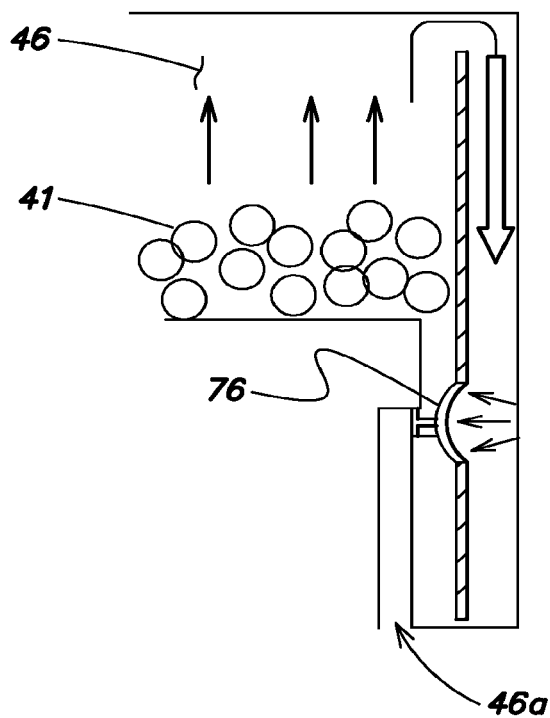

FIGS. 49 and 50 show an illustrative embodiment in which a cartridge may control flow of activation fluid into the cartridge 4 independent of a beverage making machine, e.g., like that in FIG. 36. In this embodiment, the cartridge includes a flow controller 76 that includes a valve that can be opened and closed by pressure in the first portion 46. Thus, the flow controller 76 may include a pressure regulator-type valve that autonomously controls pressure in the first portion 46 to be within a desired pressure range. In FIG. 49, pressure in the first portion is within or below the desired pressure range, and so the valve is open to allow the inflow of activation fluid into the first portion 46. In FIG. 50, the pressure in the first portion 46 has risen above the desired pressure range, and as such, pressure on the right side of the valve (which is fluidly connected to the first portion 46) causes the valve to move to the left, stopping flow of activation fluid. In some embodiments, the pressure in the first portion as controlled by the flow controller 76 can vary depending on the pressure of incoming activation fluid. That is, the flow controller 76 could be arranged so that the pressure of the activation fluid influences the operation of the valve, e.g., in one case, so that the pressure in the first portion 46 must exceed the pressure of the incoming activation fluid to allow the flow controller valve to close and stop flow. This arrangement may allow the system 1 to operate different cartridges at different gas pressures in the first portion 46, e.g., by adjusting a pressure of the incoming activation fluid. However, in other embodiments, the flow controller 76 operation may be made independent of the pressure of the activation fluid so that variations in activation fluid pressure have no effect on the controlled pressure in the first portion 46. Such an arrangement may be useful, for example, where a pump delivering activation water has a variable pressure, and/or where pressure control in the cartridge is desirably influenced by ambient pressures, such as where operation of the system 1 at sea level requires higher gas pressures, but operation at high elevation requires lower pressures. Possible valve configurations for the flow controller 76 are generally known in the art, and are not described in detail herein. Also, the flow controller 76 may operate in a binary fashion (on/off) or may provide for variable flow rates.

In another aspect of the invention, a cartridge may include a filter in the first and/or second portion to separate an inlet from an outlet of the first and/or second portion. For example, a filter may be provided in a first portion of a cartridge to help resist exit of gas source materials from the first portion. A filter may be provided in a second portion of a cartridge to help prevent relatively large, undissolved particles from clogging the outlet, help prevent bacterial contamination of a beverage (e.g., where the precursor liquid includes organisms that can be filtered from the precursor liquid prior to being supplied as a beverage), and/or help distribute precursor liquid in the second portion (e.g., to help with dissolution).

Figure 51:
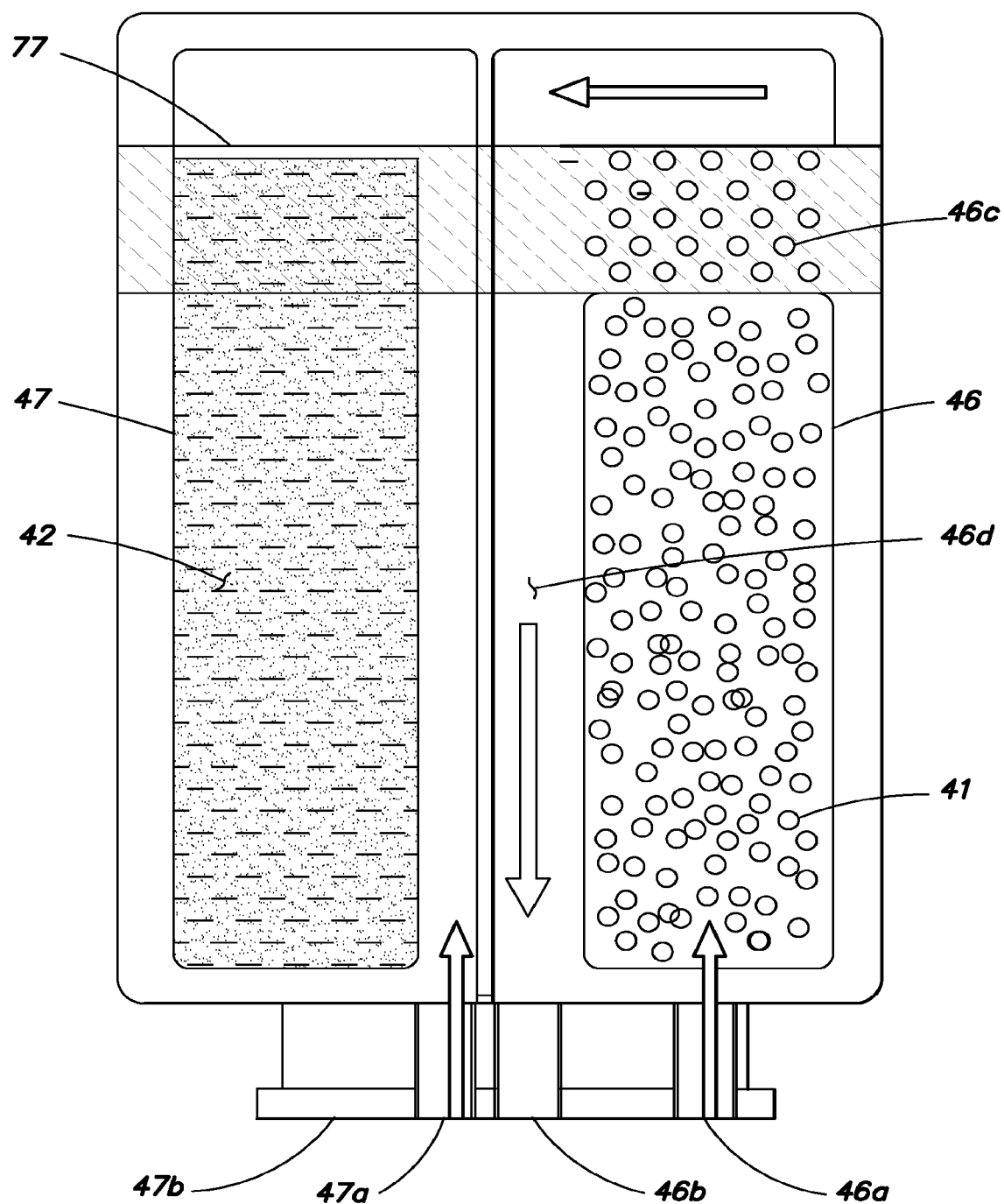
FIG. 51 shows a cross sectional view of a cartridge having a filter.

FIG. 51 shows a cartridge with an arrangement similar to that in FIG. 45, but this embodiment includes a filter 46c in the first portion, and a filter 77 in the second portion 47. While in this embodiment the filter 46c and 77 are formed by a single filter element that spans the first and second portions 46, 47, other arrangements are possible, such as individual filter elements for each portion. The filter 46c may operate to restrain the passage of gas source materials to the gas outlet 46b, while the filter 77 may help reduce microbial contamination of the beverage medium and beverage, and/or help spread the flow of precursor liquid over a larger surface area of the beverage medium. FIGS. 52-54 show another illustrative arrangement of a filter used in a cartridge like that of FIG. 51. In this embodiment, a layer of perforated or otherwise suitably permeable material is interposed between the layers of barrier material 79 so that the activator inlet 46a is separated from the gas outlet 46b by the permeable material (which forms a filter 46c in the first portion 46), and the precursor liquid inlet 47a is separated from the beverage medium outlet 47b by the permeable material (which forms a filter 77 in the second portion 47). Again, the filters 46c and 77 could be formed in other ways, as this is just one of several possible embodiments. FIGS. 53 and 54 show how the filters 46c and 77 separate the inlets and outlets of the respective first and second portions 46, 47. In FIG. 53, it can be seen how the filter 77 provides a space into which precursor liquid may enter the second portion 47 and permeate through the filter 77 and uniformly wet the beverage medium 42. In FIG. 54, it can be seen how the filter 46c provides a relatively large surface area for emitted gas to pass through the filter 46c and to the gas outlet 46b.

FIG. 55 shows a perspective view of how a single piece of permeable material can form the filters 46c and 77 in a cartridge like that in FIGS. 52-54. As can be seen, the permeable material can traverse a zig-zag path relative to the inlet 46a, 47a and outlets 46b, 47b of the first and second portions 46, 47. To maintain the permeable material in the position shown in FIG. 55, the permeable material may be bonded to the insert 74 and/or the barrier material 79 to keep the inlets/outlets clear.

Figure 56:
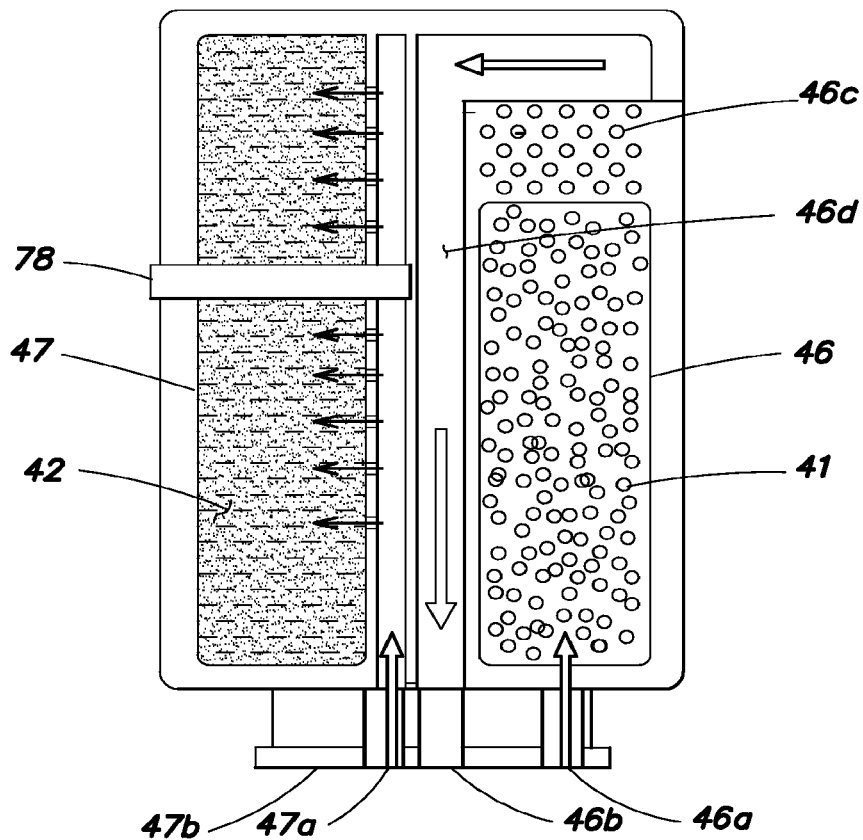
FIG. 56 shows a cross sectional view of a cartridge arranged to allow a user to define a beverage characteristic by interacting with the cartridge.
Figure 57:
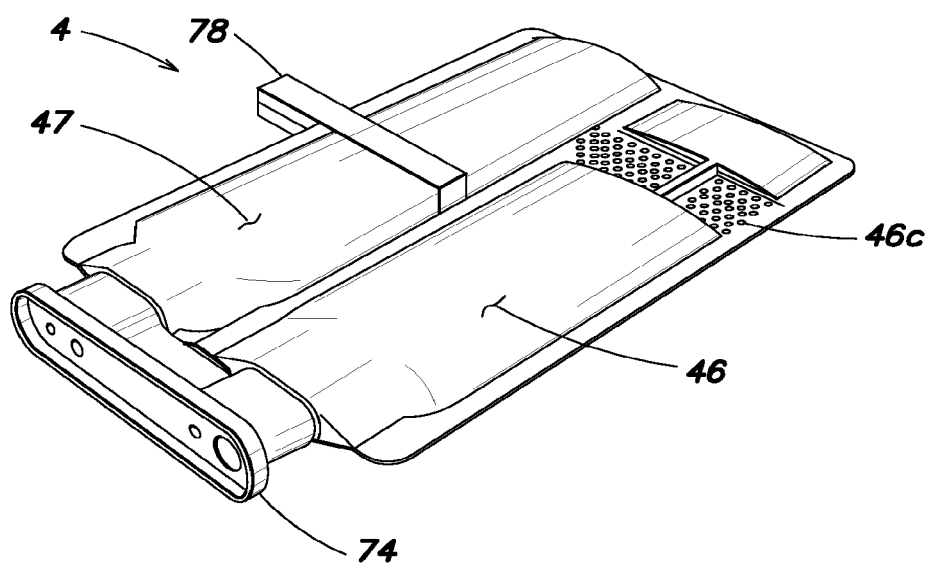
FIG. 57 shows a perspective view of the FIG. 56 cartridge.

As discussed above, a cartridge may be configured to allow a user to interact with the cartridge to define one or more characteristics of a beverage to be made. For example, a user may interact with a cartridge to define a carbonation level, a sweetness of the beverage, an amount of beverage medium to use in making the beverage, and so on. FIGS. 56 and 57 show an arrangement of a cartridge that is similar to that in FIG. 45 but includes a clip 78 that can be engaged with the cartridge 4 so as to limit an amount of beverage medium 42 that can be used to form a beverage. The clip 78 may be movable relative to the cartridge to provide a continuously adjustable amount of beverage medium that can be used. A similar feature could be used to define an amount of carbonation, e.g., by limiting what portion of the gas source is exposed to activating fluid. Of course, a clip 78 is only one example of how a user could interact with a cartridge to define beverage characteristics. For example, the cartridge may have one or more removable tabs, adjustable sliders, holes or other features that can be removed or covered, etc., that could be adjusted by a user. The system controller 5 may recognize the adjusted feature and control the system 1 accordingly. Alternately, the adjusted cartridge feature may itself directly control operation of the system. For example, a broken off tab of the cartridge may trigger a switch that disables delivery of activating fluid to the cartridge, thereby forcing the machine to make a non-sparkling (or still) beverage.

In another aspect of the invention, a cartridge may include a beverage outlet that extends from the cartridge, e.g., towards or to a user's cup or other container. Such an extending outlet may help deliver a beverage to a cup in splash-free way, may help reduce loss of carbonation or other dissolved gases, and/or may help reduce contact of the beverage with a beverage making machine. In one illustrative embodiment, the cartridge may include a trouser valve that includes two flat, elongated membranes sealed at opposing edges of the membranes along their length. The trouser valve may be folded or rolled up such that the folds or contact pressures in the rolled position close the valve, if necessary. In one embodiment, a relatively lightweight film can be used, e.g., to help the valve form a suitable seal when rolled or folded. When pressure is applied to the inner end of the trouser valve, the structure may unfold/unroll and expand into an elongated form. The extension of the trouser valve into a dispensing configuration may open any seal formed by the valve in its folded state and allow beverage to flow along the valve. The valve may be arranged to provide for smooth flow of the beverage through a tapered passageway, potentially reducing the risk of turbulence and loss of carbonation before dispensing. In other embodiments, a cartridge may include a more rigid outlet conduit that extends from the cartridge to conduct beverage toward a user's cup. For example, a retractable tube in the cartridge may extend under pressure built up in the cartridge. If desired, additional mixing action can be included in the beverage outlet flow path, e.g., by shaping the welds of a trouser valve to make the flow path serpentine or to include obstacles to enhance mixing of. Also, since a trouser valve may assume a flat condition after delivery of beverage, e.g., due to resilience of material used to make the valve that causes the valve to fold, the beverage outlet may retain little or no residual beverage, at least as compared to a cylindrical conduit of equivalent length. This may reduce leakage from the cartridge after use, reducing mess.

In another aspect of the invention, a cartridge (such as a mixing chamber portion) may include a mixer or other movable part that interacts with beverage medium and/or precursor liquid to enhance mixing of the beverage. For example, the movable part may be actuated by interaction with flow of the beverage medium or precursor liquid, such as a vibrating reed, rotating blade, or other element. In another embodiment, the movable part may be actuated by an external drive, such as a direct drive shaft of a motor associated with a beverage making machine, a magnetic coupling that provides contact-free movement of the mixer or other movable part, a pneumatic or hydraulic drive that provides moving fluid to the cartridge to drive the mixer, and others.

Figure 58:
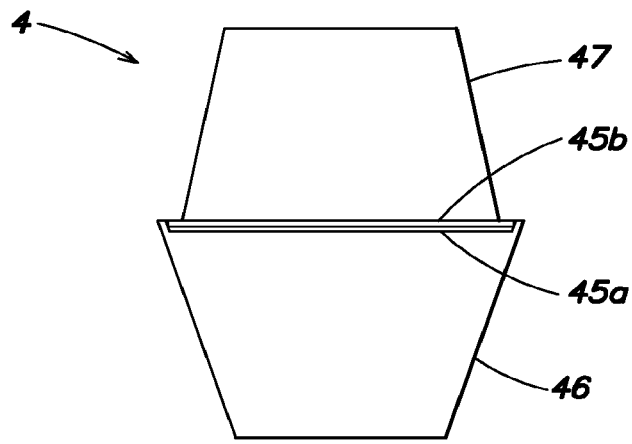
FIG. 58 shows an assembled view of a cartridge having first and second portions joined such that lid portions are adjacent each other.
Figure 59:
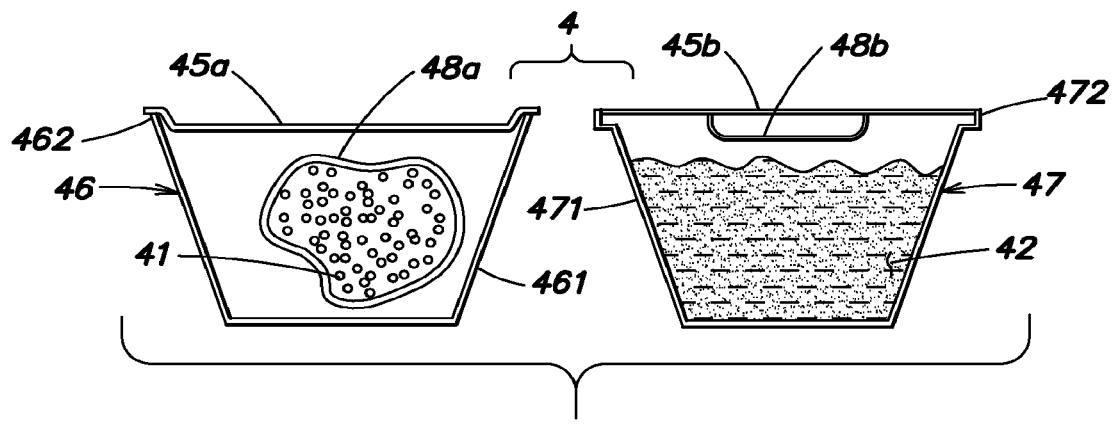
FIG. 59 shows a side view of the FIG. 58 embodiment with the first and second portions detached.
Figure 60:
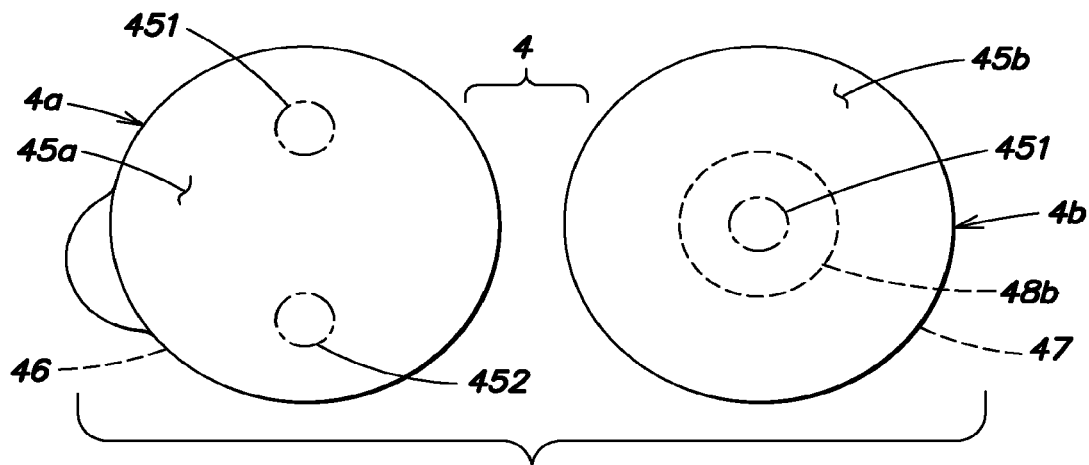
FIG. 60 shows a top view of the FIG. 59 arrangement.

FIGS. 58-60 show assembled, side and top views of another illustrative embodiment of a cartridge 4 that incorporates one or more aspects of the invention. As can be seen in FIG. 58, the cartridge 4 in this embodiment includes a container with a first portion 46 and a second portion 47 that can be assembled so that the lids 45a, 45b of the portions 46, 47 are adjacent each other. For example, the first portion 46 may be arranged so that a part of the lid 45a is recessed below an upper edge of a rim 462 of a first container part 461 of the first portion 46. The rim 472 of the second container part 471 of the second portion 47 may be arranged to fit within the recess and engage with the rim 462 so as to hold the first and second portions 46, 47 together. For example, the rim 462 may include a groove that receives the rim 472 to releaseably hold the first and second portions 46, 47 together by a friction or interference fit, e.g., so that a user may pull the first and second portions 46, 47 apart by hand and without tools. Alternately, the first and second portions 46, 47 may be held together in an assembled position shown in FIG. 58 by an adhesive, an overwrap film, a band of shrink-wrapped material at the junction between first and second portions 46, 47, a piece of tape or band that extends from the first portion 46 to the second portion 47, etc.

Thus, in accordance with an aspect of the invention, the first and second portions 46, 47 may be arranged so that the cartridge has a plane where the first portion 46 is located below the plane and the second portion 47 is located above the plane. In this case, the plane of the cartridge may be parallel to, and defined by, a portion of the lid 45a, 45b, or may be parallel to a planar portion of a part of the lid 45a or 45b. The first and second portions 46, 47 may be used with a beverage making machine in the assembled condition, or may be moved relative to each other, e.g., separated from each other, for use with a beverage making machine. As discussed above, the first and second portions 46, 47 may be oriented in different ways for interacting with a beverage making machine, such as in a side-by-side configuration shown in FIG. 59. In this embodiment, the first and second portions 46, 47 are not connected in FIG. 59, but the first and second portions 46, 47 may be connected by a tether or other structure, e.g., like that shown in FIGS. 6-8. Such a connection may help properly orient the portions 46, 47 for interaction with the beverage making system.

In accordance with another aspect of the invention, the first and second portions 46, 47 are separated by an impermeable barrier, e.g., the lid 45a or the lid 45b, which in this embodiment are both impermeable (although both need not necessarily be so). Also, as shown in FIG. 60, the lids 45a, 45b of the first and second portions 46, 47 may be arranged to accommodate a piercing element for inlet and/or outlet of gas or other fluids. For example, the lid 45a may have an inlet region 451 arranged to accommodate piercing by a piercing element (e.g., a needle, blade, etc.) to admit activating water, water vapor or other fluid into the first portion 46 to cause the gas source 41 to release carbon dioxide or other gas. The lid 45a may also have an outlet region 452 arranged to accommodate piercing to allow gas or other fluid to exit the first portion 46. However, as mentioned above, the lid 45a may be pierced in the same location for fluid inlet/outlet, or may not be pierced at all, e.g., where the lid 45a includes a defined port for inlet/outlet, or other portions of the first container part 461 are pierced at the bottom, sidewall or elsewhere.

The lid 45b may have an inlet region 451 arranged to accommodate piercing to admit activating water, gas or other fluid, whether for mixing with the beverage medium 42, or to push the medium 42 to exit the second portion 47, e.g., through a pierced hole in the bottom of the second portion 47 for mixing with a precursor liquid in a user's cup, a mixing chamber, etc. The second portion 47 may also include a filter component 48b to help keep beverage medium 42 from contacting a piercing element that pierces the lid 45b. The filter component 48b may include a hydrophobic membrane, a piece of filter paper, or other suitable component, and may be attached to the lid 45b or other portion of the second container part 471. By avoiding contact of beverage medium 42 with a piercing element, unwanted contamination of the piercing element may be reduced or eliminated. Alternately, or in addition, a piercing element (whether used to pierce an inlet and/or outlet opening of a first or second portion 46, 47) may be arranged to be removable from a beverage making machine (e.g., for cleaning and replacement in the machine). Another possibility is to arrange the second portion 47 so that it can be squeezed, crushed or otherwise have a wall (such as the lid 45b or container part 471 sidewall) moved to urge beverage medium 42 to exit the second portion 47, e.g., through a burstable or otherwise frangible outlet or pierced hole. For example, the lid 45b may be pressed downwardly in the orientation shown in FIG. 59 so that beverage medium 42 is forced out of the second portion 47, e.g., through an opening in a bottom part of the second portion 47. Such pressing may be accomplished by a plunger or piston of a beverage making machine that presses downwardly on the lid 45b, crushing the second portion 47 and expelling the beverage medium.

The lid 45a (or the lid 45b) may have a pull tab (e.g., as shown in FIG. 60) to aid a user in removing the lid 45a for recycling or other purposes. For example, a user may wish to remove the lid 45a from the first container part 461 to remove the gas source 41 after use. The gas source 41 may be contained in a permeable bag or other holder, such as a plastic mesh bag, filter paper pouch, etc. This bag may help prevent gas source 41 particles from exiting the first portion 46 and/or make removal and disposal/recycling of the gas source 41 materials in the first portion 46 easier. The bag may also help orient or otherwise position the gas source 41 in the first portion 46, e.g., to keep the gas source 41 away from the lid 45a (such as to avoid contact with a piercing element), to arrange the gas source 41 for optimal or other desired receipt of activating liquid (e.g., arrange the gas source 41 in layers or compartments for selective wetting), and so on.

Figure 61:
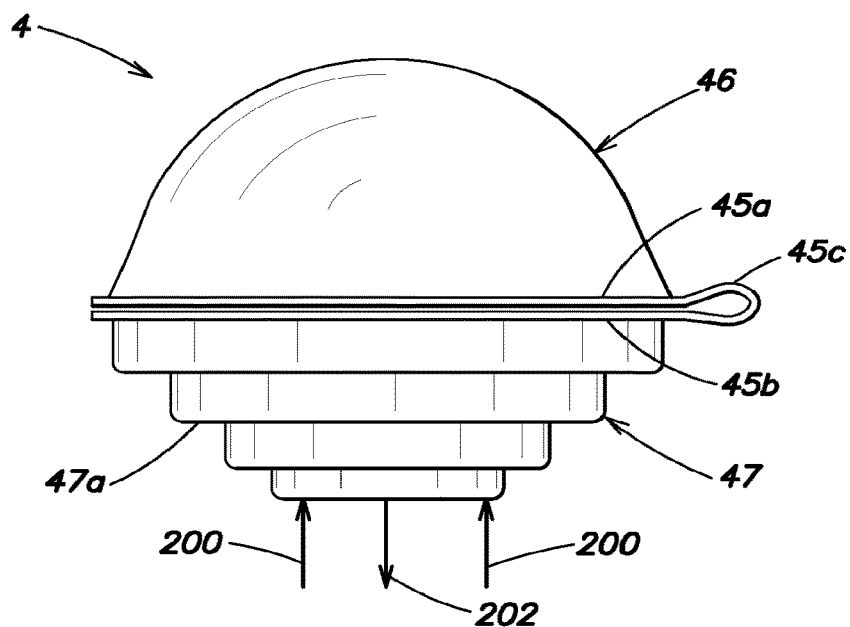
FIG. 61 shows a cartridge with first and second portions joined together by a lid section and in a folded configuration.
Figure 62:
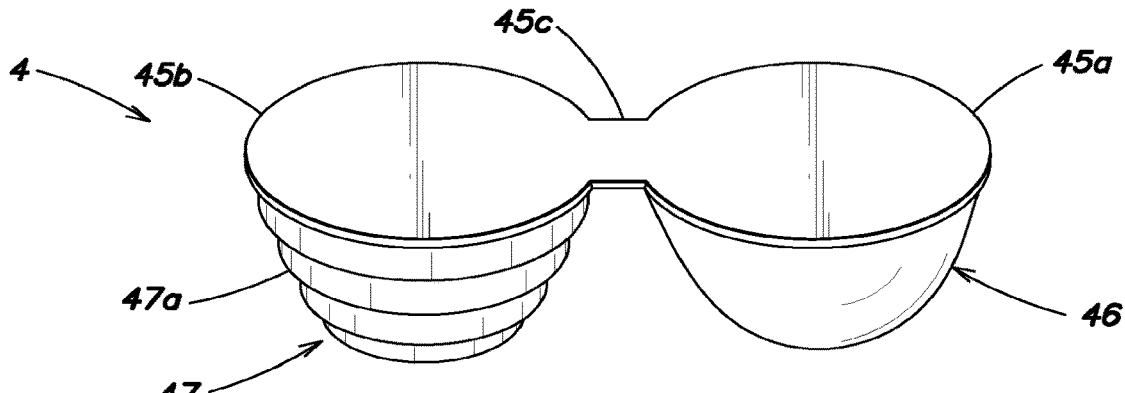
FIG. 62 shows the FIG. 61 embodiment in an unfolded configuration.

FIGS. 61 and 62 show another illustrative embodiment of a cartridge 4 that incorporates one or more aspects of the invention. In this illustrative embodiment, similar to that of FIG. 58, the first and second portions 46, 47 may be arranged on opposite sides of a plane, such as a plane that is parallel to, and positioned at or between, the lids 45a, 45b of the first and second portions 46, 47. As noted above, "above" and "below" are terms used for ease of reference, and since the cartridge 4 may be inverted from the position shown in FIG. 61, the second portion 47 may be said to be "above" the plane and the first portion 46 may be said to be "below" the plane in the inverted orientation. The first and second portions 46, 47 may be connected together by a portion of the lids 45a, 45b, i.e., connector 45c, or another element. Thus, the first and second portions 46, 47 may be moved relative to each other from the position in FIG. 61 to an orientation like that in FIG. 62, e.g., for introduction into and interaction with a beverage making machine. The connector 45c or other portion of the lid 45 (or of the cartridge 4) may carry an identifier, such as a barcode, RFID tag or other device that can be read by a beverage making system and used to control system operation, e.g., to control a carbonation level, beverage volume, etc. Similar to the FIGS. 58-60 embodiment, the first portion 46 may have the lid 45a pierced in one or more locations to admit activating fluid and/or release gas for carbonation or other purposes. Of course, the first portion 46 may operate to activate a gas source 41 and release gas in any suitable way as discussed herein, such as receiving activating fluid and/or releasing gas through a part of the first portion 46 opposite the lid 45a (e.g., the bottom of the first portion 46 as oriented in FIG. 62). As with other embodiments, the first portion 46 may be made of any suitable material or combination of materials, such as a metal foil (e.g., aluminum) capsule.

Figure 63:
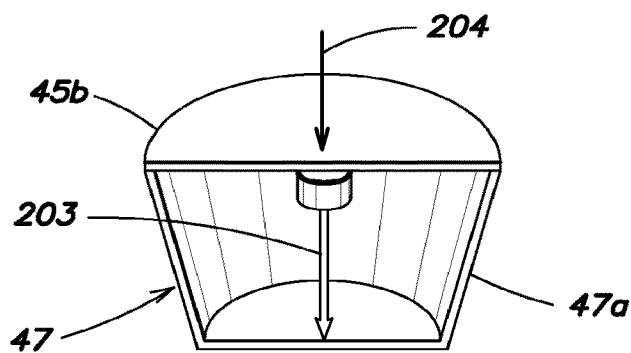
FIG. 63 shows a cross sectional view of an illustrative cartridge with an internal piercing element.

Similarly, the second portion 47 may be arranged in a variety of different ways, but in this embodiment is arranged so that a wall 47a of the second portion 47 can be moved so that beverage medium 42 is caused to exit the second portion 47. For example, the wall 47a may include a corrugated sheet of material (such as a sheet of aluminum foil that has a set of steps arranged as concentric annular rings) that can be pressed from the bottom (as shown by the arrows 200 in FIG. 61) so that the wall 47a is collapsed toward the lid 45b (the lid 45b and upper rim of the wall 47a would be suitably supported by a beverage making machine chamber, for example). Movement of the wall 47a could cause a rise in pressure in the second portion 47, e.g., so that a burstable seal opens to release beverage medium 42 along the arrow 202. Of course, the wall 47a could be pierced to form an opening to allow beverage medium 42 to exit, rather than having a burstable or otherwise frangible seal open. In another illustrative embodiment shown in FIG. 63, the second portion 47 may include an internal piercing element 203 arranged to pierce the wall 47a to form an outlet opening for beverage medium 42. For example, the piercing element 203 may be arranged so that with force applied to the lid 45a along the direction of the arrow 204, the piercing element 203 may be moved downwardly to pierce the wall 47a. In this action, the lid 45a may or may not be pierced. In one arrangement where the lid 45a is pierced, gas, precursor liquid or other fluid may be introduced into the second portion 47 to urge the beverage medium 42 out of the opening formed in the wall 47a. It should also be understood that an internal piercing element may be used with other embodiments described herein, such as in FIGS. 58-60, and may be used in a first portion 46 of a cartridge 4.

The wall 47a may be arranged so that when pushed in the direction of the arrows 200 in FIG. 61, the radially outer portions of the wall 47a may collapse first, with radially inner portions of the wall 47a collapsing subsequently in a step-wise fashion toward a center of the wall 47a. This may help urge beverage medium 42 to move radially inwardly and out of the outlet. In other embodiments, the wall 47a may be arranged without corrugations, or otherwise without concern for how the wall 47a collapses. Instead, the wall 47a may be simply moved toward the lid 45b and the beverage medium 42 forced from the second portion 47 without control of flow in the second portion 47. If the wall 47a is moved very closely adjacent to the lid 45b, most or all of the beverage medium 42 may be forced from the second portion 47.

Figure 64:
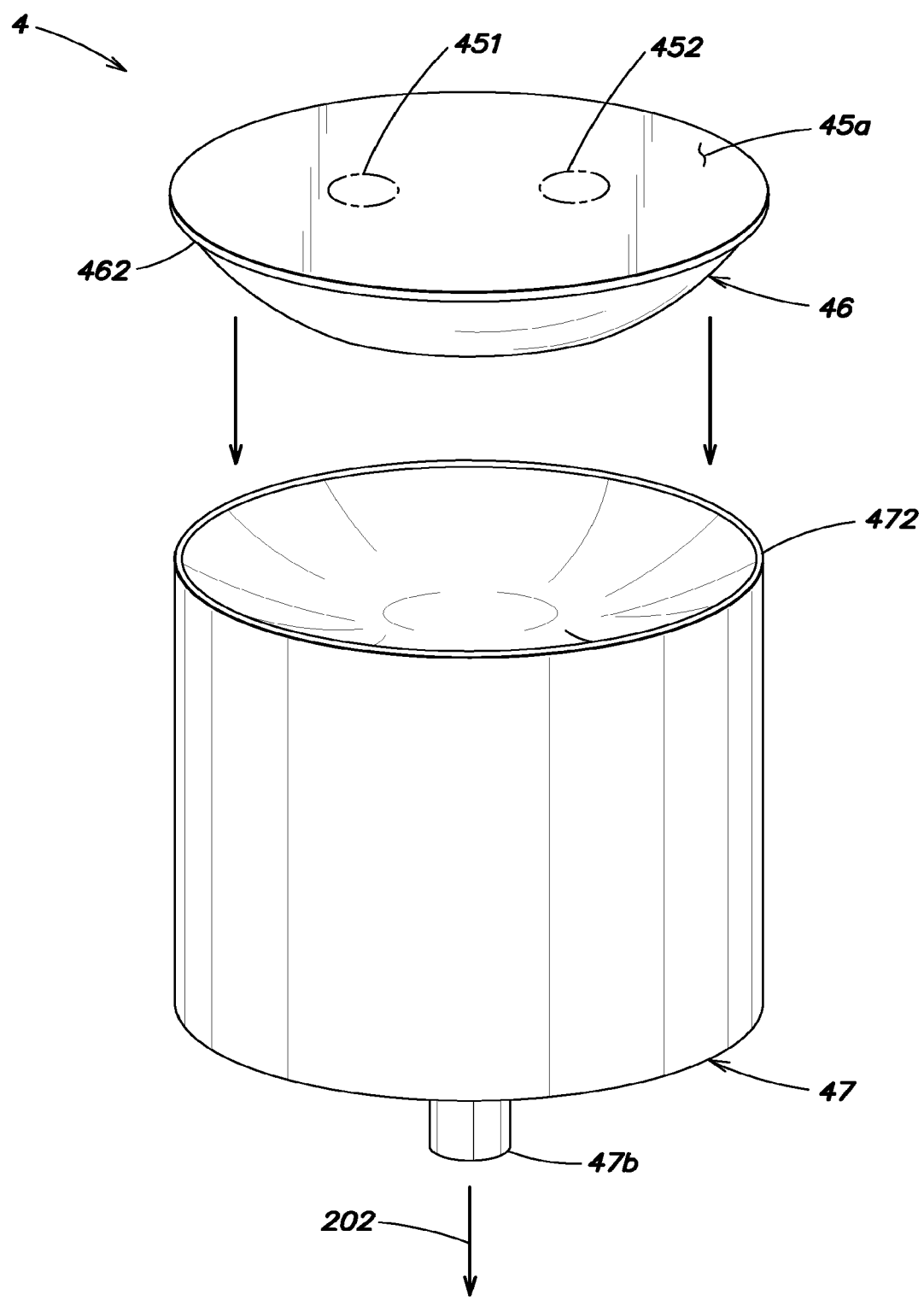
FIG. 64 shows an exploded view of a cartridge having a portion formed as a gusseted bag and another portion received into the gusset cavity.

FIG. 64 shows another illustrative embodiment in which a second portion 47 of the cartridge 4 is formed as an end-gusseted bag, e.g., formed from a sheet aluminum foil or other metal or plastic material. Such bags are well known in the food packaging art, and the second portion 47 in this embodiment is shown with the gusseted portion facing upwardly. An outlet nozzle 47b is arranged at a side of the bag (the bottom) opposite the gusset, and may include a burstable septum or other outlet arrangement that opens when the second portion 47 is squeezed or otherwise experiences an increase in pressure in the compartment where the beverage medium 42 is held. In one embodiment, the second portion 47 may be squeezed by air or other gas pressure that is introduced into a closed chamber in which the second portion 47 is held. The gas pressure may be provided by an air pump, compressed gas source, gas produced by the first portion 46, or other arrangement into a closed compartment that causes pressure to be exerted on the exterior of the second portion 47. Thus, the second portion 47 may have a wall, e.g., a part of the bag forming the second portion 47, that is moved to urge beverage medium to exit the second portion 47. The nozzle 47b may be located outside of the chamber in which pressure is introduced, e.g., so that beverage medium 42 forced from the nozzle 47b may enter a mixing chamber, a user's cup, etc. The nozzle 47b may include atomizing orifices or other features that help form small droplets or streams of beverage medium 42, e.g., as an aid to mixing.

In accordance with an aspect of the invention, at least a part of the first portion 46 may be received into the gusset of the second portion 47. For example, the gusset may form a partial ellipsoid shaped cavity into which the first portion 46, which may have a complementary shape, can fit. In one embodiment, the first portion 46 may fit entirely within the gusset such that the first portion 46 can form a surface or base of the cartridge 4 such that the cartridge can stand upright on a flat surface with the first portion 46 supporting the cartridge. For example, the lid 45a of the first portion 46 may provide a flat surface at the top of the cartridge 4 when the first portion 46 is received into the gusset cavity of the second portion 47, allowing the cartridge 4 to be inverted and stood on a table top with the first portion 46 resting on the table. However, this is not necessary, and the first portion 46 may protrude from the gusset cavity of the second portion 47, e.g., with a domed top surface. With the first portion 46 at least partially received in the gusset cavity, a rim 462 of the first portion 46 may be crimped or otherwise attached to a rim 472 of the second portion 47 to engage the first and second portions 46, 47 together. As in other embodiments, the first portion 46 may include inlet and/or outlet regions 451, 452 arranged to accommodate piercing for inlet and/or outlet flows.

As mentioned above, the second portion 47 may be squeezed or otherwise collapsed to release beverage medium 42. During this process, the first portion 46 may be subjected to the squeezing force, such as air pressure, opposed chamber walls moved toward each other with the second portion 47 located between the chamber walls, etc., or may be at least partially isolated from the squeezing force. For example, a rim 462 of the first portion 46 may be clamped in a cartridge receiver of a beverage making machine so that a sealed chamber located below the rim 462 can be formed around the second portion 47. This arrangement may help reduce or eliminate squeezing force on the first portion 46.

Figure 65:
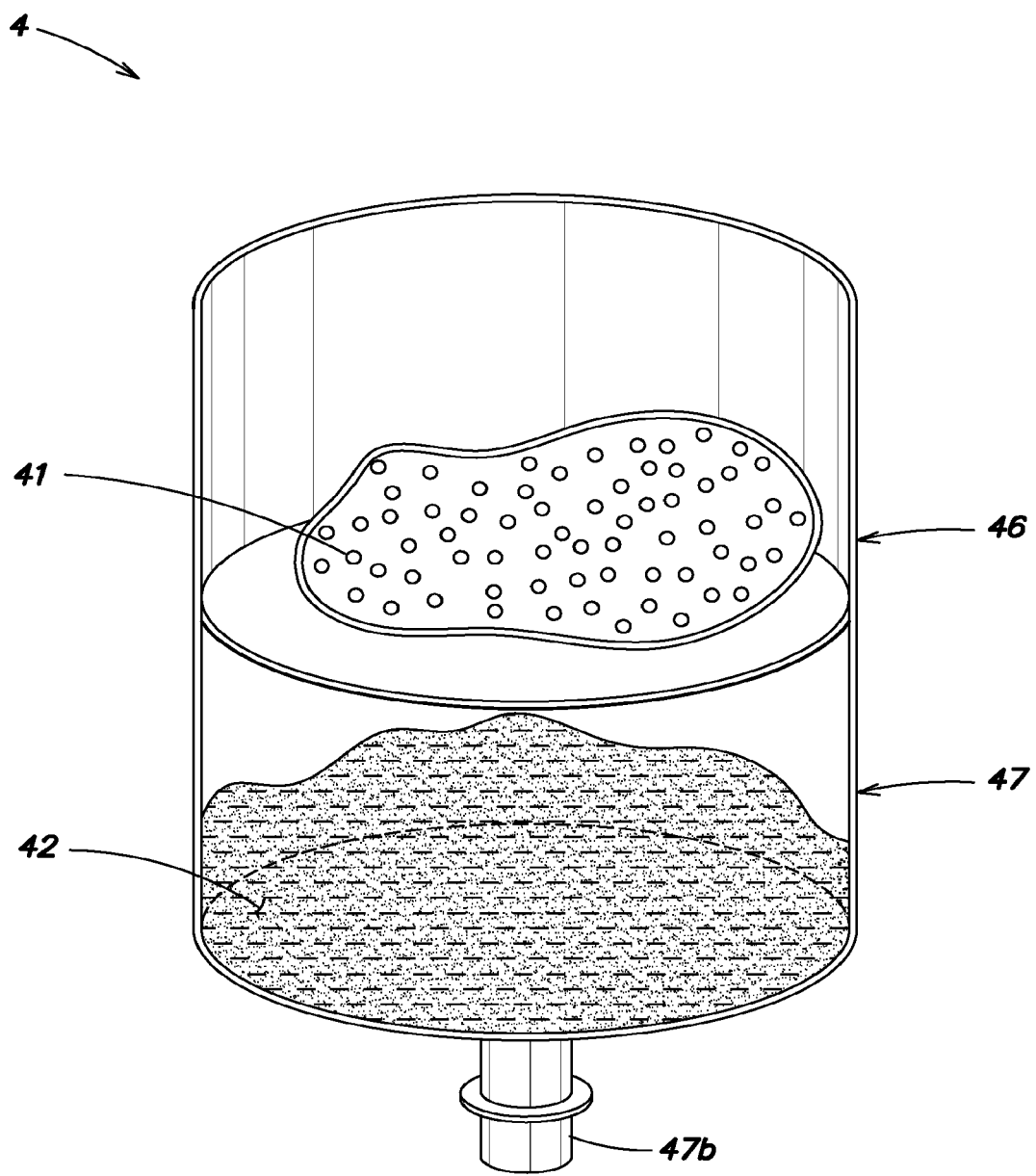
FIG. 65 shows a cartridge with a second portion containing a beverage medium and a pressurized gas used to expel the beverage medium.

FIG. 65 shows another illustrative embodiment of a cartridge. In this embodiment, the cartridge 4 includes a cylindrical container with a first portion 46 located on one side (an upper region as shown) of the container, and a second portion 47 located on an opposite side (a lower region). The first and second portions 46, 47 may be separated by a wall, e.g., that establishes an air tight space in which beverage medium 42 is located. The first portion 46 may be piercable to admit activating liquid into, and/or allow gas to exit the first portion 46, or may be arranged in other ways as discussed above. However, in this embodiment, the second portion 47 is arranged to initially hold a gas under pressure in the air tight space with the beverage medium 42 so that when an outlet valve 47b is opened (e.g., by moving a part of the valve relative to the second portion 47), the pressurized gas expands and forces the beverage medium 42 to pass through the valve 47b and out of the second portion 47. Thus, a beverage making machine using the cartridge 4 would not be required to introduce gas, liquid or other fluid into the second portion 47 to expel the beverage medium 42. Instead, opening of the valve 47b, which could be done automatically by the machine or by a user, could cause the beverage medium 42 to be dispensed. In an alternate embodiment, the pressurized gas in the second portion 47 could be received from the first portion 46, e.g., a wall separating the first and second portions 46, 47 could be permeable, at least with the first portion 46 under suitable pressure, so that gas generated by the gas source 41 can flow into the second portion 47, thus pressurizing the second portion 47 for dispensing of the beverage medium 42. Alternately, pressurized gas could be introduced into the second portion 47 by a beverage forming machine, e.g., via a piercing needle, port or other mechanism.

Example 1

The release properties of a carbon dioxide adsorbent were measured in the following way: 8×12 beads of sodium zeolite 13X (such as are commercially available from UOP MOLSIV Adsorbents) were obtained. The beads were placed in a ceramic dish and fired in a Vulcan D550 furnace manufactured by Ceranico. The temperature in the furnace containing the beads was raised to 550° C. at a rate of 3° C./min and was held at 550° C. for 5 hours for firing and preparation of the beads for charging with carbon dioxide.

The beads were removed from the furnace and immediately transferred to a metal container equipped with a tightly fitted lid and entrance and exit ports permitting circulation of gas. With the beads sealed in the container, the container was flooded with carbon dioxide gas and pressurized to 15 psig. (Note, however, that experiments have been performed between 5-32 psig.) The chamber was held at the set pressure for 1 hour. During this hold period the chamber was bled every 15 min. At the end of this period a quantity of gas had adsorbed to the beads.

A 30 g sample of charged 13X zeolite was measured, and a beaker filled with 250 ml of water at room temperature of 22° C. The beaker and water was placed on a balance and the balance zeroed. The 30 g of charged zeolite was then added to the beaker and the change in weight versus time was measured. It was shown that the change in weight became approximately steady after a period of 50 seconds, and that the beads lost about 4.2 g (14 wt %) of weight attributed to the release of carbon dioxide. Of course, some carbon dioxide may have been dissolved into the water.

| Time (sec) | Weight (grams) |
|---|---|
| 0 | 30 |
| 25 | 26.7 |
| 50 | 25.8 |
| 75 | 25.6 |
| 100 | 25.5 |

Example 2

Charged zeolite 13X was prepared as in Example 1. A 30 g sample of the charged zeolites was then placed in metal chamber with a water inlet port at the bottom and a gas outlet port at the top. The chamber that held the zeolites was 34×34 mm in cross section and had 2 metal filter discs with 64 $\frac{1}{16}$" diameter holes to retain the zeolite material. Tap water was then flooded into the bottom of the chamber perpendicular to the cross-section at an average flow rate of 60 ml/min. Gas evolved through the top outlet port.

The pressure of the gas in the chamber was measured with a pressure gauge and controlled using a needle valve attached to the exit port of the gas chamber. The needle valve was set to maintain the chamber at a pressure of 35 psig by manually adjusting the valve over the course of exposing charged zeolites in the chamber to water. Once the valve was set to an operating pressure, the system would perform repeatably with zeolite samples charged in the same manner.

Example 3

Charged zeolite 13X was prepared as in Example 1. A 30 g sample of the charged zeolites was then placed in a semi rigid 50 ml polystyrene-polyethylene-EVOH laminate cup container and thermally sealed with a foil lid. The sealed zeolite cartridges were then placed into a sealed, metal cartridge chamber and pierced on the top and bottom.

Tap water was introduced at the bottom of the cartridge with the flow controlled by a solenoid valve. The solenoid valve was actuated via a pressure switch connected to the top gas outlet of the cartridge chamber. During three different tests, the pressure switch was set to three different operating pressures of 5, 22, and 35 psig. The resulting gas at the set pressures was then introduced into the shellside of a hydrophobic membrane contactor (1×5.5 Minimodule from Liquicel, of Charlotte, N.C.). The other shellside port was plugged to prevent gas from escaping. Water from a reservoir containing 400 ml of water and approximately 50 g of ice was circulated from the reservoir, through the contactor, and back to the reservoir (e.g., like that shown in FIG. 2) using an Ulka (Milan, Italy) type EAX 5 vibratory pump through the lumenside of the membrane contactor. The pressure of the reservoir and contactor was maintained at the same pressure as the gas was produced. The system produced gas and circulated the water for approximately 60 seconds before being stopped.

The resulting carbonated water was then tested for carbonation levels using a CarboQC from Anton-Paar of Ashland, Va. The results for are shown in the table below:

| System Pressure (psig) | Average Carbonation Level (Volumes $CO_2$ dissolved) |
| --- | --- |
| 10 | 1.35 |
| 22 | 2.53 |
| 35 | 3.46 |

Thus, the gas was shown to evolve from the zeolites in the cartridges at a controllable rate (based on water delivery to the cartridge chamber) and then dissolved into water to produce a carbonated beverage. In addition, this illustrates the concept that by controlling system pressures one can control the level of carbonation of the finished beverage. It is expected that higher system pressures, e.g., of about 40-50 psi above ambient, would produce a 4 volume carbonated beverage (having a liquid volume of about 500 ml) in about 60 seconds or less.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A beverage making system, comprising:
a beverage precursor liquid supply including a reservoir to hold a precursor liquid;
a compartment separated from the reservoir by an impermeable barrier and thermally coupled to the precursor liquid in the reservoir to cool the precursor liquid;
a cartridge chamber arranged to hold a cartridge having a beverage medium to form a beverage;
a carbon dioxide gas supply arranged to conduct carbon dioxide gas, under pressure greater than an ambient pressure, to a beverage precursor liquid provided via the beverage precursor liquid supply to carbonate the precursor liquid;
wherein the system is configured to introduce carbonated precursor liquid into the cartridge of the cartridge chamber and dispense the carbonated precursor liquid that is mixed with the beverage medium within the cartridge and in the cartridge chamber.

2. The system of claim 1, wherein the carbon dioxide gas supply is connected to a carbon dioxide gas source that is made of a solid material.

3. The system of claim 2, wherein the system is arranged to mix the beverage medium with precursor liquid to form a beverage such that none of the beverage contacts the carbon dioxide gas source.

4. The system of claim 1, wherein the carbon dioxide gas supply is connected to a carbon dioxide gas cartridge.

5. The system of claim 1, wherein the system is arranged to use the cartridge over a period of time less than 120 seconds to form a carbonated liquid having a volume of between 100-1000 ml and a carbonation level of 2 to 4 volumes.

6. The system of claim 1, the cartridge chamber is arranged to pierce the cartridge to form an opening through which beverage medium exits the cartridge chamber.

7. The system of claim 1, further including a valve is configured to control the flow of beverage through a nozzle incorporated into the cartridge mixes the precursor liquid and beverage medium to aerate the beverage as the beverage flows.

8. The system of claim 1, further including a chiller circuit to chill the precursor liquid.

9. The system of claim 8, wherein the chiller circuit includes a thermoelectric device.

10. The system of claim 8, wherein the chiller circuit includes a heat exchanger in thermal communication with the ice compartment.

11. The system of claim 1, wherein the precursor liquid is cooled prior to dissolving carbon dioxide into the precursor liquid.

12. The system of claim 1, wherein the precursor liquid is cooled after dissolving carbon dioxide into the precursor liquid.

13. A beverage making system, comprising:
a beverage precursor liquid supply including a reservoir to hold a precursor liquid;
a compartment separated from the reservoir by an impermeable barrier and thermally coupled to the precursor liquid in the reservoir to cool the precursor liquid, the compartment housing a thermoelectric cooling unit;
a cartridge chamber arranged to hold a cartridge having a beverage medium to form a beverage;
a carbon dioxide gas supply having a gas storage device with a volume of carbon dioxide gas and arranged to conduct the volume of carbon dioxide gas, under pressure greater than an ambient pressure, from the gas storage device to a beverage precursor liquid provided via the beverage precursor liquid supply to carbonate the precursor liquid;
wherein the system is configured to introduce carbonated precursor liquid into the cartridge of the cartridge chamber and dispense the carbonated precursor liquid that is mixed with the beverage medium within the cartridge and in the cartridge chamber.

14. The system of claim 13, wherein the system is arranged to use the cartridge over a period of time less than 120 seconds to form a carbonated liquid having a volume of between 100-1000 ml and a carbonation level of 2 to 4 volumes.

15. The system of claim 13, further including a valve is configured to control the flow of beverage through a nozzle incorporated into the cartridge mixes the precursor liquid and beverage medium to aerate the beverage as the beverage flows.

16. The system of claim 13, wherein the precursor liquid is cooled prior to dissolving carbon dioxide into the precursor liquid.

17. The system of claim 13, wherein the precursor liquid is cooled after dissolving carbon dioxide into the precursor liquid.

18. The system of claim 13, wherein the carbon dioxide gas supply is configured to conduct the volume of carbon dioxide gas in a controlled manner.

19. The system of claim 13, wherein the carbonation dioxide gas supply is configured to control one or both of a pressure or a flow rate of the carbon dioxide gas from the gas storage device.

20. The system of claim 13, further comprising the cartridge.

* * * * *